(12) United States Patent
Marlin et al.

(10) Patent No.: US 11,926,019 B2
(45) Date of Patent: Mar. 12, 2024

(54) ABRASIVE ARTICLES AND METHODS OF FORMING SAME

(71) Applicant: SAINT-GOBAIN CERAMICS & PLASTICS, INC., Worcester, MA (US)

(72) Inventors: Samuel S. Marlin, Plan d'Orgon (FR); Ralph Bauer, Niagara Falls (CA); Stefan Vujcic, Buffalo, NY (US); Paul W. Rehrig, Sterling, MA (US); Marie-Camille Auscher, Shrewsbury, MA (US); Darrell K. Everts, Schenectady, NY (US); Hua Fan, Southborough, MA (US); Sujatha K. Iyengar, Northborough, MA (US); Christopher Arcona, Northborough, MA (US); Anthony Martone, Cambridge, MA (US); Brahmanandam V. Tanikella, Northborough, MA (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 454 days.

(21) Appl. No.: 17/132,421

(22) Filed: Dec. 23, 2020

(65) Prior Publication Data
US 2021/0197339 A1 Jul. 1, 2021

Related U.S. Application Data

(60) Provisional application No. 62/954,321, filed on Dec. 27, 2019.

(51) Int. Cl.
*B24D 3/00* (2006.01)
*C09K 3/14* (2006.01)

(52) U.S. Cl.
CPC ............. *B24D 3/00* (2013.01); *C09K 3/1409* (2013.01); *C09K 3/1436* (2013.01)

(58) Field of Classification Search
CPC ....... B24D 3/00; C09K 3/1409; C09K 3/1436
See application file for complete search history.

(56) References Cited

U.S. PATENT DOCUMENTS

| 345,604 A | 7/1886 | Semper |
| 1,910,444 A | 5/1933 | Nicholson |
(Continued)

FOREIGN PATENT DOCUMENTS

| CA | 743715 A | 10/1966 |
| CA | 2423788 A1 | 7/2002 |
(Continued)

OTHER PUBLICATIONS

Torre, "Investigation of Shaped Abrasive Particles vol. 1: Review of U.S. Pat. No. 6,054,093 Apr. 25, 2000" © Apr. 2011.
(Continued)

*Primary Examiner* — Pegah Parvini
(74) *Attorney, Agent, or Firm* — Abel Schillinger, LLP; Adrian Lawrence

(57) ABSTRACT

A coated abrasive article includes a substrate and a plurality of abrasive particles overlying the substrate, and the plurality of abrasive particles including tapered abrasive particles having a taper fraction standard deviation of at least 0.025 and not greater than 0.090.

16 Claims, 12 Drawing Sheets

(56) References Cited

U.S. PATENT DOCUMENTS

| | | |
|---|---|---|
| 2,033,991 A | 3/1936 | Melton et al. |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |

(56) References Cited

U.S. PATENT DOCUMENTS

| | | |
|---|---|---|
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,500,493 B2 | 12/2002 | Swei et al. |
| 6,511,938 B1 | 1/2003 | Liu |
| 6,524,681 B1 | 2/2003 | Seitz et al. |

(56) References Cited

U.S. PATENT DOCUMENTS

| | | |
|---|---|---|
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2 | 7/2019 | Josseaux et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |

(56) References Cited

U.S. PATENT DOCUMENTS

| | | |
|---|---|---|
| 2006/0177488 A1 | 8/2006 | Caruso et al. |
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1* | 7/2012 | Yener .............. C09K 3/1409 51/307 |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2012/0321567 A1 | 12/2012 | Gonzales et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapre et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |

(56) References Cited

U.S. PATENT DOCUMENTS

| | | | |
|---|---|---|---|
| 2017/0225299 A1 | 8/2017 | Keipert et al. |
| 2017/0335156 A1 | 11/2017 | Bauer et al. |
| 2017/0349797 A1 | 12/2017 | Yener et al. |
| 2018/0086957 A1 | 3/2018 | Sahlin et al. |
| 2018/0161960 A1 | 6/2018 | Wilson et al. |
| 2018/0169837 A1 | 6/2018 | Liu |
| 2018/0215975 A1 | 8/2018 | Marazano et al. |
| 2018/0215976 A1 | 8/2018 | Cotter et al. |
| 2018/0318983 A1 | 11/2018 | Wilson et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0126436 A1 | 5/2019 | Westberg et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1207015 A2 | 5/2002 |
| EP | 1356152 A2 | 10/2003 |
| EP | 1371451 A1 | 12/2003 |
| EP | 1383631 A1 | 1/2004 |
| EP | 1015181 B1 | 3/2004 |
| EP | 1492845 A1 | 1/2005 |
| EP | 1851007 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2012972 B1 | 6/2014 |
| EP | 2720676 B1 | 1/2018 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 03079277 A | 4/1991 |
| JP | 03-287687 | 12/1991 |
| JP | 05285833 A | 11/1993 |
| JP | 06114739 A | 4/1994 |
| JP | 07008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 3194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |

(56) References Cited

FOREIGN PATENT DOCUMENTS

| | | | |
|---|---|---|---|
| JP | 2006159402 A | 6/2006 |
| JP | 2006-192540 A | 7/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B1 | 11/1982 |
| WO | 94/02559 A1 | 2/1994 |
| WO | 95/03370 | 2/1995 |
| WO | 95/18192 A1 | 7/1995 |
| WO | 95/20469 A1 | 8/1995 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 99/14016 A1 | 3/1999 |
| WO | 99/38817 A1 | 8/1999 |
| WO | 1999038817 A1 | 8/1999 |
| WO | 99/54424 A1 | 10/1999 |
| WO | 0064630 A1 | 11/2000 |
| WO | 0114494 A1 | 3/2001 |
| WO | 0123323 A1 | 4/2001 |
| WO | 02097150 A2 | 12/2002 |
| WO | 03087236 A1 | 10/2003 |
| WO | 2005080624 A1 | 9/2005 |
| WO | 2005112601 A2 | 12/2005 |
| WO | 2006027593 A3 | 3/2006 |
| WO | 2006062597 A1 | 6/2006 |
| WO | 2007041538 A1 | 4/2007 |
| WO | 2009085578 A2 | 7/2009 |
| WO | 2009085841 A2 | 7/2009 |
| WO | 2009098017 A1 | 8/2009 |
| WO | 2010077509 A1 | 7/2010 |
| WO | 2010085587 A1 | 7/2010 |
| WO | 2010151201 A1 | 12/2010 |
| WO | 2011005425 A2 | 1/2011 |
| WO | 2011019188 A1 | 2/2011 |
| WO | 2011068714 A2 | 6/2011 |
| WO | 2011068724 A2 | 6/2011 |
| WO | 2011087649 A2 | 7/2011 |
| WO | 2011109188 A2 | 9/2011 |
| WO | 2011133438 A1 | 10/2011 |
| WO | 2011139562 A2 | 11/2011 |
| WO | 2011149625 A2 | 12/2011 |
| WO | 2012018903 A2 | 2/2012 |
| WO | 2012061016 A1 | 5/2012 |
| WO | 2012061033 A2 | 5/2012 |
| WO | 2012092590 A2 | 7/2012 |
| WO | 2012092605 A3 | 7/2012 |
| WO | 2010070294 A1 | 8/2012 |
| WO | 2012112305 A2 | 8/2012 |
| WO | 2012112322 A2 | 8/2012 |
| WO | 2012092590 A3 | 10/2012 |
| WO | 2012140617 A1 | 10/2012 |
| WO | 2012141905 A2 | 10/2012 |
| WO | 2013003830 A2 | 1/2013 |
| WO | 2013003831 A2 | 1/2013 |
| WO | 2013009484 A2 | 1/2013 |
| WO | 2013036402 A1 | 3/2013 |
| WO | 2013040423 A2 | 3/2013 |
| WO | 2013045251 A1 | 4/2013 |
| WO | 2013049239 A1 | 4/2013 |
| WO | 2013070576 A2 | 5/2013 |
| WO | 2013101575 A1 | 7/2013 |
| WO | 2013102170 A1 | 7/2013 |
| WO | 2013102176 A1 | 7/2013 |
| WO | 2013102177 A1 | 7/2013 |
| WO | 2013106597 A1 | 7/2013 |
| WO | 2013106602 A1 | 7/2013 |
| WO | 2013149209 A1 | 10/2013 |
| WO | 2013151745 A1 | 10/2013 |
| WO | 2013177446 A1 | 11/2013 |
| WO | 2013186146 A1 | 12/2013 |
| WO | 2013188038 A1 | 12/2013 |
| WO | 2014005120 A1 | 1/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014161001 A1 | 2/2014 |
| WO | 2014057273 A1 | 4/2014 |
| WO | 2014062701 A1 | 4/2014 |
| WO | 2014070468 A1 | 5/2014 |
| WO | 2014106173 A1 | 7/2014 |
| WO | 2014106211 A1 | 7/2014 |
| WO | 2014124554 A1 | 8/2014 |
| WO | 2014137972 A1 | 9/2014 |
| WO | 2014140689 A1 | 9/2014 |
| WO | 2014165390 A1 | 10/2014 |
| WO | 2014176108 A1 | 10/2014 |
| WO | 2014206739 A1 | 12/2014 |
| WO | 2014206890 A1 | 12/2014 |
| WO | 2014206967 A1 | 12/2014 |
| WO | 2014209567 A1 | 12/2014 |
| WO | 2014210160 A1 | 12/2014 |
| WO | 2014210442 A1 | 12/2014 |
| WO | 2014210532 A1 | 12/2014 |
| WO | 2014210568 A1 | 12/2014 |
| WO | 2015050781 A1 | 4/2015 |
| WO | 2015073346 A1 | 5/2015 |
| WO | 2015048768 A9 | 6/2015 |
| WO | 2015088953 A1 | 6/2015 |
| WO | 2015089527 A1 | 6/2015 |
| WO | 2015089528 A1 | 6/2015 |
| WO | 2015089529 A1 | 6/2015 |
| WO | 2015100018 A1 | 7/2015 |
| WO | 2015100020 A1 | 7/2015 |
| WO | 2015100220 A1 | 7/2015 |
| WO | 2015102992 A1 | 7/2015 |
| WO | 2015112379 A1 | 7/2015 |
| WO | 2015130487 A1 | 9/2015 |
| WO | 2015143461 A1 | 10/2015 |
| WO | 2015158009 A1 | 10/2015 |
| WO | 2015160854 A1 | 10/2015 |
| WO | 2015160855 A1 | 10/2015 |
| WO | 2015160857 A1 | 10/2015 |
| WO | 2015164211 A1 | 10/2015 |
| WO | 2015165122 A1 | 11/2015 |
| WO | 2015167910 A1 | 11/2015 |
| WO | 2015179335 A1 | 11/2015 |
| WO | 2015180005 A1 | 12/2015 |
| WO | 2015184355 A1 | 12/2015 |
| WO | 2016028683 A1 | 2/2016 |
| WO | 2016044158 A1 | 3/2016 |
| WO | 2016064726 A1 | 4/2016 |
| WO | 2016089675 A1 | 6/2016 |
| WO | 2016105469 A1 | 6/2016 |
| WO | 2016105474 A1 | 6/2016 |
| WO | 2016160357 A1 | 10/2016 |
| WO | 2016161157 A1 | 10/2016 |
| WO | 2016161170 A1 | 10/2016 |
| WO | 2016167967 A1 | 10/2016 |
| WO | 2016187570 A1 | 11/2016 |
| WO | 2016196795 A1 | 12/2016 |
| WO | 2016201104 A1 | 12/2016 |
| WO | 2016205133 A1 | 12/2016 |
| WO | 2016205267 A1 | 12/2016 |
| WO | 2016210057 A1 | 12/2016 |
| WO | 2017007703 A1 | 1/2017 |
| WO | 2017007714 A1 | 1/2017 |

(56) References Cited

FOREIGN PATENT DOCUMENTS

| | | |
|---|---|---|
| WO | 2017062482 A1 | 4/2017 |
| WO | 2017083249 A1 | 5/2017 |
| WO | 2017083255 A1 | 5/2017 |
| WO | 2016105543 A9 | 9/2017 |
| WO | 2017151498 A1 | 9/2017 |
| WO | 2018010730 A2 | 1/2018 |
| WO | 2018026669 A1 | 2/2018 |
| WO | 2018057465 A1 | 3/2018 |
| WO | 2018057558 A1 | 3/2018 |
| WO | 2018063902 A1 | 4/2018 |
| WO | 2018063958 A1 | 4/2018 |
| WO | 2018063960 A1 | 4/2018 |
| WO | 2018063962 A1 | 4/2018 |
| WO | 2018064642 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080778 A1 | 5/2018 |
| WO | 2018080784 A1 | 5/2018 |
| WO | 2018081246 A1 | 5/2018 |
| WO | 2018118688 A1 | 6/2018 |
| WO | 2018118690 A1 | 6/2018 |
| WO | 2018118695 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2018172193 A1 | 9/2018 |
| WO | 2018207145 A1 | 11/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2020212788 A1 | 10/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | 2021179025 A1 | 9/2021 |
| WO | 2021186326 A1 | 9/2021 |
| WO | 2021214576 A1 | 10/2021 |
| WO | 2021214605 A1 | 10/2021 |
| WO | 2021234540 A1 | 11/2021 |

OTHER PUBLICATIONS

Austin, Benson M., "Thick-Film Screen Printing," Solid State Technology, Jun. 1969, pp. 53-58.
Avril, Nicolas Joseph "Manufacturing Glass-Fiber Reinforcement for Grinding Wheels" Massachusetts Institute of Technology, Feb. 1996, 105 pages.
Bacher, Rudolph J., "High Resolution Thick Film Printing," E.I. du Pont de Nemours & Company, Inc., Proceedings of the International Symposium on Microelectronics, 1986, pp. 576-581.
Besse, John R., "Understanding and controlling wheel truing and dressing forces when rotary plunge dressing," Cutting Tool Engineering, Jun. 2012, vol. 64, Issue 6, 4 pages.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, Accessed: Sep. 18, 2013, 2 pages.
Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.
J. European Ceramic Society 31 (2011) 2073-2081, Abstract only.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, Edition Year: 2010, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
Dow Machine Tool Accessories, Grinding & Surface Finishing, www.1mta.com, Nov. 2014, 72 pages.
VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.

(56) References Cited

OTHER PUBLICATIONS

Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report with regard to International application No. PCT/US2017/031998, dated Aug. 21, 2017.
International Search Report with regard to International application No. PCT/US2017/031992, dated Aug. 21, 2017.
International Search Report and Written Opinion for Application No. PCT/US2016/036701, dated Sep. 1, 2016, 12 pages.
Brewer, L. et al., Journal of Materials Research, 1999, vol. 14, No. 10, pp. 3907-3912, Abstract only.
Lewis et al., "Direct Ink Writing of 3D Functional Materials", Advanced Functional Materials, 2006, 16, pp. 2193-2204.
International Search Report and Written Opinion for Application No. PCT/US2020/066817, dated Apr. 15, 2021, 11 pages.

\* cited by examiner

ABRASIVE ARTICLES AND METHODS OF FORMING SAME

CROSS-REFERENCE TO RELATED APPLICATION(S)

This application claims priority under 35 U.S.C. § 119(e) to U.S. Provisional Patent Application No. 62/954,321, filed Dec. 27, 2019, by Samuel S. MARLIN, et al., entitled "ABRASIVE ARTICLES AND METHODS OF FORMING SAME," which is assigned to the current assignee hereof and incorporated herein by reference in its entirety for all purposes.

BACKGROUND

Field of the Disclosure

The following is directed to coated abrasive articles, and in particular coated abrasive articles including tapered abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,243. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041. Other relevant disclosures on abrasive particles and associated methods of forming and abrasive articles incorporating such particles are available at: http://www.abel-ip.com/publications/.

The industry continues to demand improved abrasive materials and abrasive articles.

SUMMARY

According to one aspect, a coated abrasive article includes a substrate and a plurality of abrasive particles overlying the substrate, wherein the plurality of abrasive particles comprises tapered abrasive particles having a taper fraction standard deviation of at least 0.025 and not greater than 0.090.

According to another aspect, a coated abrasive article includes a substrate and a plurality of abrasive particles, each of the abrasive particles of the plurality of abrasive particles having a body including a length, width and thickness, wherein the plurality of abrasive particles have an average primary batch aspect ratio [B(length/width)] within a range of at least 2.1 to not greater than 4.7 and a primary batch aspect ratio standard deviation [STDEV-B(length/width)] of at least 0.05 and not greater than 0.55.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts. Moreover, unless stated otherwise, reference to any quantified value will be understood to be an average value based on a statistically-relevant sample size.

The following is directed to coated abrasive articles including tapered abrasive particles, methods of forming tapered abrasive articles, and methods of forming coated abrasive articles including tapered abrasive particles. The abrasive articles may be used in a variety of material removal operations for a variety of work pieces.

Figure 1:
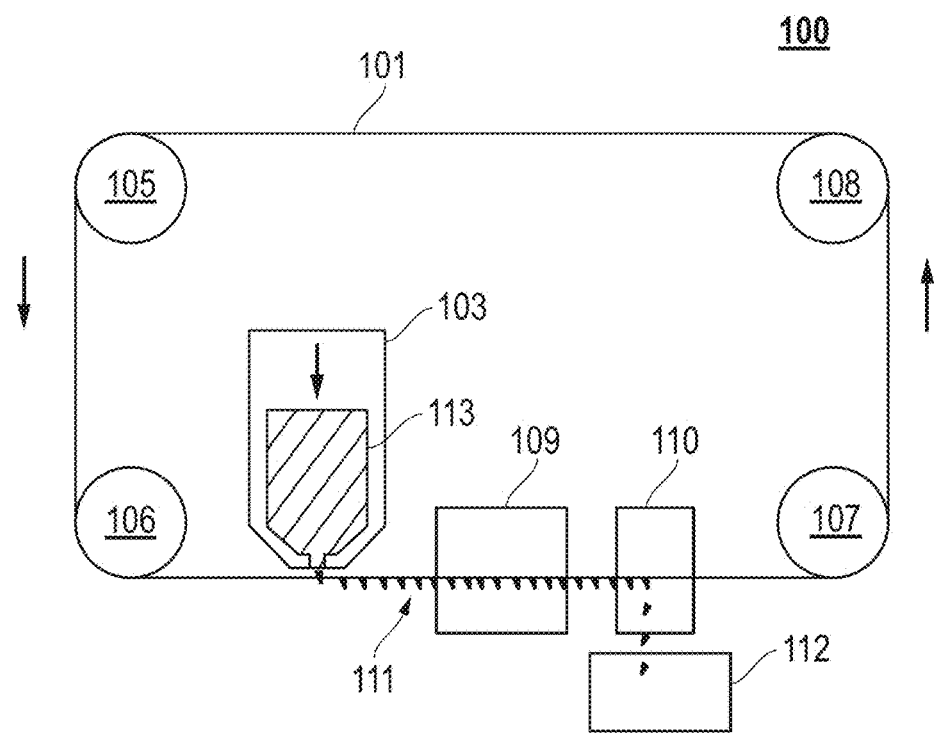
FIG. 1 includes an illustration of a system for forming tapered abrasive particles according to an embodiment.

FIG. 1 includes an illustration of a system for forming a tapered abrasive particles according to an embodiment. It will be appreciated that while the schematic system of FIG. 1 provides an explanation for a process for forming tapered abrasive particles, this embodiment should not be interpreted as limiting. Other processes may be used to form the tapered abrasive particles. Some suitable processes may include, but is not limited to, alternative extrusion techniques, printing, molding, casting, punching, embossing, fracturing, or any combination thereof.

Referring again to FIG. 1, a system 100 can include a production tool 101 disposed and configured to move around rollers 105, 106, 107, and 108 (105-108). The production tool can include cavities, which may extend through the entire thickness of the production tool 101 and facilitate the movement of a mixture 113 through the cavities. The mixture 113 can be extruded by an extruder 103 through the cavities in the production tool to facilitate shaping of the mixture 113 to form precursor tapered abrasive particles.

In one non-limiting embodiment, the mixture 113 may include at least a ceramic material and a liquid. In particular, the mixture 113 can be a gel formed of a ceramic powder material and a liquid, wherein the gel can be characterized as a shape-stable material having the ability to hold a given shape even in the green state (i.e., unfired or undried gel). In accordance with an embodiment, the gel can be formed of the ceramic powder material as an integrated network of discrete particles.

In certain aspects, control of certain processing conditions may be suitable for forming tapered abrasive particles. For example, the mixture 113 may be formed with a particular content of solid material to facilitate suitably forming the tapered abrasive particles. In one embodiment, the mixture 113 can have a high solids content, including for example, a solids content of at least about 25 wt %, such as at least about 35 wt %, at least about 42 wt %, at least about 44 wt %, at least about 46 wt %, at least about 48 wt %, at least about 50 wt %, or even at least about 51 wt % for the total weight of the mixture 113. Still, in at least one non-limiting embodiment, the solid content of the mixture 113 can be not greater than about 80 wt %, not greater than about 75 wt %, such as not greater than about 70 wt %, not greater than about 65 wt %, not greater than about 60 wt %, not greater than about 58 wt % or not greater than about 56 wt %. It will be appreciated that the content of the solids materials in the mixture 113 can be within a range between any of the minimum and maximum percentages noted above.

According to one embodiment, the ceramic powder material can include an oxide, a nitride, a carbide, a boride, an oxycarbide, an oxynitride, a superabrasive material or any combination thereof. It will be appreciated, that in certain alternative embodiments, in place of a ceramic powder material, one may choose to use a precursor of a ceramic powder material. A precursor can be a material, which may or may not be in a powder form that is configured to change at least a portion of its composition or physical properties during processing to form a ceramic material. In particular instances, the ceramic material can include alumina. More specifically, the ceramic material may include a boehmite material, which may be a precursor of alpha alumina. The term "boehmite" is generally used to denote alumina hydrates including mineral boehmite, typically being Al2O3·H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 113 can be formed to have a particular content of liquid material. Some suitable liquids may include inorganic materials, such as water or various organic materials such as alcohol and the like. In accordance with one embodiment, the mixture 113 can be formed to have a liquid content less than the solids content of the mixture 113. In more particular instances, the mixture 113 can have a liquid content of at least about 20 wt %, such as at least about 25 wt % for the total weight of the mixture 113. In other instances, the amount of liquid within the mixture 113 can be greater, such as at least about 35 wt %, at least about 40 wt %, at least about 42 wt % or at least about 44 wt % or at least 46 wt % or at least 48 wt % or at least 50 wt %. Still, in at least one non-limiting embodiment, the liquid content of the mixture can be not greater than about 80 wt %, such as not greater than about 65 wt %, not greater than about 60 wt % or not greater than about 55 wt %. It will be appreciated that the content of the liquid in the mixture 113 can be within a range between any of the minimum and maximum percentages noted above.

In some instances, the mixture 113 may have particular rheological characteristics to facilitate forming the tapered abrasive particles. For example, the mixture 113 may have a particular storage modulus. In one non-limiting embodiment, the mixture 113 can have a storage modulus of at least about $1 \times 10^4$ Pa, such as at least about $4 \times 10^4$ Pa, such as at least about $8 \times 10^4$ Pa, at least about $1 \times 10^5$ Pa, at least about $5 \times 10^6$ Pa, at least about $1 \times 10^6$ Pa, at least about $5 \times 10^6$ Pa or at least about $1 \times 10^7$ Pa. In at least one non-limiting embodiment, the mixture 113 may have a storage modulus of not greater than about $1 \times 10^{10}$ Pa, not greater than about $1 \times 10^9$ Pa, not greater than about $1 \times 10^8$ Pa, or even not greater than about $1 \times 10^7$ Pa. It will be appreciated that the storage modulus of the mixture 113 can be within a range between any of the minimum and maximum values noted above.

The storage modulus can be measured via a parallel plate system using ARES or AR-G2 rotational rheometers, with Peltier plate temperature control systems. For testing, the mixture 113 can be extruded within a gap between two plates that are set to be approximately 8 mm apart from each other. After extruding the gel into the gap, the distance between the two plates defining the gap is reduced to 2 mm until the mixture 113 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

In another non-limiting embodiment, the mixture 113 may have a particular viscosity that facilitates formation of the tapered abrasive particles. For example, the mixture 113 can have a viscosity of at least about $1 \times 10^5$ Pa s, at least about $5 \times 10^5$ Pa s, at least about $1 \times 10^6$ Pa s, at least about $5 \times 10^6$ Pa s, at least about $1 \times 10^7$ Pa s, at least about $5 \times 10^7$ Pa s, at least about $1 \times 10^8$ Pa s, at least about $5 \times 10^8$ Pa s, at least about $1 \times 10^9$ Pa s, at least about $5 \times 10^9$ Pa s, at least about $1 \times 10^{10}$ Pa s. In at least one non-limiting embodiment, the mixture 113 may have a viscosity of not greater than about $1 \times 10^{15}$ Pa s, not greater than about $1 \times 10^{13}$ Pa s, not greater than about $1 \times 10^{12}$ Pa s, or even not greater than about $1 \times 10^{10}$ Pa s. It will be appreciated that the viscosity of the mixture 113 can be within a range between any of the minimum and maximum values noted above. The viscosity can be measured in the same manner as the storage modulus as described above.

In still another non-limiting embodiment, the mixture 113 may have a particular yield stress. For example, the mixture 113 can have a yield stress of at least about $1 \times 10^2$ Pa, at least about $5 \times 10^2$ Pa at least about $1 \times 10^4$ Pa, at least about $5 \times 10^4$ Pa, at least about $1 \times 10^5$ Pa, at least about $5 \times 10^5$ Pa, at least about $1 \times 10^6$ Pa s, at least about $5 \times 10^6$ Pa s, at least about $1 \times 10^7$ Pa, at least about $5 \times 10^7$ Pa, or even at least about $1 \times 10^8$ Pa. In at least one non-limiting embodiment, the mixture 113 may have a yield stress of not greater than about $1 \times 10^{10}$ Pa, not greater than about $1 \times 10^9$ Pa, not greater than about $1 \times 10^8$ Pa, or even not greater than about $1 \times 10^7$ Pa. It will be appreciated that the yield stress of the mixture 113 can be within a range between any of the minimum and maximum values noted above. The yield stress can be measured in the same manner as the storage modulus as described above.

The rheological characteristics of the mixture 113 can be distinct from conventional mixtures and gels, such as those described in certain references. Moreover, the mixture 113 can be formed to have a particular relationship between one or more rheological characteristics (e.g., viscosity, yield stress, storage modulus, etc.) to facilitate forming. Notably, the gel may be significantly more "stiff", having a shear thinning characteristic, which may be entirely distinct from mixtures used in other forming methods.

In some optional embodiments, the mixture 113 can be formed to have a particular content of organic materials, including for example, organic additives that can be distinct from the liquid, to facilitate processing and formation of shaped abrasive particles according to the embodiments herein. Some suitable organic additives may include stabilizers, binders, such as fructose, sucrose, lactose, glucose, UV curable resins, and the like. It will be appreciated that the total content of all materials in the mixture (e.g., ceramic powder material, water, additives, etc.) add up to and do not exceed 100%.

The embodiments herein may utilize a mixture 113 that can be distinct from certain types of slurries. For example, the content of organic materials within the mixture 113, particularly, any of the organic additives noted above may be a minor amount as compared to other components within the mixture 113. In at least one embodiment, the mixture 113 can be formed to have not greater than about 30 wt % organic material for the total weight of the mixture 113. In other instances, the amount of organic materials may be less, such as not greater than about 15 wt %, not greater than about 10 wt %, or even not greater than about 5 wt %. Still, in at least one non-limiting embodiment, the amount of organic materials within the mixture 113 can be at least about 0.5 wt % for the total weight of the mixture 113. It will be appreciated that the amount of organic materials in the mixture 113 can be within a range between any of the minimum and maximum values noted above. In at least one alternative aspect, the mixture 113 may be essentially free of organic material.

In some embodiments, the mixture 113 can be formed to have a particular content of acid or base, which may facilitate processing. Some suitable acids or bases can include nitric acid, sulfuric acid, citric acid, hydrochloric acid, tartaric acid, phosphoric acid, ammonium nitrate, and/or ammonium citrate. According to one particular embodiment, the mixture 113 can have a pH of less than about 5, and more particularly, within a range between at least about 2 and not greater than about 4, using a nitric acid additive.

Alternatively, the rheology of the acidic gel can be further modified by converting the acidic gel to a basic gel through the use of bases such as ammonium hydroxide, sodium hydroxide, organics amines such as hexamethylenetetramine and the like.

In one embodiment, extrusion of the mixture 113 from the extruder 103 and through the cavities in the production tool 101 can include applying a force on the mixture 113 to facilitate extrusion. In accordance with an embodiment, a particular pressure may be utilized during extrusion. For example, the pressure can be at least about 10 kPa, such as at least about 50 kPa, at least about 100 kPa, at least about 200 kPa or at least about 300 kPa or at least 400 kPa or at least 500 kPa. Still, in at least one non-limiting embodiment, the pressure utilized during extrusion can be not greater than about 10,000 kPa, such as not greater than about 8,000 kPa not greater than about 6,000 kPa or not greater than 3,000 kPa or not greater than 1,000 kPa or not greater than 800 kPa. It will be appreciated that the pressure used to extrude the mixture 113 can be within a range between any of the minimum and maximum values noted above.

In accordance with one embodiment, the mixture 113 can have a coil value of at least about 1800 N. The coil value can be measured on an instrument called a Shimpo compression tester manufactured by Shimpo Instruments, Itasca Ill., using a sample of mixture ranging from 30-60 grams in mass, which is manually pressed into a plastic/stainless steel cylinder of 2" in diameter. At the extrusion end of the cylinder, a plastic insert with a cylindrical hole establishes the compressed extrudate size of generally 0.25 inches in diameter. A plunger slides into the cylinder and when the test is started, the plunger will extrude the gel once the threshold coil force is reached. When the cylinder assembly is in position, the Shimpo compression tester moves a force probe down towards the plunger at a constant rate of 95-97 mm/min. When the threshold coil force is reached, the gel is extruded out of the insert hole and an output meter generates a peak force, which is the coil value. In another embodiment, the coil value of the mixture 113 can be at least about 200 N, such as at least about 300 N, at least about 400 N, at least about 500 N, at least about 600 N, at least about 700 N, at least about 800 N, at least about 900 N, at least about 1000 N. In one non-limiting embodiment, the coil value of the mixture 113 can be not greater than about 3000 N, such as not greater than about 2500 N, or even not greater than about 2000 N. Thus, certain mixtures according to the embodiments herein can be significantly more flow resistant compared to conventional mixtures.

In accordance with an embodiment, the production tool 101 can include cavities in the form of apertures that extend through the thickness of the production tool 101. The production tool 101 may be in the form of an endless belt for continuous operations. Additionally, the production tool may include a plurality of cavities for improving the production capabilities of the process. The cavities can have any two-dimensional shape and size depending upon the intended cross-sectional shape of the tapered abrasive particles. In one particular embodiment, the cavities can have a quadrilateral two-dimensional shape as viewed in the plane of the length and width of the production tool 101.

As further illustrated in FIG. 1, the mixture 113 can be extruded through the cavities in the production tool 101. More specifically, in an embodiment, as the cavities translate past the die opening of the extruder 103, the mixture 113 can be forced from the extruder 103 and through the cavities in the production tool 101. As the production tool 101 continues to translate, the cavities pass by the die opening, stopping any further extrusion of the mixture 113 into the filled cavities. Extrusion may continue into the next group of cavities that are exposed to the die opening. The mixture 113 that is forced through the cavities can protrude through the cavities on the side of the production tool 101 that is opposite the side of the production tool 101 that is adjacent the die opening of the extruder 103.

In one embodiment, the rate of translation of the production tool 101 may be controlled to facilitate the formation of precursor tapered abrasive particles and tapered abrasive particles having one or more features of the embodiments herein. In one particular embodiment, the rate of translation of the production tool 101 can be controlled relative to the rate of extrusion.

In one non-limiting embodiment, the mixture 113 may be extruded at an extrusion rate of at least 0.0015 cm/s, such as at least 0.005 cm/s, at least 0.008 cm/s, at least 0.01 cm/s, at least 0.015 cm/s, at least 0.02 cm/s, at least 0.05 cm/s, at least 0.08 cm/s, at least 0.10 cm/s, at least 0.20 cm/s, at least 0.30 cm/s, at least 0.40 cm/s, at least 0.50 cm/s. Still, in one non-limiting embodiment, the mixture 113 may be extruded at an extrusion rate of not greater than 5 m/s, such as not greater than 1 m/s, not greater than 0.5 m/s, not greater than 100 cm/s, not greater than 50 cm/s, not greater than 10 cm/s, not greater than 1 cm/s. It will be appreciated that the mixture 113 may be extruded at an extrusion rate within a range between any of the minimum and maximum values noted above.

In one non-limiting embodiment, the production tool may be translated at a translation rate of at least 0.10 cm/s, such as at least 0.50 cm/s, at least 0.80 cm/s, at least 1.0 cm/s, at least 1.5 cm/s, at least 2 cm/s, at least 3 cm/s, at least 4 cm/s, at least 5 cm/s, at least 6 cm/s, at least 7 cm/s, at least 8 cm/s, at least 9 cm/s. Still, in one non-limiting embodiment, the production tool 101 may be translated at a rate of not greater than 5 m/s, such as not greater than 1 m/s, not greater than 0.5 m/s, not greater than 100 cm/s, not greater than 50 cm/s, not greater than 25 cm/s, not greater than 15 cm/s. It will be appreciated that the production tool may be translated at a rate within a range between any of the minimum and maximum values noted above.

The formation of tapered abrasive particles having the features of the embodiments herein is based upon empirical knowledge of the interrelationships between multiple processing variables, including for example, but not limited to mixture rheology, extrusion rate, translation rate, grit size or die opening size, and environmental conditions (e.g., temperature, humidity, etc.). Moreover, the uncontrolled change of one process variable may require controlled change of two or more other processing variable parameters to accommodate for the uncontrolled change. Furthermore, because of the relative size of the shapes being formed, the process requires precision that can be impacted by an uncontrolled change of one or more process variables, thereby resulting in abrasive particles that are not tapered abrasive particles.

The production tool 101 may include an inorganic material, including for example, but not limited a ceramic, a metal, a metal alloy, or any combination thereof. In an alternative embodiment, the production tool 101 may include an organic material, such as a polymer, including for example, a fluoropolymer, such as polytetrafluoroethylene (PTFE).

In an alternative embodiment, the production tool 101 may include a specific composition that may be imparted to the mixture 113 contained on the surfaces of the cavities. For example, the surfaces of the cavities may be coated with an additive. The additive may be an inorganic material, organic material, or any combination thereof. In certain instances, the additive may be a dopant. In such embodiments, the mixture 113 may be doped while being extruded through the cavities of the production tool 101.

After extrusion of the mixture 113, the extruded mixture can be translated on the production tool 101 to undergo further optional post-shaping processing at stage 109. Some non-limiting examples of the post-shaping processing at stage 109 may include drying, cooling, spraying, doping, coating, or any combination thereof.

After conducting any optional post-shaping processing at stage 109, the extruded mixture can be translated to a release zone 110 where the extruded mixture portions are released from the cavities of the production tool 101 to form precursor tapered abrasive particles. The extruded mixture portions can be released from the production tool 101 using various techniques, including but not limited to, mechanical manipulation, vibration, impingement of a gas or liquid phase material, change in temperature (i.e., heating, cooling, freezing, etc.) and the like. In a preferred embodiment, the extruded mixture portions are engaged with a blade that facilitates separation from the production tool 101.

In accordance with an embodiment, the mixture 113 can experience a change in weight of less than about 5% for the total weight of the mixture 113 for the duration the mixture 113 is connected to the production tool 101. In other embodiments, the weight loss of the mixture 113 can be less, such as less than about 4%, less than about 3%, less than about 2%, less than about 1%, or even less than about 0.5%. Still, in one particular embodiment, the mixture 113 may have essentially no change in weight for the duration the mixture 113 is in the production tool 101.

Furthermore, during processing, the mixture 113 may experience a limited change in volume (e.g., shrinkage) for the duration the mixture 113 is connected to the production tool 101. For example, the change in volume of the mixture 113 can be less than about 5% for the total volume of the mixture 113, such as less than about 4%, less than about 3%, less than about 2%, less than about 1%, or even less than about 0.5%. In one particular embodiment, the mixture 113 may experience essentially no change in volume for the entire duration the mixture 113 is connected to the production tool 101.

In one non-limiting embodiment, the mixture 113 may undergo a controlled heating process, while the mixture 113 is connected to the production tool 101. For example, the heating process may include heating the mixture at a temperature greater than room temperature for a limited time. The temperature may be at least about 30° C., such as at least about 35° C., at least about 40° C., such as at least about 50° C., at least about 60° C., or even at least about 100° C. Still, the temperature may be not greater than about 300° C., such as not greater than about 200° C., or even not greater than about at least about 150° C., or even not greater than about 100° C. The duration of heating can be particularly short, such as not greater than about 10 minutes, not greater than about 5 minutes, not greater than about 3 minutes, not greater than about 2 minutes, or even not greater than about 1 minute.

The heating process may utilize a radiant heat source, such as infrared lamps to facilitate controlled heating of the mixture 113. Moreover, the heating process may be adapted to control the characteristics of the mixture and facilitate particular aspects of the shaped abrasive particles according to embodiments herein.

In certain instances, the precursor tapered abrasive particles can be gathered and undergo further processing. For example, further processing can include doping, calcining, impregnating, drying, sintering, and the like. In one embodiment, the precursor tapered abrasive particles may have a dopant material applied to one or more exterior surfaces. In accordance with an embodiment, applying a dopant material can include the application of a particular material, such as a salt, which can be a precursor salt material that includes a dopant material to be incorporated into the finally-formed shaped abrasive particles. For example, a metal salt can include an element or compound that is the dopant material. It will be appreciated that the salt material may be in liquid form, such as in a dispersion comprising the salt and liquid carrier. The salt may include nitrogen, and more particularly, can include a nitrate. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, silicon, boron, carbon and a combination thereof.

In one embodiment, the precursor tapered abrasive particle may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 10° C., such as at least 20° C. or at least 30° C. or at least 40° C. It will be appreciated that the drying temperature may be within a range between any of the minimum and maximum temperatures noted above.

In accordance with an embodiment, the process of forming the tapered abrasive particles may include calcining, which includes removal of volatiles and a phase change in the material, including for example, a high-temperature phase material (e.g., alpha alumina). In yet another embodiment, the process for forming tapered abrasive particles may include impregnation of calcined precursor tapered abrasive particles with a dopant. In another embodiment, formation of the tapered abrasive particles from the precursor tapered abrasive particles can include sintering. Sintering may be conducted to densify the particles. In a particular instance, the sintering process can facilitate the formation of a high-temperature phase ceramic material. For example, in one embodiment, the precursor shaped abrasive particle may be sintered such that a high-temperature phase of alumina, such as alpha alumina is formed. It will be appreciated that certain additional processes, such as cleaning, may be completed on the production tool 101, to facilitate regular and repetitive processing.

After forming the tapered abrasive particles, such particles may be disposed onto a substrate to form a fixed abrasive article, such as a coated abrasive article. Further details on the coated abrasive articles and methods for forming such articles are described herein.

Figure 2A:
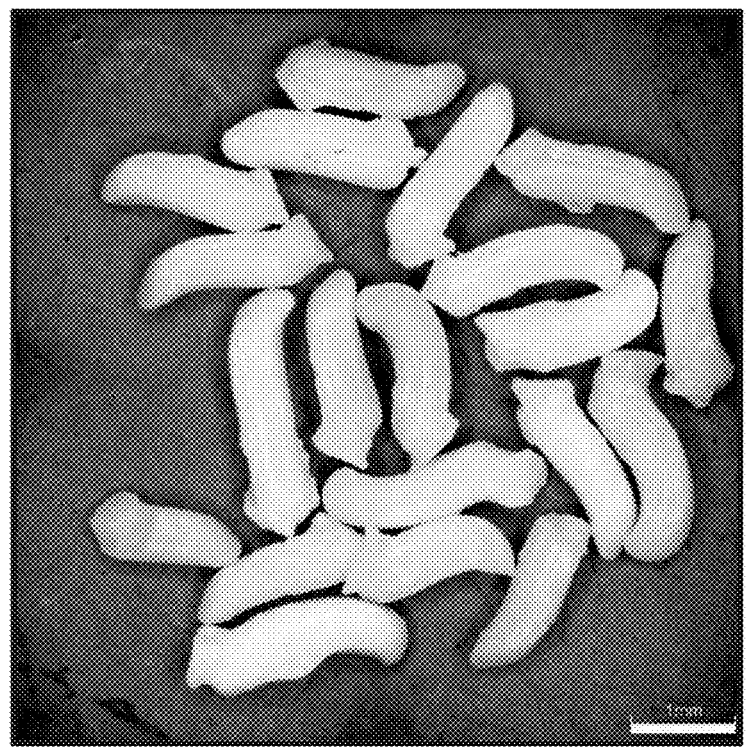
FIG. 2A includes an image of a plurality of tapered abrasive particles.

Referring now to FIGS. 2A-2G, features of tapered abrasive particles are described. FIG. 2A includes an image of a plurality of tapered abrasive particles. In accordance with an embodiment, the plurality of abrasive particles included in the coated abrasive article can include at least a portion of tapered abrasive particles. For example, in one embodiment, at least 5% of the abrasive particles in the plurality of abrasive particles on a coated abrasive article can include tapered abrasive particles as calculated based on the number of particles. In other embodiments, the content of tapered abrasive particles can be greater, such as at least 10% or at least 20% or at least 30% or at least 40% or at least 50% or at least 60% or at least 70% or at least 80% or at least 90% or at least 95% or at least 99%. In one embodiment, the plurality of abrasive particles on a coated abrasive can consist entirely of tapered abrasive particles. Still, in one non-limiting embodiment, the plurality of abrasive particles may include not greater than 99% tapered abrasive particles calculated on the number of particles in the plurality of abrasive particles, such as not greater than 95% or not greater than 90% or not greater than 80% or not greater than 70% or not greater than 60% or not greater than 50%. It will be appreciated that the percentage of tapered abrasive particles present in the plurality of abrasive particles can be within a range including any of the minimum and maximum values noted above. The above percentages may represent a percentage based on total count of the abrasive particles of weight percent based on the total weight of the plurality of abrasive particles.

According to one non-limiting embodiment, the plurality of abrasive particles can include a blend of different types of abrasive particles. A blend can include a first portion of abrasive particles and a second portion of abrasive particles. In one embodiment, the tapered abrasive particles can be present in the first portion, the second portion, or both the first portion and second portion. In one instance, the first portion or the second portion may include only tapered abrasive particles. According to one embodiment, the blend can include a first portion of abrasive particles of a first type and a second portion of abrasive particles of a second type, wherein the first type and second type are different from each other based on at least one abrasive characteristic selected from the group of average grain size, average particle size, friability, toughness, hardness, two-dimensional shape, three-dimensional shape, any of the features described in the embodiments herein, or any combination thereof.

In one non-limiting aspect, the plurality of abrasive particles can include at least 10 grams of abrasive particles, such as at least 100 grams abrasive particles, at least 500 grams of abrasive particles, at least 1 kg of abrasive particles or at least 10 kg of abrasive particles.

In another aspect, the plurality of abrasive particles may include at least 10 abrasive particles, such as at least 20 abrasive particles or at least 30 abrasive particles or at least 50 abrasive particles or at least 100 abrasive particles or at least 500 abrasive particles. It will be appreciated that the number of abrasive particles of the in the plurality of abrasive particles may be within a range of at least 10 abrasive particles to not greater than a hundred thousand abrasive particles, such as within a range of at least 10 abrasive particles to not greater than 1000 abrasive particles or within range of at least 20 abrasive particles are not greater than 100 abrasive particles.

In still another aspect, the plurality of abrasive particles may include at least a portion, and in some cases, all of the abrasive particles included in a fixed abrasive article, such as, a coated abrasive article. In another embodiment, the plurality of abrasive particles may include all of the abrasive particles in a plurality of fixed abrasive articles.

Figure 2B:
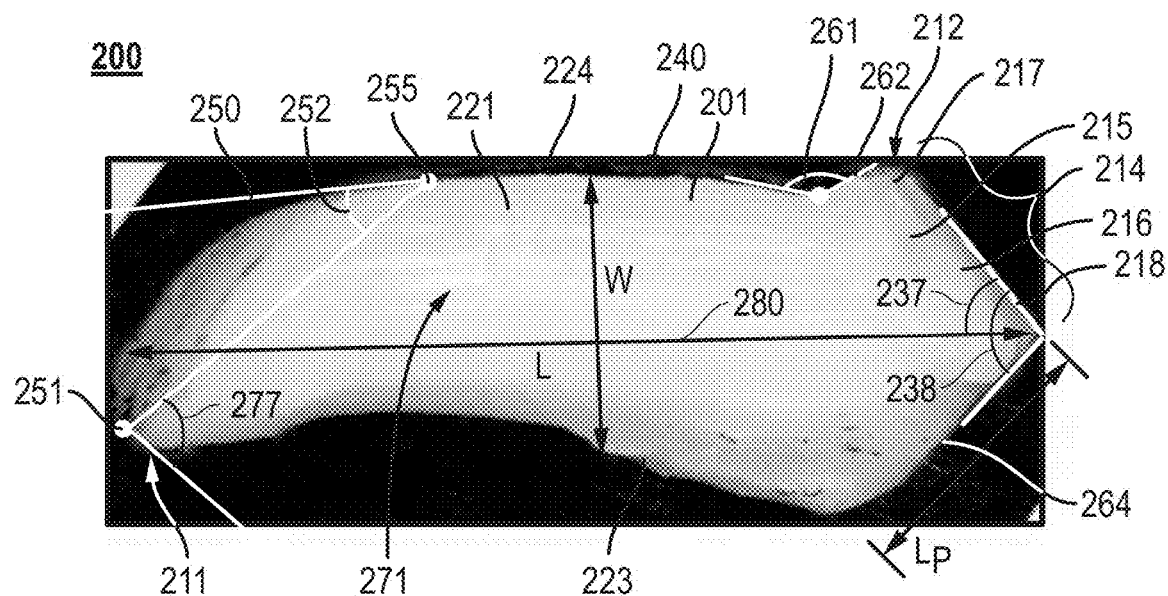
FIG. 2B includes an image of a tapered abrasive particle in a plane defined by a length and width of the body from a first perspective.
Figure 2C:
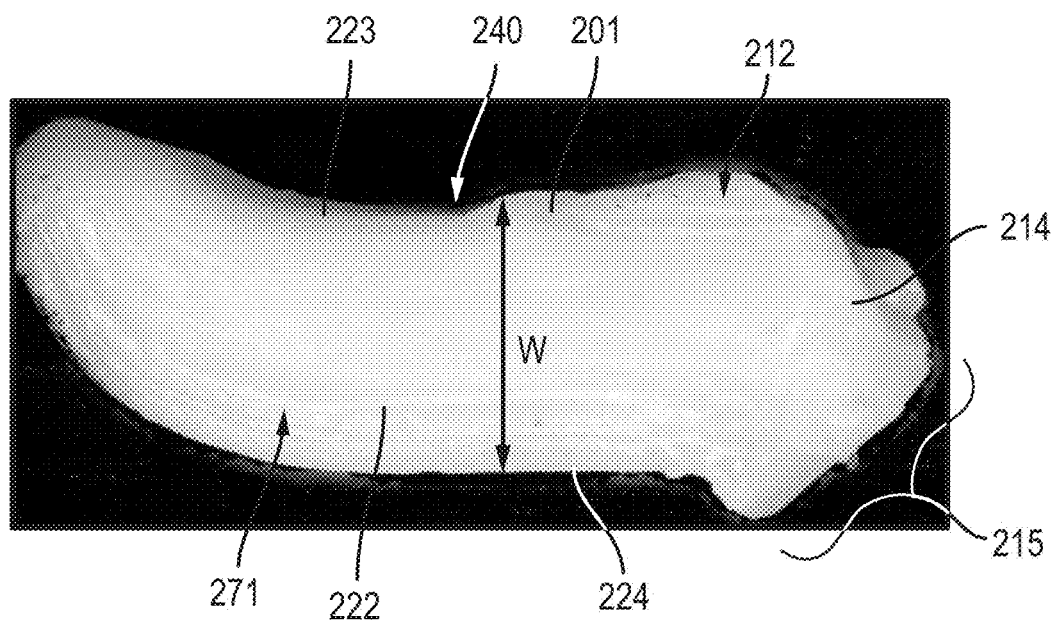
FIG. 2C includes an image of a tapered abrasive particle in a plane defined by a length and width of the body from a second perspective opposite the first perspective.
Figure 2D:
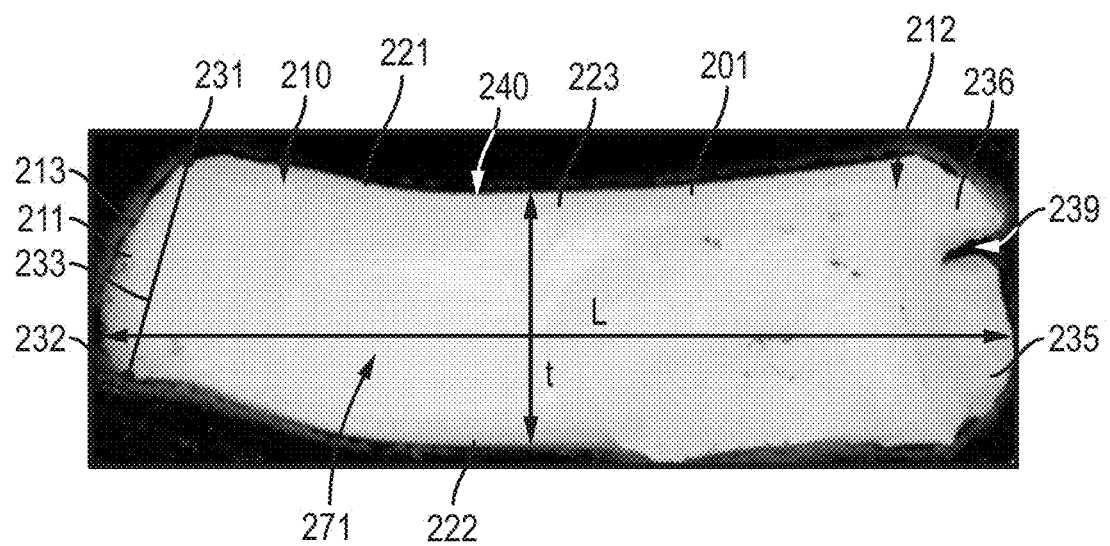
FIG. 2D includes an image of a tapered abrasive particle in a plane defined by a length and thickness of the body from a first perspective.
Figure 2E:
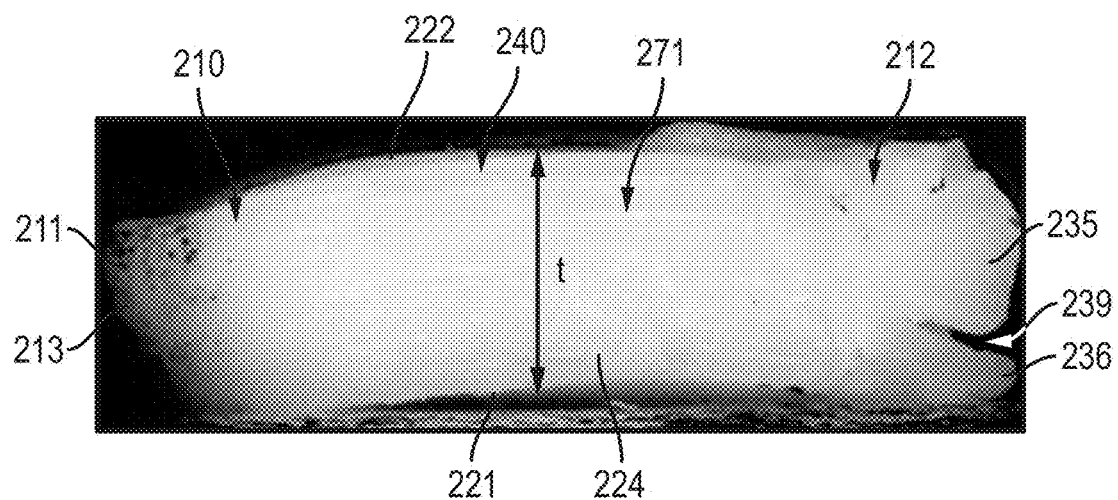
FIG. 2E includes an image of a tapered abrasive particle in a plane defined by a length and thickness of the body from a second perspective opposite the first perspective.
Figure 2F:
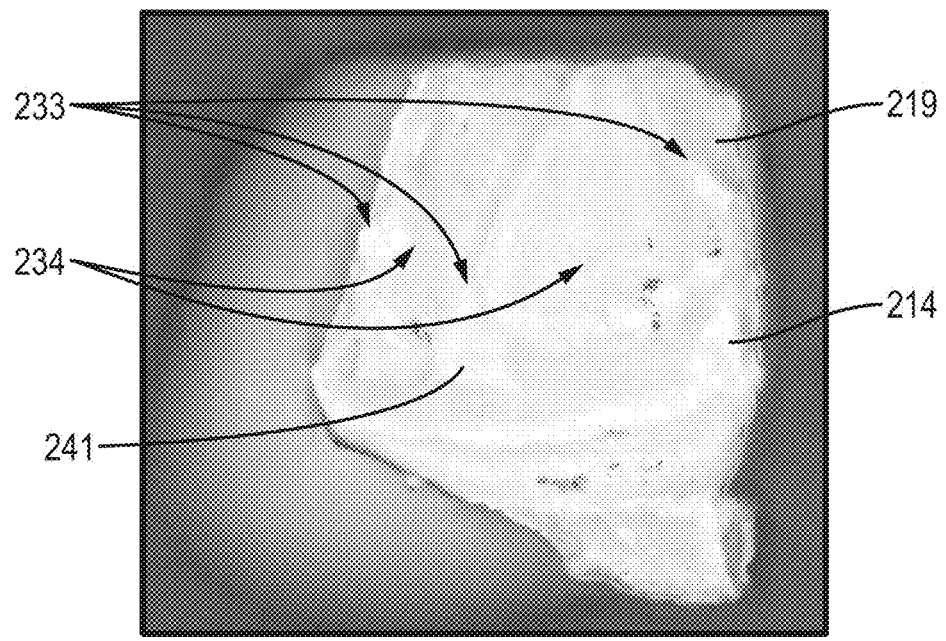
FIG. 2F includes a view of a portion of a base region of a tapered abrasive particle according to an embodiment.
Figure 2G:
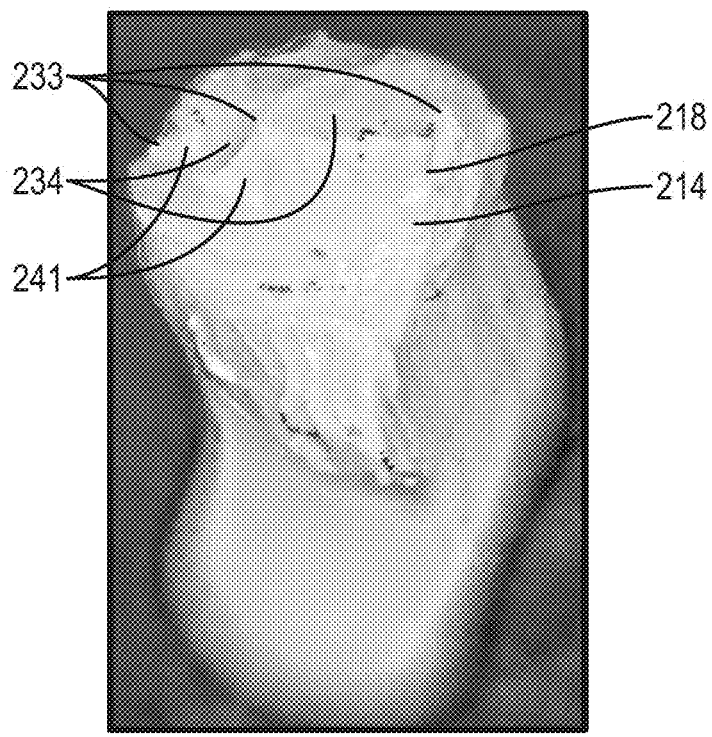
FIG. 2G includes a perspective view of a portion of a base region of a tapered abrasive particle according to an embodiment.

FIG. 2B includes an image of a tapered abrasive particle in a plane defined by a length and width of the body from a first perspective. FIG. 2C includes an image of a tapered abrasive particle in a plane defined by a length and width of the body from a second perspective opposite the first perspective. FIG. 2D includes an image of a tapered abrasive particle in a plane defined by a length and thickness of the body from a first perspective. FIG. 2E includes an image of a tapered abrasive particle in a plane defined by a length and thickness of the body from a second perspective opposite the first perspective. FIG. 2F includes a perspective view of a base of the tapered abrasive particle of FIG. 2B. FIG. 2G includes an alternative perspective view image of the base of the tapered abrasive particle of FIG. 2B.

As illustrated in the non-limiting embodiments of FIGS. 2B-2G, the tapered abrasive particle 200 may include a body 201 having a length (L) a width (W), and a thickness (t). In one embodiment, the length can be greater than the width. In another embodiment, the length can be greater than the thickness. In still another embodiment, the width may be greater than, equal to or less than the thickness. Unless otherwise stated, reference to any dimensions herein is understood to be reference to an average value from a suitable sample size of measurements and/or particles. For example, reference to the length includes an average length measured as close as possible to the mid-point of the body 201 along the longitudinal axis 280. It should be noted that the length or average length may differ from a skeletal length, which is calculated using imaging processing and described in more detail herein. The width can be measured in a direction perpendicular to the longitudinal axis 280 in the plane of the length and width. The width can be measured as close as possible to the midpoint of the body 201, which can be assumed to be the midpoint between the points where the longitudinal axis 280 intersects the edges of the body 201. The thickness, as shown in FIGS. 2D and 2E can be measured as close as possible to the midpoint of the body 201, which can be assumed to be the midpoint between endpoints on the longitudinal axis 280 defined by the intersection of the longitudinal axis 280 with the edges of the body 201.

In one non-limiting embodiment, a tapered abrasive particle can include a body 201 having a tip region 210 including a tip 211 and a base region 212 including a base 214. The base region 212 may be at the opposite end of the body from the tip region 210 along a length of the body 201. In another aspect, the body 201 may be substantially linear for a majority of the total length of the body 201. As used herein, the term substantially linear refers to a body that does not deviate from a linear axis more than 20%, such as not greater than 10% or not greater than 5%.

In one non-limiting aspect, the tip 211 may be defined by a convergence of at least two surfaces of the body 201. For example, the body 201 may include surfaces 221, 222, 223, and 224 (221-224) extending between the tip region 210 and the base region 212. In one embodiment, at least two of the surfaces (221-224) may converge to form at least a portion of the tip 211. In some non-limiting examples, the tip 211 may be defined by a convergence of the surface 223 and surface 224, which generally define the thickness of the body 201. In another embodiment, the surfaces 221 and 222 may converge and be separated from each other at the tip 211 by a tip edge 213. In such embodiments, the tip 211 may be in the form of a wedge, wherein the body 201 in the dimension of the thickness converges to a tip edge 213 and the surfaces 221 and 222 defining the width of the body 201 may stay separated at the tip 211 by the tip edge 213. As best shown in FIGS. 2D and 2E, the tip 211 includes a tip edge 213 primarily defined by the convergence of the surfaces 223 and 224 and extends between the terminal corners of the surfaces 221 and 222.

In other aspects, the tip 211 may be defined by convergence of more than two surfaces, such as at least three surfaces or at least four surfaces of the body 201. In such embodiments, the tip 211 may come have a tip edge defined by the convergence of at least three or more surfaces of the body.

According to one non-limiting embodiment, the tip edge 213 can have a tip edge length 233 as defined by the shortest distance between exterior corners 231 to 232 that is less than the average thickness (t) of the body 201, such as not greater than 95% or not greater than 90% or not greater than 85% or not greater than 80% or not greater than 75% or not greater than 70% or not greater than 60% or not greater than 50% or not greater than 40% or not greater than 30% of the average thickness of the body 201. Still, in another non-limiting embodiment, the tip edge length 233 may be at least 20% of the average thickness of the body 201, such as at least 30% or at least 40% or at least 50% or at least 60% or at least 70% or at least 80% or at least 90% or at least 95% of the average thickness of the body 201. It will be appreciated that the tip edge length 233 can be within range including any of the minimum and maximum percentages noted above, including for example within a range of at least 20% and not greater than 95% of the average thickness, or within range including at least 50% not greater than 95% of the average thickness of the body 201.

In still another non-limiting embodiment, the tip edge length 233 may have a particular relationship to the width of the body 201. In one instance, the tip edge length 233 may be less than an average width of the body 201. According to one non-limiting example, the tip edge length 233 can be not greater than 99% of the average width of the body 201, such as not greater than 95% or not greater than 90% or not greater than 85% or not greater than 80% or not greater than 75% or not greater than 70% or not greater than 60% or not greater than 50% or not greater than 40% or not greater than 30% of the average width of the body 201. Still, in another embodiment non-limiting embodiment, the tip edge length 233 may be at least 0.1% of the average width of the body 201, such as at least 30% or at least 40% or at least 50% or at least 60% or at least 70% or at least 80% or at least 90% or at least 95% of the average width of the body 201. It will be appreciated that the tip edge length 233 can be within range including any of the minimum and maximum percentages noted above, including for example within a range of at least 20% and not greater than 95% of the average width, or within range including at least 50% not greater than 95% of the average width of the body 201. Still, in another non-limiting embodiment, the tip edge length 233 may be substantially similar to the width average width of the body 201.

In accordance with one aspect, the tip region 210 may be defined by a taper including a reduction in the width and/or thickness of the body 201 in the tip region 210. In accordance with one embodiment, the tip region 210 can include a reduction in the width of the body 201 in the tip region 210. In another non-limiting embodiment, the tip region 210 can include a reduction in the thickness of the body 201 in the tip region 210. In another alternative embodiment, the tip region 210 may be defined by a taper including a reduction in the width and thickness of the body 201 in the tip region 210. Still, in another embodiment, the tip region 210 can be defined by taper including a change in the width of the body that is greater than a change in the thickness of the body 201 in the tip region 210. For another embodiment, the tip region 210 can be defined by taper including a change in the thickness of the body that is greater than a change in the width of the body 201 in the tip region 210. According to one non-limiting embodiment, the tip region 210 can be defined by a taper including a change in the thickness of the body 201 and where the average width is substantially the same throughout the tip region 210. For at least one other non-limiting embodiment, the tip region 210 can be defined by a taper including a change in the width of the body 201 and where the average thickness may be substantially the same throughout the tip region 210.

In certain non-limiting embodiments, the tip region 210 may have a tip region length that is not greater than 90% of the length of the body 201, such as not greater than 80% or not greater than 70% or not greater than 60% or not greater than 50% or not greater than 40% or not greater than 30% or not greater than 20% or not greater than 10% or not greater than 5% of the total average length of the body. In still another non-limiting embodiment, the tip region can have a tip region length of at least 5% of the length of the body 201, such as at least 10% or at least 15% or at least 20% or at least 25% or at least 30% or at least 40%. It will be appreciated that the tip region length can be within a range including any of the minimum and maximum percentages noted above, including for example, but not limited to, within a range of at least 5% and not greater than 90% of the length of the body, or within range including at least 15% and not greater than 50% of the length of the body.

In accordance with another embodiment, the tip region 210 may include an asymmetric taper. An asymmetric taper is defined by one surface having a greater angling or curvature as compared to another surface. In particular instances an asymmetric taper may be characterized by a first surface (e.g., surface 224) of the body having a different contour as compared to another surface (e.g., surface 221, 222, and/or surface 223) of the body. For example, the first surface may have a greater curvature as compared to the second surface. In certain non-limiting embodiments, the second surface may be substantially linear and the first surface may be angled or curved non-parallel relationship relative to the second surface. The first and second surfaces may converge at the tip 211. The first surface may be longer than the second surface in the tip region 210.

In another non-limiting embodiment, the tapered abrasive particles may have a particular taper angle. For example, the surface (e.g., surface 224) with the greatest curvature in the tip region 210 can define a taper angle 252 as the angle between a line a tangent line to point 255 on the surface 224 and a point 251 at the tip 211 furthest from point 255. The point 255 defines the start of the taper region 210 on the surface 224. In accordance with an embodiment, the taper angle 252 can be at least 1 degree, such as at least 5 degrees or at least 8 degrees or at least 10 degrees or at least 15 degrees or at least 20 degrees or at least 25 degrees or at least 30 degrees or at least 40 degrees or at least 45 degrees. In another non-limiting embodiment, the taper angle 252 can be not greater than 90 degrees, such as not greater than 85 degrees or not greater than 80 degrees or not greater than 70 degrees or not greater than 60 degrees or not greater than 50 degrees or not greater than 40 degrees or not greater than 30 degrees. It will be appreciated that the taper angle 252 may be within a range including any of the minimum and maximum values noted above, including for example, but not limited to, within a range including at least 5 degrees and not greater than 90 degrees or at least 5 degrees and not greater than 70 degrees or at least 10 degrees and not greater than 50 degrees. In certain instances, but not all, the taper angle may only be evident in the plane defined by the length and width of the body 201.

As noted herein, each of the tapered abrasive particles may include a base region 212 at an opposite end of the body 201 from the tip region 210. The base region 212 may include a base 214. In accordance with an embodiment, the base 214 can include a projection 215 extending from the body 201. More particularly, the projection 215 may extend from the body 201 in a direction away from the longitudinal axis 280. In particular instances, the projection 215 may extend away from the tip 211. In some embodiments, but not all, the projection 215 may only be evident in a view of the particle from a plane defined by the length and width of the body 201.

In one aspect, the body 201 of the tapered abrasive particle may have a base angle 261 that can define the angle at which the protrusion extends from the body 201. The base angle 261 can be the angle between the surface 224 of the body 201 and a surface 262 extending from exterior corner 217 of a base surface 216. In one non-limiting embodiment, the base angle 261 may be an obtuse angle. For example, the base angle 261 can be at least 91 degrees, such as at least 92 degrees or at least 93 degrees or at least 94 degrees or at least 95 degrees or at least 97 degrees or at least 99 degrees or at least 105 degrees or at least 110 degrees or at least 120 degrees or at least 130 degrees or at least 140 degrees. In another non-limiting embodiment, the base angle 261 may be not greater than 180 degrees, such as not greater than 178 degrees or not greater than 170 degrees or not greater than 160 degrees or not greater than 150 degrees. It will be appreciated that the base angle 261 can be within a range including the minimum and maximum values noted above.

In another non-limiting embodiment, the base 214 can include a projection 215 having a projection length (Lp). The projection length may be the length of the longest side of the projection 215 in the base region 212 excluding the base surface 216. For example, as illustrated in FIG. 2B, the projection length can be measured as the length of the surface 264. In one non-limiting embodiment, the length of the surface 264 can be measured from the exterior corner 218. In one non-limiting embodiment, the projection length (Lp) can be less than the average length (L) of the body 201. In certain instances, the projection length (Lp) may be not greater than 90% of the average length of the body 201, such as not greater than 80% or not greater than 70% or not greater than 60% or not greater than 50% or not greater than 40% or not greater than 30% or not greater than 20% or not greater than 10% or not greater than 5% of the average length (L) of the body 201. In another non-limiting embodiment, the projection length (Lp) can be at least 1% of an average length (L) of the body 201, such as at least 3% or at least 5% or at least 8% or at least 10% or at least 15% of the total average length (L) of the body 201. It will be appreciated that the projection length (Lp) can be within a range including any of the minimum and maximum percentages noted above.

Another non-limiting embodiment, the base 214 can include a base surface 216. The base surface 216 may extend between exterior corners 217 and 218. The exterior corner 217 may be a corner between the base surface 216 and surface 224, wherein surface 224 in some instances can be the most curved surface in the tip region 210. The exterior corner 217 may be an upper corner 217 and the exterior corner 218 may be a lower corner 218 spaced apart from the upper corner across the length of the base surface 216. In one embodiment, the exterior corner 218 may be a corner on the base 214 furthest from the tip 211. In another embodiment, the exterior corner 218 may be a corner on the base 214 closer to the longitudinal axis 280 as compared to the exterior corner 217.

In one non-limiting embodiment, the exterior corner 217 can have a corner radius less than a corner radius of the tip 211. Still, in another embodiment, the exterior corner 218 can have a corner radius less than a corner radius of the tip 211.

In yet another embodiment, the base surface 216 can extend at an angle relative to the longitudinal axis 280 of the body 201. For example, the base surface 216 may be angled relative to a longitudinal axis 280 to define a base surface angle 237. In one embodiment, the base surface angle 237 may be an acute angle. According to a non-limiting embodiment, the base surface angle 237 can be not greater than 90 degrees, such as not greater than 88 degrees or not greater than 86 degrees or not greater than 84 degrees or not greater than 82 degrees or not greater than 80 degrees or not greater than 75 degrees or not greater than 70 degrees or not greater than 65 degrees or not greater than 60 degrees or not greater than 55 degrees or not greater than 50 degrees or not greater than 45 degrees or not greater than 40 degrees. In another non-limiting embodiment, the base surface angle 237 may be at least 5 degrees, such as at least 10 degrees or at least 15 degrees or at least 20 degrees or at least 25 degrees or at least 30 degrees or at least 35 degrees or at least 40 degrees or at least 45 degrees or at least 50 degrees or at least 55 degrees. It will be appreciated that the base surface angle 237 can be within a range including any of the minimum and maximum values noted above.

In another embodiment, the base region 212 can have a primary peak angle 238 at the exterior corner 218 between the base surface 216 and the surface 264. In one aspect, the primary peak angle 238 can be at least 45 degrees and not greater than 150 degrees as viewed in the plane define by the length and the width of the body 201. According to one embodiment, the primary peak angle 238 can be at least 50 degrees, such as at least 55 or at least 60 degrees or at least 65 degrees or at least 70 degrees or at least 75 degrees or at least 80 degrees or at least 85 degrees or at least 90 degrees or at least 95 degrees or at least 100 degrees. In another non-limiting embodiment, the primary peak angle 238 can be not greater than 145 degrees or not greater than 140 degrees or not greater than 135 degrees or not greater than 130 degrees or not greater than 125 degrees or not greater than 120 degrees or not greater than 115 degrees or not greater than 110 degrees or not greater than 100 degrees or not greater than 95 degrees. It will be appreciated that the primary peak angle 238 can be within a range including any of the minimum and maximum values noted above.

According to another embodiment, the exterior corner 218 can define a primary peak as viewed in a plane defined by the length and width of the body 201. According to one embodiment, the primary peak can have a tip sharpness, which can be measured by the primary peak angle 238, that is less than a tip sharpness of the tip 211 of the body 201, which may also be measured by a tip angle 277 at the point 251 on the tip 211 of the body 201. According to one particular embodiment, the primary peak angle 238 can be at least 5% less than the tip angle 277, such as at least 8% less or at least 10% less or at least 12% less or at least 15% less or at least 20% less or at least 25% less or at least 30% less or at least 40% less or at least 50% less or at least 60% less or at least 70% less or at least 80% less or at least 90% less. In one non-limiting embodiment, the primary peak angle 238 can be at not greater than 99% less than the tip angle 277, such as not greater than 95% less or not greater than 90% less or not greater than 80% less or not greater than 60% less or not greater than 40% less. It will be appreciated that the primary peak angle 238 can be less than the tip angle 277 within a range of any of the minimum and maximum percentages noted above.

In another aspect, it was unexpected that the base region 212 would have at least one or more sharper tips as compared to the tip region 210. This is particular notable because the base region 212 can generally include a greater volume of material than the tip region 210 based on the cross-sectional area of the base region 212 as compared to the tip region 210.

In one non-limiting aspect, the base surface 218 may have a particular surface morphology, which may facilitate unexpected and improved performance. In accordance with one embodiment, the base surface 218 can include at least one peak 233, such as a plurality of peaks 233 extending from the base surface 218. In another embodiment, the base surface 218 may include at least one valley 234, such as a plurality of valleys 234 extending between the plurality of peaks 233 across at least a portion of the base surface 218. In accordance with another non-limiting embodiment, the plurality of peaks 233 and valleys 234 may be randomly disposed on the base surface 218.

In some instances, but not all, the base surface 218 may have a surface roughness that is different than a surface roughness of at least one of the surfaces (221-224) of the body 201. In one embodiment, the base surface 218 may have a surface roughness that is greater than a surface roughness of a side surface of the body (221-224) in the tip region 210 or the elongated region 240 of the body 201.

In accordance with another embodiment, the base surface 218 may include at least one peak of the plurality of peaks 233 having a tip radius less than a tip radius of the tip 211 of the body 201. Still, in another non-limiting embodiment, the base surface 218 may include at least two peaks of the plurality of peaks 233 having a tip radius less than a tip radius of the tip 211 of the body 201.

In certain tapered abrasive particles of the embodiments herein, the base region 212 may include a first peak 235 and a second peak 236 as viewed in two dimensions defined by a plane of the length and thickness of the body 201, as provided in FIGS. 2D and 2E. In one non-limiting embodiment, the first peak 235 and second peak 236 may be separated from each other by a first valley 239.

According to another non-limiting aspect, the base surface 216 can include one or more facets 241. The facets 241 define regions on the base surface that are substantially planar. In particular instances, the facets 241 may extend between the plurality of peaks 233 and values 234 of the base surface 215. In some instances, the base surface 218 may include at least two facets that are abutting each other and define a common edge extending between the two facets.

As noted herein, the tapered abrasive particles of certain embodiments may include a tip region 210, a base region 212 and elongated region 240 disposed between the tip region 210 and the base region 212. More specifically, the elongated region 240 can extend between the tip region 210 and the base region 212. In one non-limiting embodiment, the elongated region 240 between the tip region 210 and the base region 212 having a substantially constant width. For example, in one embodiment the elongated region 240 may have a change in width of not greater than 10% over the length of the elongated region 240, such as not greater than 8% or not greater than 5% or not greater than 3%. In at least one embodiment, the elongated region 240 may have a change in width of at least 0.5%, such as least 1% or at least 2% over the length of the elongated region 240. It will be appreciated that the change in the width of the body 201 in the elongated region 240 may be within a range including any of the minimum and maximum percentages noted above.

In another embodiment, the elongated region 240 may have a change in thickness of not greater than 10% over the length of the elongated region 240, such as not greater than 8% or not greater than 5% or not greater than 3%. In at least one embodiment, the elongated region 240 may have a change in thickness of at least 0.5%, such as least 1% or at least 2% over the length of the elongated region 240. It will be appreciated that the change in the thickness of the body 201 in the elongated region 240 may be within a range including any of the minimum and maximum percentages noted above.

In other instances, the tapered abrasive particles may have other features. For example, in some instances, the body may include striations 271. Such striations may be present on at least one of the surfaces, such as surfaces 221-224. More particularly, the striations 271 may be present on at least a portion of all of the side surfaces 222-224. In another non-limiting embodiment, the striations 271 may extend in a direction of the length of the body 201. In still another embodiment, the striations 271 may extend over a majority of the surface area of at least one or more surfaces 221-224. According to one particular embodiment, the striations 271 extend over a majority of the surface area of all of the surfaces 221-224.

According to one embodiment, the body 201 of the tapered abrasive particles may have a particular primary aspect ratio (length/width) that may result from the disclosed forming process and may also facilitate certain features and/or improved performance. In one aspect, the tapered abrasive particles may have a primary aspect ratio of (length/width) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. In another non-limiting embodiment, the body 201 can have a primary aspect ratio of length:width of not greater than 1000 or not greater than 100 or not greater than 50 or not greater than 20 or not greater than 10 or not greater than 5 or not greater than 3 or not greater than 2.8. It will be appreciated that the primary aspect ratio of the body 201 can be with a range including any of the minimum and maximum ratios noted above. Furthermore, it will be appreciated that the primary aspect ratio may represent a primary aspect ratio of a single tapered abrasive particle or an average of a plurality of tapered abrasive particles.

Figure 10:
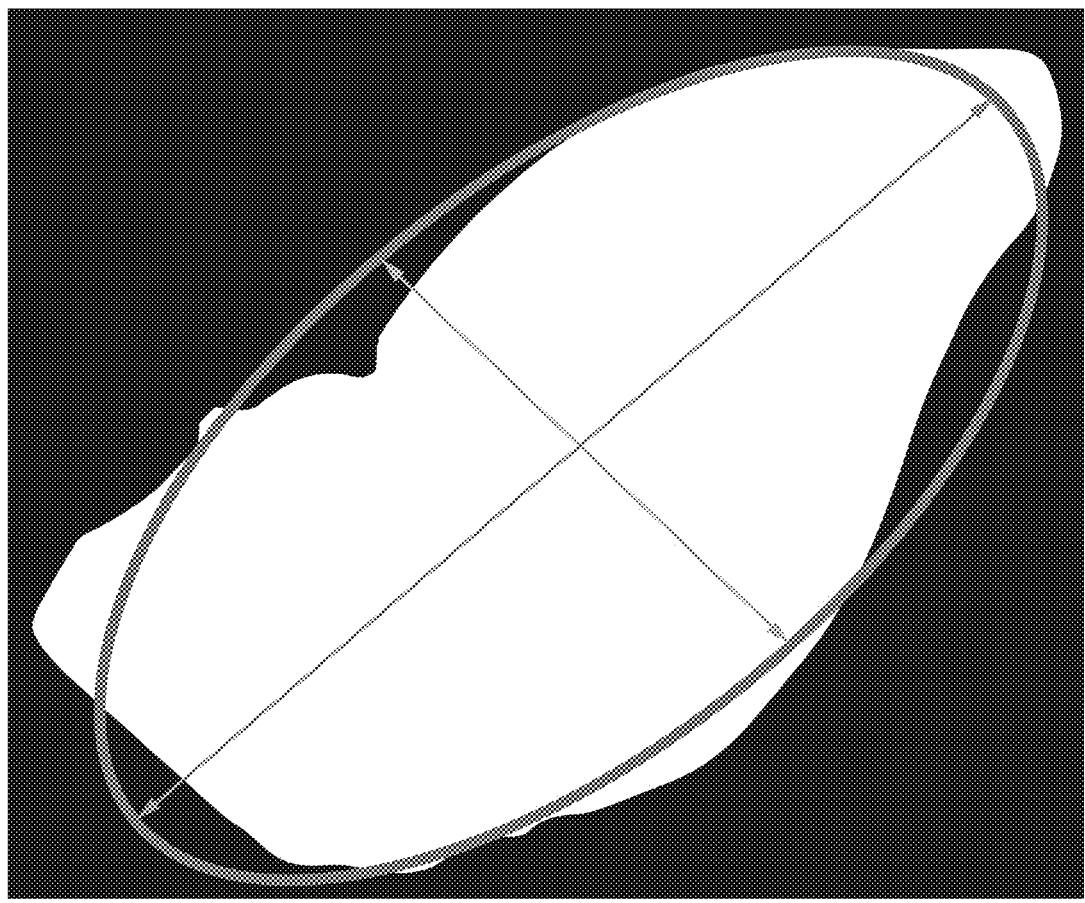
FIG. 10 includes an illustration of a best-fit ellipse on a tapered abrasive particle according to an embodiment.

All aspect ratios of the embodiments herein are measured by image processing. A plurality of tapered abrasive particles are mounted and set on a stage for imaging. Imaging may be completed via an optical microscope such as a DSX 700 Olympus at a suitable magnification, such as 2X-8X. After taking a suitable image of a suitable statistically relevant sample size of the particles (e.g., at least 200 particles), the image (RGB color or grayscale) is saved as a representative image of the particle's length and width dimensions. See, for example, FIG. 10. The particles are then rotated 90 degrees around the longitudinal axis, such that the dimension of the thickness of each of the particles is visible. An image of the particles is taken and saved as relevant to each particles thickness. The lengths, widths, and thicknesses for each of the particles are measured and the average length, width, and thickness is calculated from the images by image processing software (e.g., ImageJ). For the first picture of the particles in the plane of the length and width, the image is converted to a black and white image via Otsu's method where the white pixels represent the body of the particle. From the black and white image, a best fit ellipse is fit around each of the images of the particles. A best fit ellipse is generated so that the second-moment of the region is preserved. The perpendicular axes of the ellipse (i.e., major axis and minor axis) are used for the length and width, wherein the longer axis represents the length and the shorter axis represents the width or thickness depending upon the plane of the image. The major axis, which defines the length, is defined as the axis on which the foci of the fitted ellipse are presented. The minor axis, which defines the width of the body, is perpendicular to the major axis of the fitted ellipse. The average length and average width are calculated from this image for the plurality of particles. FIG. 10 includes an image of a tapered abrasive particle in the plane of length and width, wherein a best-fit ellipse is fitted on the image. The average thickness of the particles is measured in the same manner using the image of the particles in the dimension of length and thickness. The image is altered to a black and white only image, a best fit ellipse is created around each image of each particle and the thickness is measured as the value of the shortest axis of the ellipse. The average thickness is calculated from all of the measured thickness values. The primary, secondary, and tertiary standard deviations are also calculated from the measured length, width, and thickness values.

In another aspect, the tapered abrasive particles may have a particular primary aspect ratio standard deviation that is distinct from other abrasive particles, particularly elongated shaped abrasive particles that may be formed by particular process, including but not limited to, extrusion. According to one embodiment, the body 201 can have a primary aspect ratio standard deviation [STDEV(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15. Still, in another non-limiting embodiment, the primary aspect ratio standard deviation [STDEV(length/width)] may be at least 0.01 or at least 0.05 or at least 0.1 or at least 0.15 or at least 0.2 or at least 0.25 or at least 0.30 or at least 0.35 or at least 0.4. It will be appreciated that the primary aspect ratio standard deviation of the body 201 can be with a range including any of the minimum and maximum ratios noted above. Furthermore, it will be appreciated that the primary aspect ratio may represent a primary aspect ratio of a single tapered abrasive particle or an average of a plurality of tapered abrasive particles.

According to one embodiment, the body 201 of the tapered abrasive particles may have a particular secondary aspect ratio (length/thickness) that may result from the disclosed forming process and may also facilitate certain features and/or improved performance. In one non-limiting embodiment, the body 201 can have a secondary aspect ratio of length/thickness that can be at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. Still, in another non-limiting embodiment, the secondary aspect ratio (length/thickness) may be not greater than 1000 or not greater than 100 or not greater than 50 or not greater than 20 or not greater than 10 or not greater than 5 or not greater than 3 or not greater than 2.8. It will be appreciated the secondary aspect ratio of length/thickness can be with a range including any of the minimum and maximum ratios of above. Furthermore, it will be appreciated that the secondary aspect ratio may represent a secondary aspect ratio of a single tapered abrasive particle or an average of a plurality of tapered abrasive particles.

In another aspect, the tapered abrasive particles may have a particular secondary aspect ratio standard deviation that is distinct from other abrasive particles, particularly elongated shaped abrasive particles that may be formed by particular process, including but not limited to, extrusion. According to one embodiment, the body 201 can have a secondary aspect ratio standard deviation [STDEV(length/thickness)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the secondary aspect ratio standard deviation [STDEV(length/thickness)] may be at least 0.01 or at least 0.05 or at least 0.07 or at least 0.1 or at least 0.15 or at least 0.2 or at least 0.25 or at least 0.30 or at least 0.35 or at least 0.4. It will be appreciated that the secondary aspect ratio standard deviation of the body 201 can be with a range including any of the minimum and maximum ratios noted above. Furthermore, it will be appreciated that the secondary aspect ratio may represent a secondary aspect ratio of a single tapered abrasive particle or an average of a plurality of tapered abrasive particles.

According to one embodiment, the body 201 of the tapered abrasive particles may have a particular tertiary aspect ratio (width/thickness) that may result from the disclosed forming process and may also facilitate certain features and/or improved performance. In another embodiment, the body 201 can have a tertiary aspect ratio (width/thickness) of at least 0.5, such as at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4. In another non-limiting embodiment, the tertiary aspect ratio (width/thickness) can be not greater than 10, such as not greater than 8 or not greater than 5 or not greater than 3 or not greater than 2 or not greater than 1.5 or not greater than 1.3 or not greater than 1.1. It will be appreciated that the tertiary aspect ratio can be with a range including any of the minimum and maximum ratios noted above. Furthermore, it will be appreciated that the tertiary aspect ratio may represent a tertiary aspect ratio of a single tapered abrasive particle or an average of a plurality of tapered abrasive particles.

In another aspect, the tapered abrasive particles may have a particular tertiary aspect ratio standard deviation that is distinct from other abrasive particles, particularly elongated shaped abrasive particles that may be formed by particular process, including but not limited to, extrusion. According to one embodiment, the body 201 can have a tertiary aspect ratio standard deviation [STDEV(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the tertiary aspect ratio standard deviation [STDEV(width/thickness)] is at least 0.01 or at least 0.05 or at least 0.07 or at least 0.1 or at least 0.15 or at least 0.2 or at least 0.25 or at least 0.30 or at least 0.35 or at least 0.4. It will be appreciated that the tertiary aspect ratio standard deviation of the body 201 can be with a range including any of the minimum and maximum ratios noted above. Furthermore, it will be appreciated that the tertiary aspect ratio may represent a secondary aspect ratio of a single tapered abrasive particle or an average of a plurality of tapered abrasive particles.

In certain instances, the plurality of abrasive particles may include only tapered abrasive particles or a blend of tapered abrasive particles with particles of a different shape. The plurality of abrasive particles may have particular "batch" features as described in embodiments herein. According to one aspect, the plurality of abrasive particles can have particular batch aspect ratios and batch aspect ratio standard deviations that may result from the processes disclosed herein and may further facilitate improved performance. In one non-limiting embodiment, the plurality of abrasive particles may have a primary batch aspect ratio [B(length/width)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. In another non-limiting embodiment, the primary batch aspect ratio [B(length/width)] may be not greater than 1000 or not greater than 100 or not greater than 50 or not greater than 20 or not greater than 10 or not greater than 5 or not greater than 3 or not greater than 2.8. It will be appreciated that the primary batch aspect ratio can be with a range including any of the minimum and maximum ratios noted above. The batch aspect ratios and aspect ratio standard deviations are measured in the same manner as provided above with respect to the aspect ratio and aspect ratio standard deviations for the tapered abrasive particles.

In another aspect, the plurality of abrasive particles may have a particular primary batch aspect ratio standard deviation that is distinct from other abrasive particles, particularly elongated shaped abrasive particles that may be formed by particular process, including but not limited to, extrusion. According to one embodiment, the plurality of particles can have a primary batch aspect ratio standard deviation [STDEV-B(length/width)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15. Still, in another non-limiting embodiment, the primary batch aspect ratio standard deviation [STDEV-B(length/width)] can be at least 0.01 or at least 0.05 or at least 0.1 or at least 0.15 or at least 0.2 or at least 0.25 or at least 0.30 or at least 0.35 or at least 0.4. It will be appreciated that the primary batch aspect ratio standard deviation can be with a range including any of the minimum and maximum ratios noted above.

In one non-limiting embodiment, the plurality of abrasive particles may have a secondary batch aspect ratio [B(length/thickness)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. In another non-limiting embodiment, the secondary batch aspect ratio [B(length/thickness)] may be not greater than 1000 or not greater than 100 or not greater than 50 or not greater than 20 or not greater than 10 or not greater than 5 or not greater than 3 or not greater than 2.8. It will be appreciated that the secondary batch aspect ratio can be with a range including any of the minimum and maximum ratios noted above.

In another aspect, the plurality of abrasive particles may have a particular secondary batch aspect ratio standard deviation that is distinct from other abrasive particles. According to one embodiment, the plurality of particles can have a secondary batch aspect ratio standard deviation [STDEV-B(length/thickness)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the secondary batch aspect ratio standard deviation [STDEV-B(length/thickness)] can be at least 0.01 or at least 0.05 or at least 0.07 or at least 0.1 or at least 0.15 or at least 0.2 or at least 0.25 or at least 0.30 or at least 0.35 or at least 0.4. It will be appreciated that the secondary batch aspect ratio standard deviation can be with a range including any of the minimum and maximum ratios noted above.

In one non-limiting embodiment, the plurality of abrasive particles may have a tertiary batch aspect ratio [B(width/thickness)] of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4. In another non-limiting embodiment, the tertiary batch aspect ratio [B(width/thickness)] may be not greater than 10 or not greater than 8 or not greater than 5 or not greater than 3 or not greater than 2 or not greater than 1.5 or not greater than 1.3 or not greater than 1.1. It will be appreciated that the tertiary batch aspect ratio can be with a range including any of the minimum and maximum ratios noted above.

In another aspect, the plurality of abrasive particles may have a particular tertiary batch aspect ratio standard deviation that is distinct from other abrasive particles. According to one embodiment, the plurality of particles can have a tertiary batch aspect ratio standard deviation [STDEV-B(width/thickness)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the tertiary batch aspect ratio standard deviation [STDEV-B(width/thickness)] can be at least 0.01 or at least 0.05 or at least 0.07 or at least 0.1 or at least 0.15 or at least 0.2 or at least 0.25 or at least 0.30 or at least 0.35 or at least 0.4. It will be appreciated that the tertiary batch aspect ratio standard deviation can be with a range including any of the minimum and maximum ratios noted above.

The tapered abrasive particles of the embodiments herein can have a body including a crystalline material, and more particularly, a polycrystalline material. Notably, the polycrystalline material can include abrasive grains (i.e., crystallites). In one embodiment, the body of the tapered abrasive particle can be essentially free of an organic material, including for example, a binder. In at least one embodiment, the tapered abrasive particles can consist essentially of a polycrystalline material.

The abrasive grains (i.e., crystallites) contained within the body 201 of the tapered abrasive particles may have an average grain size that is generally not greater than 20 microns, such as not greater than 18 microns or not greater than 16 microns or not greater than 14 microns or not greater than 12 microns or not greater than 10 microns or not greater than 8 micron or not greater than 5 microns or not greater than 2 microns or not greater than 1 micron or not greater than 0.9 microns or not greater than 0.8 microns or not greater than 0.7 microns or even not greater than 0.6 microns or even not greater than 0.2 microns. Still, the average grain size of the abrasive grains contained within the body of the tapered abrasive particles can be at least 0.01 microns, such as at least 0.05 microns or at least 0.06 microns or at least 0.07 microns or at least 0.08 microns or at least 0.09 microns or at least 0.1 microns or at least 0.12 microns or at least 0.15 microns or at least 0.17 microns or at least 0.2 microns or even at least 0.5 microns. It will be appreciated that the abrasive grains can have an average grain size within a range including any of the minimum and maximum values noted above. The average grain size can be calculated using the uncorrected intercept method as known to those of skill in the art.

In accordance with an embodiment, the body 201 of the tapered abrasive particle can have an average particle size, as measured by the largest dimension measurable on the body (i.e., the length), of at least 100 microns. In fact, the body 201 of the tapered abrasive particle can have an average particle size of at least 150 microns, such as at least 200 microns or at least 300 microns or at least 400 microns or at least 500 microns or at least 500 microns or at least 600 microns or at least 800 microns or even at least 900 microns. Still, the body 201 of the tapered abrasive particle can have an average particle size that is not greater than 5 mm, such as not greater than 3 mm or not greater than 2 mm or even not greater than 1.5 mm. It will be appreciated that the body of the tapered abrasive particle can have an average particle size within a range including any of the minimum and maximum values noted above.

Particles for use in the abrasives industry are generally graded to a given particle size distribution before use. Such distributions typically have a range of particle sizes, from coarse particles to fine particles. In the abrasive art, this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, PI 80, P220, P320, P400, P500, P600, P800, P1000, and P1000. JIS grade designations include JIS8, JIS12, JIS 16, JIS24, JIS36, JIS46, JIS54, JIS60, JIS80, JIS 100, JIS150, JIS180, JIS220, JIS240, JIS280, JIS320, JIS360, JIS400, JIS600, JIS800, JIS 1000, JIS 1500, JIS2500, JIS4000, JIS6000, JIS8000, and JIS10,000. Alternatively, the abrasive particles can be graded to a nominal screened grade using U.S.A. Standard Test Sieves conforming to ASTM E-1 1 "Standard Specification for Wire Cloth and Sieves for Testing Purposes." ASTM E-1 1 prescribes the requirements for the design and construction of testing sieves using a medium of woven wire cloth mounted in a frame for the classification of materials according to a designated particle size. A typical designation may be represented as −18+20 meaning that the particles pass through a test sieve meeting ASTM E-1 1 specifications for the number 18 sieve and are retained on a test sieve meeting ASTM E-1 1 specifications for the number 20 sieve. In various embodiments, the particulate material can have a nominal screened grade comprising: −18+20, −20/+25, −25+30, −30+35, −35+40, −40+45, −45+50, −50+60, −60+ 70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100. The body of the particulate material may be in the form of a shaped abrasive particle, as described in more detail herein.

Some suitable materials for use in the body 201 of the tapered abrasive particles can include a ceramic material, including but not limited to, nitrides, oxides, carbides, borides, oxynitrides, oxyborides, oxycarbides, carbon-based materials, diamond, naturally occurring minerals, rare-earth-containing materials, natural minerals, synthetic materials, or any combination thereof. In particular instances, the tapered abrasive particles can include an oxide compound, such as aluminum oxide, zirconium oxide, titanium oxide, yttrium oxide, chromium oxide, strontium oxide, silicon oxide, magnesium oxide, rare-earth oxides, or any combination thereof.

In one particular embodiment, the body 201 can include at least 95 wt % alumina for the total weight of the body 201. Still, in certain instances, the body can include not greater than 99.5 wt % alumina for the total weight of the body. In at least one embodiment, the body 201 can consist essentially of alumina, and more particularly, consist essentially of alpha alumina. In certain instances, the body 201 may be formed such that it includes not greater than about 1 wt % of any low-temperature alumina phases. As used herein, low temperature alumina phases can include transition phase aluminas, bauxites or hydrated alumina, including for example gibbsite, boehmite, diaspore, and mixtures containing such compounds and minerals. Certain low temperature alumina materials may also include some content of iron oxide. Moreover, low temperature alumina phases may include other minerals, such as goethite, hematite, kaolinite, and anastase.

Moreover, in particular instances, the body 201 of the tapered abrasive particles can be formed from a seeded sol-gel. In at least one embodiment, the body of any of the tapered abrasive particles of the embodiments herein may be essentially free of iron, rare-earth oxides, and a combination thereof. Reference herein to a body having a certain features (e.g., composition) will also be understood to refer to a batch of tapered abrasive particles that can have the same feature (e.g., composition).

In accordance with certain embodiments, certain tapered abrasive particles can be compositional composites, such that at least two different types of grains are contained within the body of the tapered abrasive particle. It will be appreciated that different types of grains are crystallite grains having different compositions with regard to each other. For example, the body of the tapered abrasive particle can be formed such that it includes at least two different types of grains, wherein the types of grains are selected from the group of nitrides, oxides, carbides, borides, oxynitrides, oxyborides, oxycarbides, carbon-based materials, diamond, naturally occurring minerals, rare-earth-containing materials, natural minerals, synthetic materials, and a combination thereof.

The body 201 of the tapered abrasive particles may include additives, such as dopants, which may be in the form of elements or compounds (e.g., oxides). Certain suitable additives can include any of the materials described herein. The body of a tapered abrasive particle may include a specific content of one or more additives (e.g., dopant). For example, the body may include not greater than about 30 wt % additives for the total weight of the body. In still other embodiments, the amount of additives may be less, such as not greater than about 25 wt % or not greater than about 20 wt % or not greater than about 18 wt % or not greater than about 15 wt % or not greater than about 12 wt % or not greater than about 10 wt % or not greater than about 8 wt % or not greater than about 5 wt % or not greater than about 2 wt %. Still, the amount of additives can be at least about 0.5 wt % for a total weight of the body, such as at least about 1 wt %, at least about 2 wt % or at least about 3 wt % or at least about 4 wt % or at least about 5 wt % or at least about 8 wt % or even at least about 10 wt %. It will be appreciated that the amount of additive within the body may be within a range including any of the minimum and maximum percentages noted above.

The body of the tapered abrasive particle may be particularly dense. For example, the body may have a density of at least about 95% theoretical density, such as at least about 96% or at least 97% or at least 98% or at least 99% theoretical density.

The tapered abrasive particles of the embodiments herein are a particular type of shaped abrasive particle. Shaped abrasive particles may be formed through particular processes, including molding, printing, casting, extrusion, and the like. Shaped abrasive particles can be formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height abrasive particles (CHAPs) can also be formed through particular processes that facilitate formation of thin-shaped bodies that can have irregular two-dimensional shapes when viewing the major surface top-down. CHAPs can have less shape fidelity than shaped abrasive particles, but can have substantially planar and parallel major surfaces separated by a side surface.

By contrast, non-shaped particles can be formed through different processes and have different shape attributes compared to shaped abrasive particles and CHAPs. For example, non-shaped particles are typically formed by a comminution process wherein a mass of material is formed and then crushed and sieved to obtain abrasive particles of a certain size. However, a non-shaped particle will have a generally random arrangement of surfaces and edges, and generally will lack any recognizable two-dimensional or three dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles.

Figure 3:
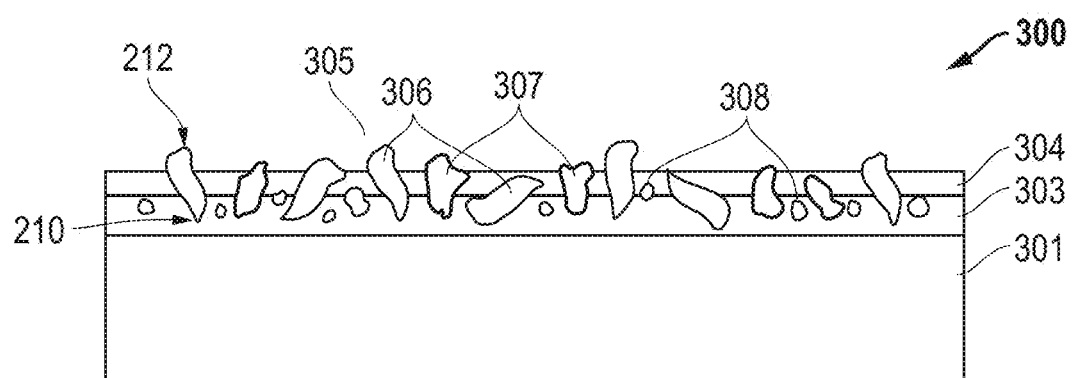
FIG. 3 includes a cross-sectional illustration of a portion of a coated abrasive article according to an embodiment.

FIG. 3 includes a cross-sectional illustration of a coated abrasive article incorporating the tapered abrasive particles in accordance with an embodiment. As illustrated, the coated abrasive 300 can include a substrate 301 and a make coat 303 overlying a surface of the substrate 301. In one particular embodiment, the coated abrasive 300 can further include a plurality of abrasive particles 305. The plurality of abrasive particles 305 may include, but need not necessarily include, different types of abrasive particles. For example, the plurality of abrasive particles 305 may include a first type of abrasive particle 406 (e.g., tapered abrasive particles), a second type of abrasive particle 307 (e.g., unshaped or irregular abrasive particles), and optionally a third type of abrasive particle 308 (e.g., diluent abrasive particles), which may have a random shape. The coated abrasive 300 may further include size coat 304 overlying and bonded to the plurality of abrasive particles 305 and the make coat 303.

According to one embodiment, the substrate 301 can include an organic material, inorganic material, and a combination thereof. In certain instances, the substrate 301 can include a woven material. However, the substrate 301 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 303 can be applied to the surface of the substrate 301 in a single process, or alternatively, the plurality of abrasive particles 305 can be combined with a make coat 303 material and applied as a mixture to the surface of the substrate 301. Suitable materials of the make coat 303 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 303 can include a polyester resin. The coated substrate can then be heated in order to cure the resin and the abrasive particulate material to the substrate. In general, the coated substrate 301 can be heated to a temperature of between about 100° C. to less than about 250° C. during this curing process.

Moreover, it will be appreciated that the coated abrasive article 300 can include one or more types of abrasive particles in the plurality of abrasive particles 305. The different types of abrasive particles can differ from each other in composition, two-dimensional shape, three-dimensional shape, grain size, particle size, hardness, friability, agglomeration, or any combination thereof. In one embodiment, the coated abrasive article 300 can include different amounts of the different types of abrasive particles depending upon the application. It will be appreciated that in some embodiments the coated abrasive may not necessarily include different types of shaped abrasive particles and can consist essentially of a single type of shaped abrasive particle.

According to one particular embodiment, the plurality of abrasive particles 305 may include a limited content of agglomerated particles, and more particularly, a limited content of agglomerated tapered particles. Some agglomerates of tapered abrasive particles may be joined or sinter-bonded to each other. In one aspect, the plurality of abrasive particles 305 may include not greater than 50% of agglomerated particles for a total count of particles in the plurality of abrasive particles 305, such as not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 6% or not greater than 4% or not greater than 2%. In one particular embodiment, the plurality of abrasive particles 305 can be free of agglomerated particles, and more particularly, tapered abrasive particles that are joined or sinter-bonded to each other. Notably, in certain conventional fixed abrasive articles including shaped abrasive particles, the fixed abrasive particles may agglomerate in the form of "twins" or "triplets" which are particles that are sintered to each other. The processes herein may facilitate formation of batches of abrasive particles and fixed abrasives including a plurality of abrasive particles having a limited content of agglomerated particles.

Figure 4:
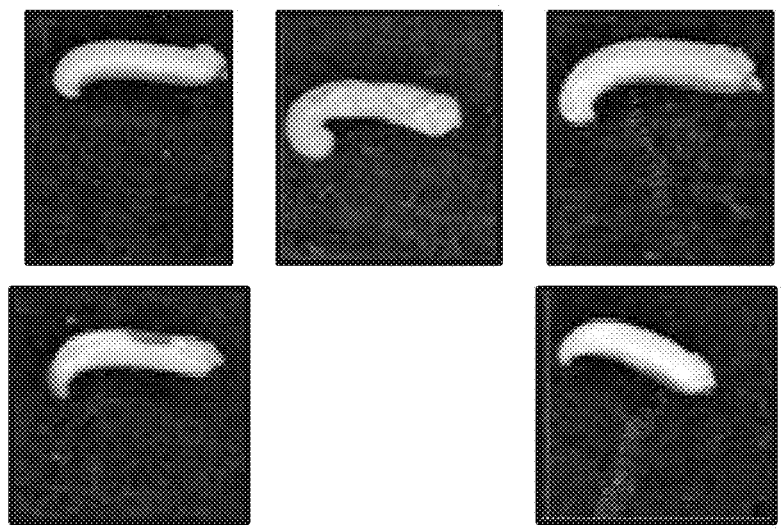
FIG. 4 includes images of various hook-shaped abrasive particles.

Furthermore, in one embodiment, the plurality of abrasive particles 305 may include a limited content of hook-shaped abrasive particles. Hook shaped abrasive particles may include extruded, hook-shaped abrasive particles. Hook-shaped abrasive particles are characterized by at least one end of the body that curls significantly back toward the particle to be characterized as a hook-shape. FIG. 4 includes images of various hook-shaped abrasive particles.

Various methods may be used to place the abrasive particles on the backing (i.e., substrate), including for example, but not limited to, projection (e.g., mechanical or electrostatic), gravity feeding, production tools with suitably sized openings to temporarily hold the abrasive particles in a desired orientation until they are transferred to the backing or an adhesive layer, vibration, pick-and-place systems, and the like. Certain methodologies may be more suitable for controlling one or more aspects of the position and/or orientation of the abrasive particles relative to each other and the backing.

According to one particular embodiment, the tapered abrasive particles may have a particular orientation, such as a vertical orientation relative to the substrate 301. As described in other embodiments herein, the tapered abrasive particles 306 can have a tip region 210 and a base region 212 opposite the tip region 210 across the length of the body. In one aspect, a certain content of tapered abrasive particles 306 can be oriented with the tip region 210 closer to the substrate 301 than the base region 212. In at least one embodiment, a greater content of tapered abrasive particles can have their tip regions 210 closer to the substrate 301 than their base regions 212 as compared to the content of tapered abrasive particles with their base regions 212 closer to the substrate 301 than their tip regions 210. According to one particular embodiment, at least 60%, such as at least 70% or at least 80% or at least 90% of the tapered abrasive particles have their tip regions 210 closer to the substrate 301 than their base regions 212.

After sufficiently forming the make coat 303 with the plurality of abrasive particles 305 contained therein, the size coat 304 can be formed to overlie and bond the plurality of abrasive particles 305 to the substrate 301. The size coat 304 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 5:
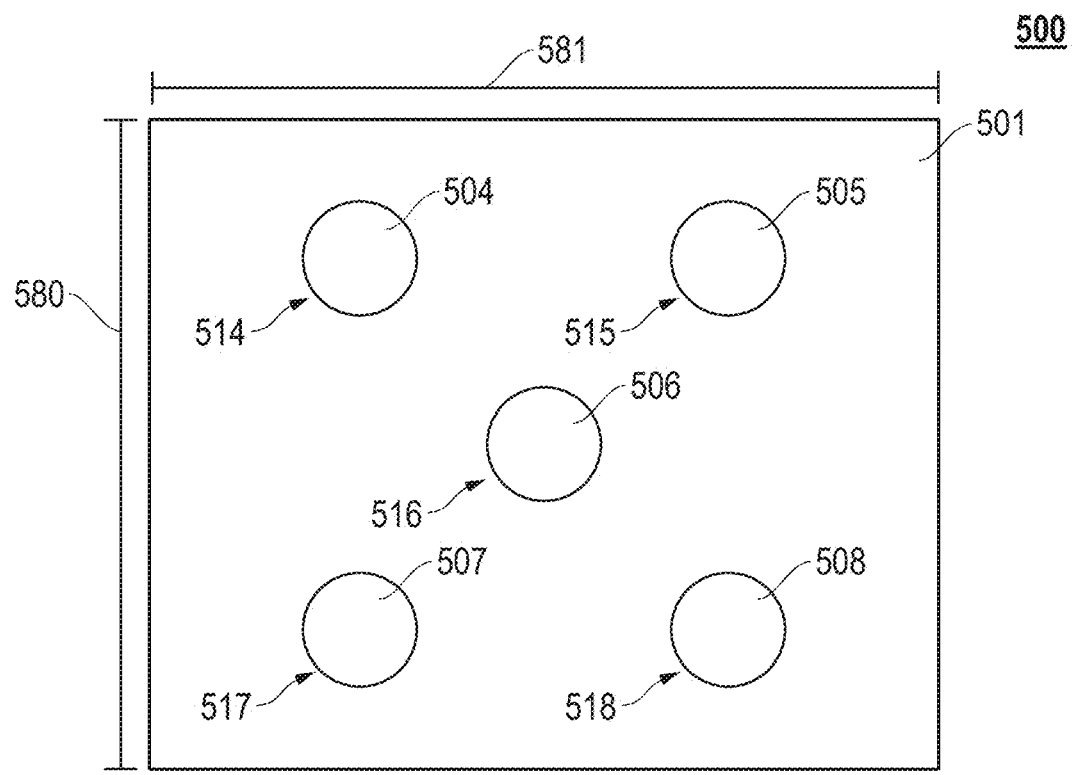
FIG. 5 includes a top-view illustration of a portion of a coated abrasive article according to an embodiment.

FIG. 5 includes a top-view illustration of a portion of a coated abrasive article according to an embodiment. As illustrated, the coated abrasive article 500 can include a backing 501 and a plurality of abrasive particles 503 including tapered abrasive particles 504, 505, 506, 507, and 508 (504-508) overlying the backing 501, and more particularly, coupled to the backing 501. It will be appreciated that the tapered abrasive particles are depicted as circles for ease of reference and not for accuracy of shape. In one embodiment, at least a portion, such as a majority or even all of the plurality of abrasive particles 503 can be placed in predetermined positions on the backing 501. According to one embodiment, the plurality of abrasive particles 503 can have a predetermined position relative to each other. In a particular embodiment, the plurality of abrasive particles 503 may have at least one of a predetermined lateral position, a predetermined longitudinal position, a predetermined radial position, a predetermined rotational orientation, and/or a predetermined tilt angle relative to the backing 501 and relative to each other. In a more particular embodiment, the plurality of abrasive particles 503 may have a combination of two or more of a predetermined lateral position, a predetermined longitudinal position, a predetermined radial position, a predetermined rotational orientation or a predetermined tilt angle relative to the backing 501 and relative to each other.

According to a particular embodiment, each of the tapered abrasive particles 504-508 may be disposed in a predetermined position on the backing 501. For example, each of the tapered abrasive particles 504-508 may have at least one of a predetermined lateral position, a predetermined longitudinal position, a predetermined radial position, and/or a predetermined rotational orientation relative to the backing 501 and relative to each other. In a more particular embodiment, each of the tapered abrasive particles 504-508 may have a combination of two or more of a predetermined lateral position, a predetermined longitudinal position, a predetermined radial position, and/or a predetermined rotational orientation relative to the backing 501 and relative to each other.

According to one aspect, the tapered abrasive particles 504-508 are disposed on predetermined lateral and longitudinal positions on the backing 501. As illustrated in the non-limiting embodiment of FIG. 5, the tapered abrasive particle 504 is disposed at a predetermined position 514, the tapered abrasive particle 505 is disposed at a predetermined position 515, the tapered abrasive particle 506 is disposed at a predetermined position 516, the tapered abrasive particle 507 is disposed at a predetermined position 517, and the tapered abrasive particle 508 is disposed at a predetermined position 518. Each of the predetermined positions 514, 515, 516, 517, and 518 (514-518) define a position on the backing relative to the longitudinal and lateral axes 580 and 581, respectively. The longitudinal axis 580 can extend along and define a length of the backing 501 and a lateral axis 581 can extend along and define a width of a backing 501. The lateral axis 581 can be perpendicular to the longitudinal axis 580 in the plane of the backing 501. It will be appreciated that the spacing between adjacent abrasive particles (e.g., tapered abrasive particles 504-508) can be modified depending upon the content and desired distribution of the abrasive particles. Moreover, it will also be appreciated that such predetermined positions are equally applicable to ellipsoidal backings, which do not necessarily have longitudinal and lateral axes, but have radial axes extending through 360 degrees and distances from a center.

In accordance with another embodiment, the plurality of abrasive particles 503 on a coated abrasive article can be arranged in a predetermined distribution relative to each other as viewed top-down. A predetermined distribution can be defined by a combination of predetermined positions on a backing that are purposefully selected. In one embodiment, a predetermined distribution can include a pattern, such that the predetermined positions can define a two-dimensional array. In another embodiment, an array may include have short range order defined by a unit of abrasive particles. In yet another aspect, an array may also be a pattern, having long range order including regular and repetitive units linked together, such that the arrangement may be symmetrical and/or predictable. In some instances, an array may have an order that can be predicted by a mathematical formula. It will be appreciated that two-dimensional arrays can be formed in the shape of polygons, ellipsis, ornamental indicia, product indicia, or other designs.

In another aspect, a predetermined distribution can also include a non-shadowing arrangement. For example, a non-shadowing arrangement may include a controlled, non-uniform distribution, a controlled uniform distribution, and a combination thereof. In some non-limiting instances, a non-shadowing arrangement may include a radial pattern, a spiral pattern, a phyllotactic pattern, an asymmetric pattern, a self-avoiding random distribution, a self-avoiding random distribution and a combination thereof. In one embodiment, a non-shadowing arrangement may include a particular arrangement of abrasive particles (i.e., shaped abrasive particles and/or diluent particles) relative to each other, wherein the degree of overlap of the abrasive particles during an initial phase of a material removal operation is not greater than about 25%, such as not greater than about 20%, not greater than about 15%, not greater than about 10%, or even not greater than about 5%. In particular instances, a non-shadowing arrangement may include a distribution of abrasive particles, wherein upon engagement with a workpiece during an initial stage of a material removal operation, a portion (e.g., a minority of all shaped abrasive particles on the backing, a majority of all shaped abrasive particles on the backing, or even essentially all) of the abrasive particles engage a different region of the surface of the workpiece. A non-shadowing arrangement may utilize a particular distribution of shaped abrasive particles relative to each other and relative to a grinding direction and/or one or more axes of the backing.

In one embodiment, the predetermined distribution can be partially, substantially, or fully asymmetric. For example, according to one embodiment, the predetermined distribution can overlie the entire abrasive article, can cover substantially the entire abrasive article (i.e., greater than 50% but less than 100%), overlie multiple portions of the abrasive article, or overlie a fraction of the abrasive article (i.e., less than 50% of the surface area of the article). As used herein, "a phyllotactic pattern" means a pattern related to phyllotaxis. Phyllotaxis is the arrangement of lateral organs such as leaves, flowers, scales, florets, and seeds in many kinds of plants. Many phyllotactic patterns are marked by the naturally occurring phenomenon of conspicuous patterns having arcs, spirals, and whorls. The pattern of seeds in the head of a sunflower is an example of this phenomenon.

Figure 6:
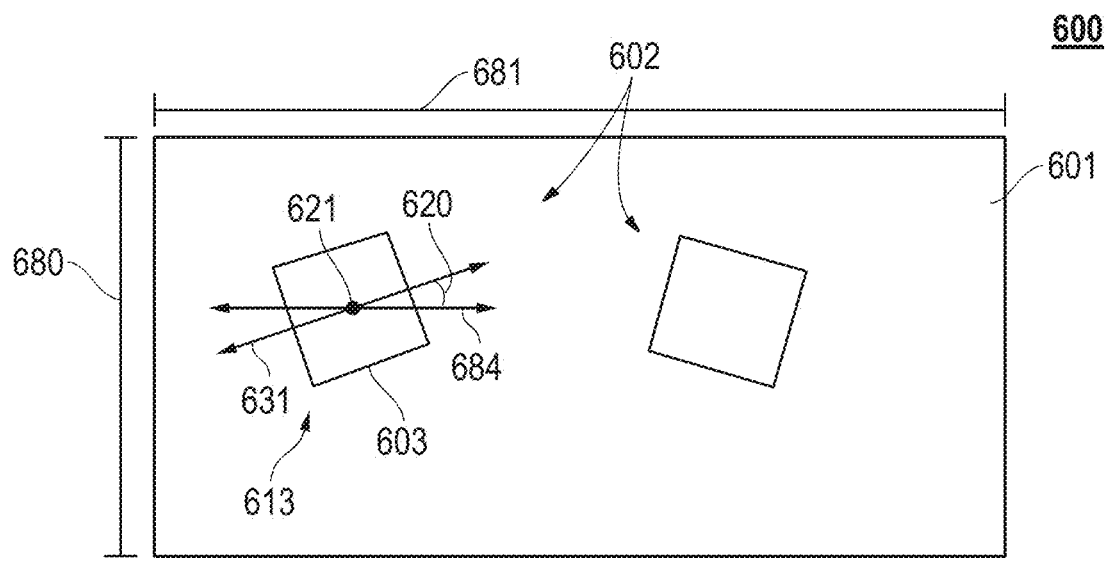
FIG. 6 includes a top-down illustration of a portion of a coated abrasive article according to an embodiment.

FIG. 6 includes a top-down illustration of a portion of a coated abrasive article according to an embodiment. The coated abrasive article 600 includes a backing 601 and a plurality of abrasive particles 602, which may include one or more tapered abrasive particles. In one embodiment, at least a portion of plurality of abrasive particles 602 may have a predetermined rotational orientation, which may be the orientation of an abrasive particle around a Z-axis extending perpendicular to the plane of the backing 601. In one embodiment, the abrasive particle 603 overlying the backing 601 in a first position 613 may have a rotational orientation relative to a lateral axis 681 defining the width of the backing 601. In particular aspects, the abrasive particle 603 can have a predetermined rotational orientation defined by a rotational angle 620. The rotational angle 620 can be the smallest angle formed between the lateral plane 684 extending through the center point 621 and a bisecting axis 631 parallel to the reference dimension of the particle (e.g., thickness or width) also extending through the center point 621 as viewed top-down. According to one embodiment, the abrasive particle 602 can have a predetermined rotational orientation defined by the rotational angle 620 which is measured as the smallest angle between a bisecting axis 631 and the lateral plane 184. In accordance with an embodiment, the rotational angle 201 can be 0 degrees, such as at least about 2 degrees, at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 70 degrees, at least about 80 degrees, or even at least about 85 degrees. Still, the predetermined rotational orientation as defined by the rotational angle 201 may be not greater than about 90 degrees, such as not greater than about 85 degrees, not greater than about 80 degrees, not greater than about 75 degrees, not greater than about 70 degrees, not greater than about 65 degrees, not greater than about 60 degrees, such as not greater than about 55 degrees, not greater than about 50 degrees, not greater than about 45 degrees, not greater than about 40 degrees, not greater than about 35 degrees, not greater than about 30 degrees, not greater than about 25 degrees, not greater than about 20 degrees, such as not greater than about 15 degrees, not greater than about 10 degrees, or even not greater than about 5 degrees. It will be appreciated that the predetermined rotational orientation can be within a range between any of the above minimum and maximum values.

Figure 7:
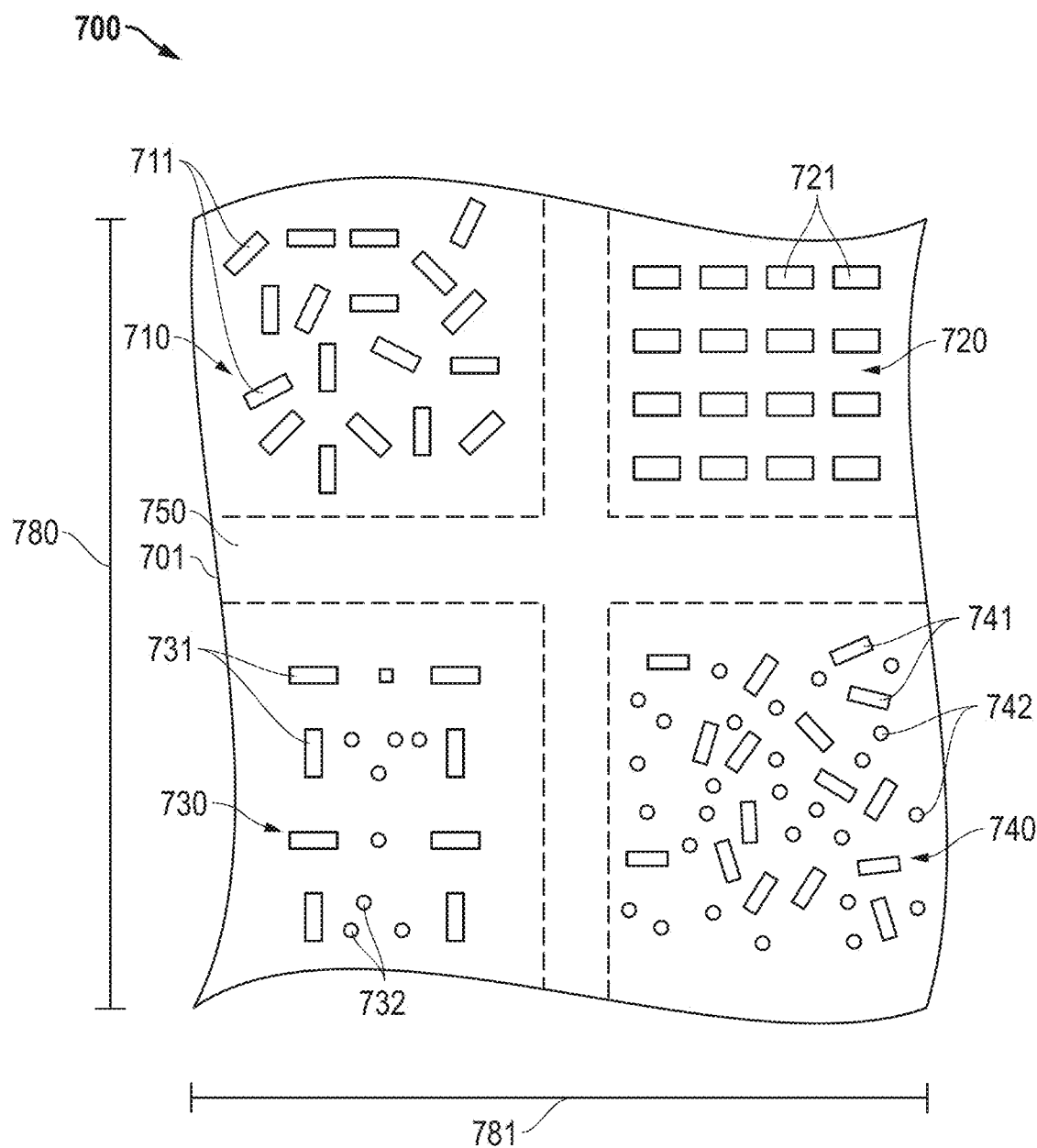
FIG. 7 includes a top-down illustration of a portion of a coated abrasive article according to an embodiment.

FIG. 7 includes a top-down illustration of a portion of a coated abrasive article according to an embodiment. In one embodiment, the coated abrasive article 700 can include a substrate 701 including a longitudinal axis 780 and a lateral axis 781. The coated abrasive article 700 may further include plurality of regions, such as a first region 710, a second region 720, a third region 730 and a fourth region 740. In one aspect, each of the regions 710, 720, 730, and 740 can be separated by a channel region 750, wherein the channel region 750 defines a region the backing that is free of particles. The channel region 750 can have any size and shape and may be particularly useful for removing swarf and improved grinding operations. In a particular embodiment, the channel region 750 may have a length (i.e., longest dimension) and width (i.e., shortest dimension perpendicular to the length) that is greater than the average spacing between immediately adjacent abrasive particles within any of the regions 710, 720, 730, and 740. The channel region 750 can be an optional feature for any of the embodiments herein.

According to one embodiment, the first region 710 can include a group of abrasive particles 711 having a generally random rotational orientation with respect to each other. The group of abrasive particles 711 can be arranged in a random distribution relative to each other, such that there is no discernable short-range order or long-range order with regard to the placement of the group of abrasive particles 711. In one embodiment, the group of abrasive particles 711 may be substantially homogenously distributed within the first region 710, such that the formation of clumps (two or more particles in contact with each other) is limited.

In another aspect, the second region 720 can include a group of abrasive particles 721 arranged in a controlled distribution relative to each other. For one embodiment, the group of abrasive particles 721 can have a regular and controlled rotational orientation relative to each other. In another embodiment, the group of shaped abrasive particles 721 can have generally the same rotational orientation as defined by the same rotational angle on the backing of the coated abrasive 701. In one aspect, the group of shaped abrasive particles 721 can be substantially homogenously distributed within the second region 720, such that the formation of clumps (two or more particles in contact with each other) is limited.

According to another aspect, the third region 730 can include a group of abrasive particles 731 and secondary particles 732. In one embodiment, the group of abrasive particles 731 and secondary particles 732 can be arranged in a controlled distribution relative to each other. For example, the group of shaped abrasive particles 731 can have a regular and controlled rotational orientation relative to each other. According to another non-limiting embodiment, the group of shaped abrasive particles 731 can have generally one of two types of rotational orientations on the backing of the coated abrasive 701. In one instance, the group of shaped abrasive particles 731 and secondary particles 732 can be substantially homogenously distributed within the third region 730, such that the formation of clumps (two or more particles in contact with each other) is limited.

For another aspect, a fourth region 740 can include a group of abrasive particles 741 and secondary particles 742 having a generally random distribution with respect to each other. For example, the group of abrasive particles 741 can have a random rotational orientation with respect to each other. In one embodiment, group of abrasive particles 741 and secondary particles 742 can be arranged in a random distribution relative to each other, such that there is no discernable short-range or long-range order. In another embodiment, the group of shaped abrasive particles 741 and the secondary particles 742 can be substantially homogenously distributed within the fourth region 740, such that the formation of clumps (two or more particles in contact with each other) is limited.

The coated abrasive article 700 can include different regions 710, 720, 730, and 740, each of which can include different groups of particles, such as shaped particles and secondary particles. The coated abrasive article 700 is intended to illustrate the different types of groupings, arrangements, and distributions of particles that may be created using the systems and processes of the embodiments herein. The illustration is not intended to be limited to only those groupings of particles and it will be appreciated that coated abrasive articles can be made including only one region as illustrated in FIG. 7. It will also be understood that other coated abrasive articles can be made including a different combination or arrangement of one or more of the regions illustrated in FIG. 7.

Figure 8:
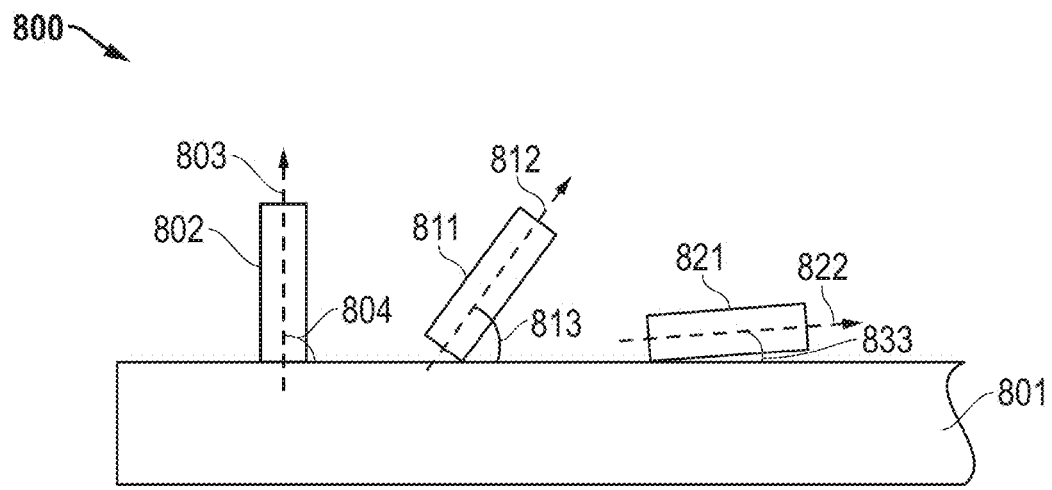
FIG. 8 includes a side-view illustration of abrasive particles on a backing according to an embodiment.

FIG. 8 includes a side-view illustration of abrasive particles on a backing according to an embodiment. In one aspect, the coated abrasive articles of the embodiments herein can have plurality of abrasive particles having a controlled tilt angle, which may facilitate improved performance. To better understand these features, FIG. 8 provides a side-view illustration of three abrasive particles in various orientations. It will be appreciated that the coated abrasive articles of the embodiments herein can have various contents of particles in the depicted orientations as described in more detail herein. The first particle 802 can have a particle axis 803 extending at a particular tilt angle 804 relative to the surface of the backing 801. The particle axis 803 can be parallel to the longitudinal axis of the first particle 802 that defines the length of the first particle 802. The first particle 802 is representative of a particle in an upright orientation having a tilt angle 804 within a range of greater than 71 degrees to 90 degrees. The second particle 811 can have a particle axis 812 extending at a particular tilt angle 813 relative to the surface of the backing 801. The particle axis 812 can be parallel to a longitudinal axis of the second particle 811 that defines the length of the second particle 811. The second particle 811 is representative of a particle in a slanted orientation having a tilt angle 813 within a range of greater than 44 degrees to 71 degrees. The third particle 821 can have a particle axis 822 extending at a particular tilt angle 823 relative to the surface of the backing 801. The particle axis 822 can be parallel to a longitudinal axis of the third particle 821 that defines the length of the third particle 821. The third particle 821 is representative of a particle in a flat orientation having a tilt angle 823 within a range of at least 0 degrees to not greater than 44 degrees. It will be appreciated that the first, second and third particles 802, 811 and 821, respectively, can be any type of particle, including but not limited to, tapered abrasive particles as described in the embodiments herein.

According to one aspect, the plurality of abrasive particles on the coated abrasive may have a particular tilt angle, such as at least 2 degrees, such as at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 70 degrees, at least 80 degrees, or even at least 85 degrees. Still, the tilt angle 136 may be not greater than about 90 degrees, such as not greater than about 85 degrees, not greater than about 80 degrees, not greater than about 75 degrees, not greater than about 70 degrees, not greater than about 65 degrees, not greater than about 60 degrees, such as not greater than about 55 degrees, not greater than about 50 degrees, not greater than about 45 degrees, not greater than about 40 degrees, not greater than about 35 degrees, not greater than about 30 degrees, not greater than about 25 degrees, not greater than about 20 degrees, such as not greater than about 15 degrees, not greater than about 10 degrees, or even not greater than about 5 degrees. It will be appreciated that the tilt angle can be within a range between any of the above minimum and maximum degrees. The tilt angle may be measured using techniques disclosed in US 2019/0160630 incorporated by reference herein in its entirety.

According to one particular aspect, the content of abrasive particles overlying the backing can be controlled based on the intended application. For example, the plurality abrasive particles can be overlying at least 5% of the total surface area of the backing, such as at least 10% or at least 20% or at least 30% or at least 40% or at least 50% or at least 60% or at least 70% or at least 80% or at least 90%. In still another embodiment, the coated abrasive article may be essentially free of silane.

Furthermore, the abrasive articles of the embodiments herein can have a particular content of particles overlying the substrate. In one embodiment, the particles can define an open coat abrasive product having a coating density of particles (i.e., abrasive particles, secondary particles, or both abrasive particles and secondary particles) of not greater than about 70 particles/cm$^2$. In other instances, the density of particles per square centimeter of the abrasive article may be not greater than about 65 particles/cm$^2$, such as not greater than about 60 particles/cm$^2$, not greater than about 55 particles/cm$^2$, or even not greater than about 50 particles/cm$^2$. Still, in one non-limiting embodiment, the density of the open coat coated abrasive can be at least about 5 particles/cm$^2$, or even at least about 10 particles/cm$^2$. It will be appreciated that the density of particles per square centimeter of abrasive article can be within a range between any of the above minimum and maximum values.

In certain instances, the abrasive article can have an open coat density of not greater than about 50% of particles (i.e., abrasive particles or secondary particles or the total of abrasive particles and secondary particles) covering the exterior abrasive surface of the article. In other embodiments, the area of the particles relative to the total area of the surface on which the particles are placed can be not greater than about 40%, such as not greater than about 30%, not greater than about 25%, or even not greater than about 20%. Still, in one non-limiting embodiment, the percentage coating of the particles relative to the total area of the surface can be at least about 5%, such as at least about 10%, at least about 15%, at least about 20%, at least about 25%, at least about 30%, at least about 35%, or even at least about 40%. It will be appreciated that the percent coverage of the particles can be within a range between any of the above minimum and maximum values.

Some abrasive articles may have a particular content of particles (i.e., abrasive particles or secondary particles or the total of abrasive particles and secondary particles) for a given area (e.g., ream, wherein 1 ream=30.66 m$^2$) of the backing. For example, in one embodiment, the abrasive article may utilize a normalized weight of particles of at least about 1 lbs/ream (14.8 grams/m$^2$), such as at least 5 lbs/ream or at least 10 lbs/ream or at least about 15 lbs/ream or at least about 20 lbs/ream or at least about 25 lbs/ream or even at least about 30 lbs/ream. Still, in one non-limiting embodiment, the abrasive article can include a normalized weight of particles of not greater than about 90 lbs/ream (1333.8 grams/m$^2$), such as not greater than 80 lbs/ream or not greater than 70 lbs/ream or not greater than 60 lbs/ream or not greater than about 50 lbs/ream or even not greater than about 45 lbs/ream. It will be appreciated that the abrasive articles of the embodiments herein can utilize a normalized weight of particles within a range between any of the above minimum and maximum values.

In certain instances, the abrasive articles can be used on particular workpieces. A suitable exemplary workpiece can include an inorganic material, an organic material, a natural material, and a combination thereof. According to a particular embodiment, the workpiece can include a metal or metal alloy, such as an iron-based material, a nickel-based material, and the like. In one embodiment, the workpiece can be steel, and more particularly, can consist essentially of stainless steel (e.g., 304 stainless steel).

According to another aspect, the tapered abrasive particles may have particular features that may result from the disclosed forming process and may facilitate improved performance. In one embodiment, the tapered abrasive particles may have a particular taper fraction value, which defines the portion of the body that is tapered to a particular degree. According to one embodiment, the tapered abrasive particles may have an average taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35. Still, in another non-limiting embodiment, the tapered abrasive particles may have an average taper fraction value of not greater than 0.8 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28. It will be appreciated that the tapered abrasive particles may have an average taper fraction value within a range including any of the minimum and maximum values noted above.

Figure 11:
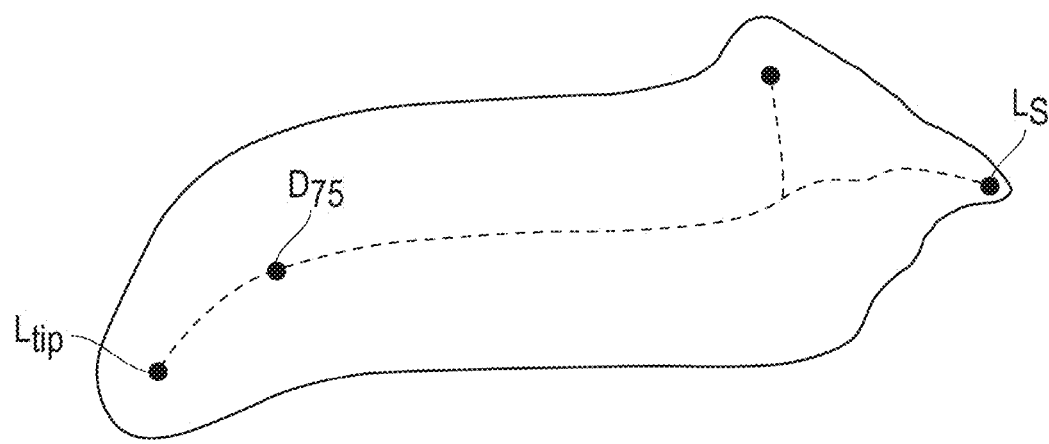
FIG. 11 includes an illustration of an outline of a tapered abrasive particle according to an embodiment including a skeleton formed via image processing software.
Figure 12:
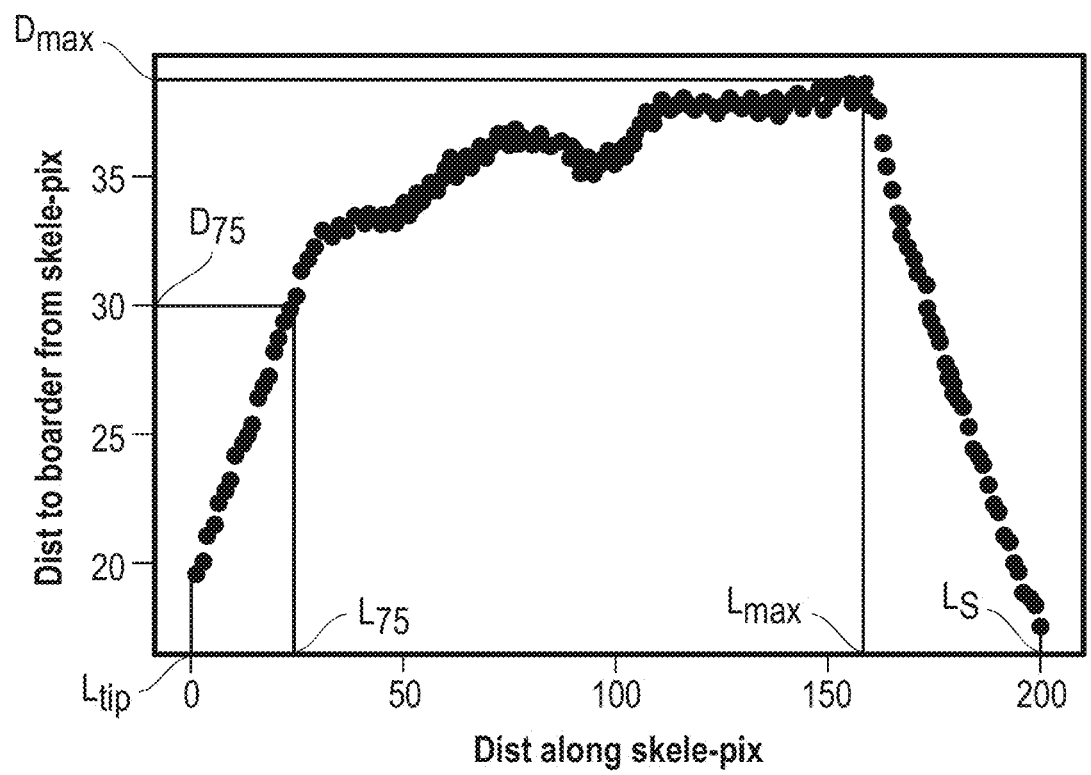
FIG. 12 includes a plot of distance to skeleton vs distance along skeleton used to calculate taper fraction and elongation fraction for abrasive particles.

The average taper fraction value is measured by taking images of a statistically relevant sample size of tapered abrasive particles from a batch or a fixed abrasive article. The images can be taken by a suitable optical imaging device (e.g., Olympus DSX) at a suitable magnification (e.g., 10-20×). The images are then saved and analyzed using image processing software, such as skimage library (version 0.13.1) for the python programming language (Version 3.6.3). A separate image was created for each tapered abrasive particle. Each of the images of the tapered abrasive particles was converted into a black and white only image. A skeletonized image was then used via the skeletonize function of the image processing software. FIG. 11 includes an illustration of an outline of a tapered abrasive particle according to an embodiment including a skeleton formed via image processing software. Using the software, a plot of distance (pixels) to border from skeleton versus distance (pixels) along skeleton was used. FIG. 12 includes a plot of distance to skeleton vs distance along skeleton used to calculate taper fraction and elongation fraction for abrasive particles. The plot was then used to calculate the Dmax and D75 values as illustrated, wherein Dmax represents the point along the plot having the greatest distance between the border and the skeleton. D75 represents the value on the plot that is 75% of the Dmax value, or D75=(Dmax×0.75). D75 further defines a point along the X-axis (i.e., distance along the skeleton) as L75. Dmax also defines a point along the X-axis, which is defined as Lmax. Note also, as provided in FIG. 12, the tip defines the starting point, and thus Ltip=0 on the X-axis. The total length of the skeleton is defined as Ls. The taper fraction value for each of the images of each of the particles is calculated as L75/Ls. The average taper fraction value is the average of the taper fraction values for all of the measured particles. The taper fraction standard deviation is also calculated from the entire taper fraction values measured from the particles in the sample.

In another aspect, the tapered abrasive particles may have a particular taper fraction standard deviation. For example, the tapered abrasive particles may have a taper fraction standard deviation that is at least 0.025, such as at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060. Still, in another non-limiting embodiment, the taper fraction standard deviation can be not greater than 0.090, such as not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040. It will be appreciated that the tapered abrasive particles may have a taper fraction standard deviation within a range including any of the minimum and maximum values noted above, including for example, but not limited to within a range of at least 0.025 and not greater than 0.085 or within a range of at least 0.028 and not greater than 0.070 or within a range of at least 0.03 and not greater than 0.06.

In another embodiment, the plurality of abrasive particles may have a particular average batch taper fraction value. The average batch taper fraction value can be calculated in the same manner from the plurality of particles as provided above for the average batch taper fraction value for the tapered abrasive particles. For example, the plurality of abrasive particles may have an average batch taper fraction value of at least 0.05, such as at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35. Still, in a non-limiting embodiment, the plurality of abrasive particles may have an average batch taper fraction value of not greater than 0.8 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28. It will be appreciated that the average batch taper fraction value can be within a range including any of the minimum and maximum values noted above.

According to another aspect, the tapered abrasive particles may have particular features that may result from the disclosed forming process and may facilitate improved performance. In one embodiment, the tapered abrasive particles may have a particular average elongation fraction value, which defines the degree of taper in the elongation region of each body of the tapered abrasive particles. According to one embodiment, the tapered abrasive particles may have an average elongation fraction value of at least 0.2 or at least 0.3 or at least 0.4 or at least 0.5 or at least 0.6. Still, in another non-limiting embodiment, the tapered abrasive particles may have an average elongation fraction value of not greater than 0.9 or not greater than 0.8 or not greater than 0.7 or not greater than 0.6. It will be appreciated that the tapered abrasive particles may have an average elongation fraction value within a range including any of the minimum and maximum values noted above.

The average elongation fraction value is calculated using the same imaging technique and information gathered to calculate the average taper fraction value and taper fraction standard deviation. Referring again to FIGS. 11 and 12, the elongation fraction value=$[(L75-Lmax)/Ls]$, wherein (L75−Lmax) is an absolute value. The average elongation fraction value can be calculated from the entire elongation fraction values for all of the abrasive particles measured.

In another aspect, the tapered abrasive particles may have a particular elongation fraction standard deviation. For example, the tapered abrasive particles may have an elongation fraction standard deviation that is at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14. Still, in another non-limiting embodiment, the elongation fraction standard deviation can be not greater than 0.3 or not greater than 0.25 or not greater than 0.2 or not greater than 0.19 or not greater than 0.18 or not greater than 0.17 or not greater than 0.16 or not greater than 0.15 or not greater than 0.14 or not greater than 0.13. It will be appreciated that the tapered abrasive particles may have an elongation fraction standard deviation within a range including any of the minimum and maximum values noted above.

In yet another aspect, the plurality of abrasive particles may have a particular elongation fraction value defined as the average batch elongation fraction value. In one embodiment, the plurality of abrasive particles comprise an average batch elongation fraction value of at least 0.2, such as at least 0.3 or at least 0.4 or at least 0.5 or at least 0.6. Still, in another embodiment, the plurality of abrasive particles can have an average batch elongation fraction value is not greater than 0.9, such as not greater than 0.8 or not greater than 0.7 or not greater than 0.6. It will be appreciated that the plurality of abrasive particles may have an average batch elongation fraction value within a range including any of the minimum and maximum values noted above. The average batch elongation fraction value can be calculated in the same manner from the plurality of particles as provided above for the average elongation fraction value for the tapered abrasive particles.

In another aspect, the plurality of abrasive particles may have a particular elongation fraction standard deviation defined as the batch elongation fraction standard deviation. For example, the plurality of abrasive particles may have a batch elongation fraction standard deviation that is at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14. Still, in another non-limiting embodiment, the batch elongation fraction standard deviation can be not greater than 0.3 or not greater than 0.25 or not greater than 0.2 or not greater than 0.19 or not greater than 0.18 or not greater than 0.17 or not greater than 0.16 or not greater than 0.15 or not greater than 0.14 or not greater than 0.13. It will be appreciated that the plurality of abrasive particles may have a batch elongation fraction standard deviation within a range including any of the minimum and maximum values noted above.

In yet another aspect, it has been noted that the tapered abrasive particles can be formed to have a particular relationship between the average taper fraction value and average elongation fraction value. For example, in one non-limiting embodiment, the average elongation fraction value may be greater than the average taper fraction value, which is distinct from other two-dimensional shapes, such as triangles, which have a consistent taper along the entire length of the body, and thus the average taper fraction value is likely to be significantly greater than the average elongation fraction value. According to one embodiment, the average elongation fraction value can be at least 10% greater than the average taper fraction value, wherein the average elongation fraction value ≥[average taper fraction value+ (average taper fraction value×10%)]. Still, in another non-limiting embodiment, the average elongation fraction value can be even greater as compared to the average taper fraction value, such as at least 20% greater or at least 30% greater or at least 40% greater or at least 50% greater or at least 60% greater or at least 70% greater or at least 80% greater or at least 90% greater or at least 100% greater or at least 120% greater or at least 140% greater or at least 160% greater or at least 180% greater or at least 200% greater or at least 250% greater or at least 300% greater than the average taper fraction value. According to one non-limiting embodiment, the average elongation fraction value may be not more than 1000% greater than the average taper fraction value, such as not more than 900% greater or not more than 800% greater or not more than 700% greater or not more than 600% greater or not more than 500% greater or not more than 400% greater or not more than 300% greater or not more than 200% greater or not more than 150% greater. It will be appreciated that the average elongation fraction value can be greater than the average taper fraction value within a range including any of the minimum and maximum percentages noted above, including for example, but not limited to, at least 50% greater and not more than 500% greater than the average taper fraction.

Figure 13:
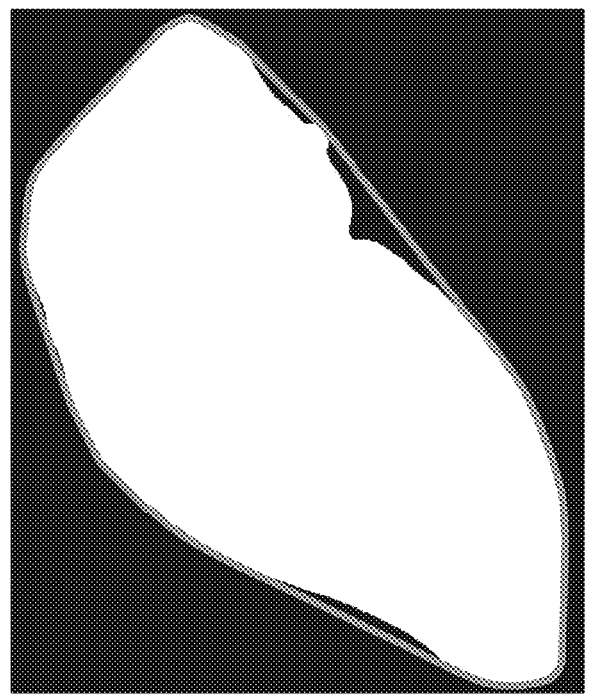
FIG. 13 includes a black and white image of an outline of a tapered abrasive particle according to an embodiment for calculation of solidity.

In still another aspect, the tapered abrasive particles may have a particularly regular shape as defined by solidity. The solidity of the particle is measured by dividing the actual area of the body of a particle as viewed in two dimensions by a convex hull area of the body of the particle as viewed in two-dimensions. Measurement of the actual area and convex hull area of the particles can be conducted by taking images of a statistically relevant sample size of tapered abrasive particles from a batch or a fixed abrasive article. The images can be taken by a suitable optical imaging device (e.g., Olympus DSX) at a suitable magnification (e.g., 10-20×). The images are then saved and analyzed using image processing software, such as ImageJ. A separate image was created for each tapered abrasive particle. Each of the images of the tapered abrasive particles was turned into a black and white only image. FIG. 13 includes a two dimensional black and white image of a tapered abrasive particle according to an embodiment. Using an image like the image of FIG. 13, the image processing software calculates the area in white as the actual area of the body of the particle as viewed in two-dimensions of the length and width or length and thickness. Using the image processing software, a convex hull is drawn around the perimeter of the particle using the shape filter plugin in ImageJ. The imaging processing software then calculates the area inside the convex hull. The solidity is calculated for each particle based on the actual area of each particle divided by the convex hull area. The average solidity is the average of the solidity values for all of the measured particles. The solidity standard deviation is also calculated from all of the solidity values measured from the particles in the sample.

According to one embodiment, the tapered abrasive particles can have a particular solidity that may result from the forming process and may also facilitate improved performance. For example, the tapered abrasive particles can have an average solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97. In another non-limiting embodiment, the tapered abrasive particles may have an average solidity of not greater than 0.99 or not greater than 0.98 or not greater than 0.97 or not greater than 0.96 or not greater than 0.95. It will be appreciated that the average solidity of the tapered abrasive particles may be within a range including any of the minimum and maximum values noted above.

In yet another aspect, the tapered abrasive particles may have a particular solidity standard deviation that can be notably distinct from other shaped abrasive particles and indicate a high degree of shape fidelity. For example, the tapered abrasive particles may have a solidity standard deviation of not greater than 0.05 or not greater than 0.045 or not greater than 0.04 or not greater than 0.035 or not greater than 0.030 or not greater than 0.025 or not greater than 0.020. In one non-limiting embodiment, the tapered abrasive particles may have a solidity standard deviation of at least 0.0001 or at least 0.001 or at least 0.01 or at least 0.015 or at least 0.020. It will be appreciated that the solidity standard deviation can be within a range including any of the minimum and maximum values noted above.

According to one embodiment, the plurality of abrasive particles can have a particular solidity that may result of the forming process and may also facilitate improved performance. For example, the plurality of abrasive particles can have an average batch solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97. In another non-limiting embodiment, the plurality of abrasive particles may have an average batch solidity of not greater than 0.99 or not greater than 0.98 or not greater than 0.97 or not greater than 0.96 or not greater than 0.95. It will be appreciated that the average batch solidity of the plurality of abrasive particles may be within a range including any of the minimum and maximum values noted above. The average batch solidity of the plurality of abrasive particles may be measured in the same manner as used to measure the average solidity of the tapered abrasive particles, but instead is measured on a sample representative of a batch or a fixed abrasive article.

In yet another aspect, the plurality of abrasive particles may have a particular batch solidity standard deviation that can be notably distinct from other shaped abrasive particles and indicate a high degree of shape fidelity. For example, the plurality of abrasive particles may have a batch solidity standard deviation of not greater than 0.05 or not greater than 0.045 or not greater than 0.04 or not greater than 0.035 or not greater than 0.030 or not greater than 0.025 or not greater than 0.020. In one non-limiting embodiment, the plurality of abrasive particles may have a batch solidity standard deviation of at least 0.0001 or at least 0.001 or at least 0.01 or at least 0.015 or at least 0.020. It will be appreciated that the batch solidity standard deviation can be within a range including any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Figure 15:
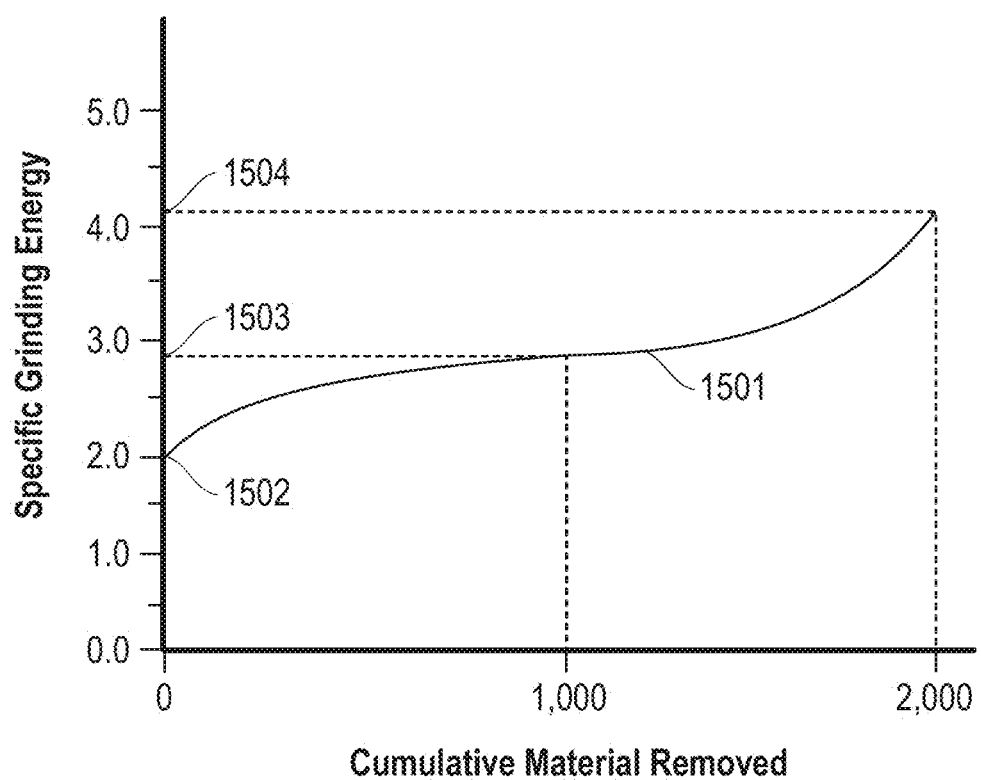
FIG. 15 includes an illustration of a plot of grinding energy versus cumulative material removed.

According to another non-limiting aspect, a coated abrasive article including extruded abrasive particles, which may have one or more features of the tapered abrasive particles of the embodiments herein may have particular grinding characteristics. FIG. 15 includes an illustration of a plot of grinding energy versus cumulative material removed. In particular, FIG. 15 includes a plot 1501 defining an initial specific grinding energy at the intersection of the plot 1502 with the Y-axis (i.e., specific grinding energy). The plot 1501 further has a second specific grinding energy value 1503 as defined by the point on the Y-axis at 1000 grams of cumulative material removed. The plot 1501 also includes a third specific grinding energy value 1504 associated with the end of the plot 1501, which in the illustrated embodiment, is associated with 2000 grams of cumulative material removed.

Various characteristics of the coated abrasive article used to form the plot can be evaluated from the plot 1501. For example, in one non-limiting embodiment, a coated abrasive article can have a Total ΔSGE Factor that is calculated by the total change of the specific grinding energy divided by the total material removed for the plot 1501. That is, Total ΔSGE Factor=[(1504-1502)/2000 g]. In one non-limiting embodiment, the Total ΔSGE Factor can be not greater than $6 \times 10^{-4}$ [(Hp/in³/min)/g] for a minimum of 1500 g of total material removed. According to another non-limiting embodiment, the Total ΔSGE Factor can be not greater than $5.5 \times 10^{-4}$ [(Hp/in³/min)/g] for a minimum of 1500 g total material removed, such as not greater than $5 \times 10^{-4}$ [(Hp/in³/min)/g] or not greater than $4.8 \times 10^{-4}$ [(Hp/in³/min)/g] or not greater than $4.7 \times 10^{-4}$ [(Hp/in³/min)/g] or not greater than $4.6 \times 10^{-4}$ [(Hp/in³/min)/g] or not greater than $4.5 \times 10^{-4}$ [(Hp/in³/min)/g] or not greater than $4.4 \times 10^{-4}$ [(Hp/in³/min)/g] or not greater than $4.2 \times 10^{-4}$ [(Hp/in³/min)/g] or not greater than $4 \times 10^{-4}$ [(Hp/in³/min)/g] for a minimum of 1500 g total material removed. Still, in another non-limiting embodiment, the Total ΔSGE Factor can be at least $0.1 \times 10^{-6}$ [(Hp/in³/min)/g] for a minimum of 1500 g total material removed, such as at least $0.1 \times 10^{-5}$ [(Hp/in³/min)/g] or at least $0.1 \times 10^{-4}$ [(Hp/in³/min)/g] or at least $1 \times 10^{-4}$ [(Hp/in³/min)/g] or at least $3 \times 10^{-4}$ [(Hp/in³/min)/g] for a minimum of 1500 g total material removed. It will be appreciated that the Total ΔSGE Factor can be within a range including any of the minimum and maximum values noted above. Moreover, as noted above, it is preferred that the Total ΔSGE Factor is calculated based upon a minimum of 1500 grams of material removed by a given coated abrasive sample on a steel workpiece under the conditions noted in Example 3 herein. However, in certain non-limiting instances, if the minimum of 1500 grams is not removed the Total ΔSGE Factor may still be calculated based upon the total material removed.

In another aspect, a coated abrasive article may have a particular Initial ΔSGE Factor that is calculated by the change of the specific grinding energy for the first 1000 grams of cumulative material removed. According to the plot 1501, the Initial ΔSGE Factor=[(1503-1502)/1000 g]. In one non-limiting embodiment, the Initial ΔSGE Factor can be not greater than $5 \times 10^{-4}$ [(Hp/in³/min)/g] for the first 1000 g of material removed, such as not greater than $4.9 \times 10^{-4}$ [(Hp/in³/min)/g] or not greater than $4.8 \times 10$ [(Hp/in³/min)/g] or not greater than $4.7 \times 10^{-4}$ [(Hp/in³/min)/g] or not greater than $4.6 \times 10^{-4}$ [(Hp/in³/min)/g] or not greater than $4.5 \times 10^{-4}$ [(Hp/in³/min)/g] or not greater than $4.4 \times 10^{-4}$ [(Hp/in³/min)/g] or not greater than $4.2 \times 10^{-4}$ [(Hp/in³/min)/g] or not greater than $4.1 \times 10^{-4}$ [(Hp/in³/min)/g] or not greater than $4 \times 10^{-4}$ [(Hp/in³/min)/g] for the first 1000 g of material removed. Still, in another non-limiting embodiment, the Initial ΔSGE Factor may be at least $0.1 \times 10^{-6}$ [(Hp/in³/min)/g] for the first 1000 g of material removed or at least $0.1 \times 10^{-5}$ [(Hp/in3/min)/g] or at least $0.1 \times 10^{-4}$ [(Hp/in³/min)/g] or at least $1 \times 10^{-4}$ [(Hp/in³/min)/g] or at least $2 \times 10^{-4}$ [(Hp/in³/min)/g] or at least $3 \times 10^{-4}$ [(Hp/in³/min)/g] for the first 1000 g of material removed. It will be appreciated that the Initial ΔSGE Factor can be within a range including any of the minimum and maximum values noted above. As noted above, it is preferred that the Initial ΔSGE Factor is calculated based upon the first 1000 grams of material removed under the conditions noted in Example 3 herein. However, in certain non-limiting instances, if 1000 grams is not removed, the Initial ΔSGE Factor may still be calculated based upon the SGE value for 50% of the total cumulative material removed (i.e., the SGE value from 0% of the total cumulative material removed to the SGE value at 50% of total cumulative material removed).

In still another non-limiting aspect, a coated abrasive article may have a particular Final ΔSGE Factor that is calculated by the change of the specific grinding energy for the greater of: 1) at least the last 800 grams of cumulative material removed or 2) the cumulative material removed after the initial 1000 grams of material is removed. According to the plot 1501, the Final ΔSGE Factor=[(1504-1503)/(2000-1000) g]. In one embodiment, the Final ΔSGE Factor can be not greater than $6 \times 10^{-4}$ [(Hp/in3/min)/g] for at least the final 800 g of material removed, such as not greater than $5.5 \times 10^{-4}$ [(Hp/in³/min)/g] or not greater than $5.3 \times 10^{-4}$ [(Hp/in³/min)/g] or not greater than $5 \times 10^{-4}$ [(Hp/in³/min)/g] or not greater than $4.8 \times 10^{-4}$ [(Hp/in³/min)/g] or not greater than $4.5 \times 10^{-4}$ [(Hp/in³/min)/g] or not greater than $4.3 \times 10^{-4}$ [(Hp/in³/min)/g] or not greater than $4 \times 10^{-4}$ [(Hp/in³/min)/g] or not greater than $3.9 \times 10^{-4}$ [(Hp/in³/min)/g] or not greater than $3.7 \times 10^{-4}$ [(Hp/in³/min)/g] for at least the final 800 g of material removed. Still, in another embodiment, the Final ΔSGE Factor may be at least $1 \times 10^{-6}$ [(Hp/in3/min)/g] for at least the final 800 g of material, such as at least $1 \times 10^{-5}$ [(Hp/in3/min)/g] or at least $1 \times 10^{-4}$ [(Hp/in3/min)/g] or at least $2 \times 10^{-4}$ [(Hp/in3/min)/g] for at least the final 800 g of material. It will be appreciated that the Final ΔSGE Factor can be within a range including any of the minimum and maximum values noted above. As noted above, it is preferred that the Final ΔSGE Factor is calculated based upon at least the last 800 grams of material removed under the conditions noted in Example 3 herein. However, in certain non-limiting instances, if 800 grams is not removed, the Final ΔSGE Factor may still be calculated based upon the SGE value for the last 50% of the total cumulative material removed (i.e., the SGE value from 51% of the total cumulative material removed to the SGE value at 100% of total cumulative material removed).

EMBODIMENTS

Embodiment 1. A coated abrasive article comprising: a substrate; and
a plurality of abrasive particles overlying the substrate, wherein the plurality of abrasive particles comprises tapered abrasive particles having a taper fraction standard deviation of at least 0.025 and not greater than 0.090.

Embodiment 2. The coated abrasive article of embodiment 1, wherein at least 5% of the abrasive particles are tapered abrasive particles or at least 8% or at least 10% or at least 12% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 68% or at least 70% or at least 72% or at least 75% or at least 78% or at least 80% or at least 82% or at least 85% or at least 88% or at least 90% or at least 92% or at least 95% or at least 98% or at least 99%.

Embodiment 3. The coated abrasive article of embodiment 1, wherein the plurality of abrasive particles consists of only tapered abrasive particles.

Embodiment 4. The coated abrasive article of embodiment 1, wherein the plurality of abrasive particles comprises a blend including a first portion of abrasive particles and a second portion of abrasive particles, and wherein the tapered abrasive particles are included in the first portion, the second portion, or both the first portion and second portion.

Embodiment 5. The coated abrasive article of embodiment 1, wherein the plurality of abrasive particles includes at least 10 grams of abrasive particles or at least 100 grams of abrasive particles or at least 500 grams of abrasive particles or at least 1 kg of abrasive particles or at least 10 kg of abrasive particles.

Embodiment 6. The coated abrasive article of embodiment 1, wherein the plurality of abrasive particles includes at least 10 abrasive particles or at least 20 abrasive particles or at least 30 abrasive particles or at least 50 abrasive particles or at least 100 abrasive particles or at least 500 abrasive particles.

Embodiment 7. The coated abrasive article of embodiment 1, wherein each of the tapered abrasive particles comprises a body having a length, a width, and a thickness, wherein length>width>thickness.

Embodiment 8. The coated abrasive article of embodiment 7, wherein the tapered abrasive particles have a primary aspect ratio (length/width) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 9. The coated abrasive article of embodiment 8, wherein the primary aspect ratio (length/width) is not greater than 1000 or not greater than 100 or not greater than 50 or not greater than 20 or not greater than 10 or not greater than 5 or not greater than 3 or not greater than 2.8.

Embodiment 10. The coated abrasive article of embodiment 7, wherein the tapered abrasive particles comprise a primary aspect ratio standard deviation [STDEV(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 11. The coated abrasive article of embodiment 10, wherein the primary aspect ratio standard deviation [STDEV(length/width)] is at least 0.01 or at least 0.05 or at least 0.1 or at least 0.15 or at least 0.2 or at least 0.25 or at least 0.30 or at least 0.35 or at least 0.4.

Embodiment 12. The coated abrasive article of embodiment 7, wherein the tapered abrasive particles have a secondary aspect ratio (length/thickness) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 13. The coated abrasive article of embodiment 12, wherein the secondary aspect ratio (length/thickness) is not greater than 1000 or not greater than 100 or not greater than 50 or not greater than 20 or not greater than 10 or not greater than 5 or not greater than 3 or not greater than 2.8.

Embodiment 14. The coated abrasive article of embodiment 7, wherein the tapered abrasive particles comprise a secondary aspect ratio standard deviation [STDEV(length/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 15. The coated abrasive article of embodiment 14, wherein the secondary aspect ratio standard deviation [STDEV(length/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 16. The coated abrasive article of embodiment 7, wherein the tapered abrasive particles have a tertiary aspect ratio (width/thickness) of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4.

Embodiment 17. The coated abrasive article of embodiment 16, wherein the tertiary aspect ratio (width/thickness) is not greater than 10 or not greater than 8 or not greater than 5 or not greater than 3 or not greater than 2 or not greater than 1.5 or not greater than 1.3 or not greater than 1.1.

Embodiment 18. The coated abrasive article of embodiment 7, wherein the tapered abrasive particles comprise a tertiary aspect ratio standard deviation [STDEV(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 19. The coated abrasive article of embodiment 18, wherein the tertiary aspect ratio standard deviation [STDEV(width/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 20. The plurality of abrasive particles of embodiment 1, wherein each of the abrasive particles of the plurality of abrasive particles comprises a body having a length, a width, and a thickness, wherein length>width>thickness.

Embodiment 21. The coated abrasive article of embodiment 20, wherein the plurality of abrasive particles have a primary batch aspect ratio [B(length/width)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 22. The coated abrasive article of embodiment 21, wherein the primary batch aspect ratio [B(length/width)] is not greater than 1000 or not greater than 100 or not greater than 50 or not greater than 20 or not greater than 10 or not greater than 5 or not greater than 3 or not greater than 2.8.

Embodiment 23. The coated abrasive article of embodiment 20, wherein the plurality of abrasive particles comprise a primary batch aspect ratio standard deviation [STDEV-B(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 24. The coated abrasive article of embodiment 23, wherein the primary batch aspect ratio standard deviation [STDEV-B(length/width)] is at least 0.01 or at least 0.05 or at least 0.1 or at least 0.15 or at least 0.2 or at least 0.25 or at least 0.30 or at least 0.35 or at least 0.4.

Embodiment 25. The coated abrasive article of embodiment 20, wherein the plurality of abrasive particles have a secondary batch aspect ratio [B(length/thickness)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 26. The coated abrasive article of embodiment 25, wherein the secondary batch aspect ratio [B(length/thickness)] is not greater than 1000 or not greater than 100 or not greater than 50 or not greater than 20 or not greater than 10 or not greater than 5 or not greater than 3 or not greater than 2.8.

Embodiment 27. The coated abrasive article of embodiment 20, wherein the plurality of particles comprise a secondary batch aspect ratio standard deviation [STDEV-B(length/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 28. The coated abrasive article of embodiment 27, wherein the secondary batch aspect ratio standard deviation [STDEV-B(length/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 29. The coated abrasive article of embodiment 20, wherein the plurality of abrasive particles have a tertiary batch aspect ratio [B(width/thickness)] of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4.

Embodiment 30. The coated abrasive article of embodiment 29, wherein the tertiary batch aspect ratio [B(width/width)] is not greater than 10 or not greater than 8 or not greater than 5 or not greater than 3 or not greater than 2 or not greater than 1.5 or not greater than 1.3 or not greater than 1.1.

Embodiment 31. The coated abrasive article of embodiment 20, wherein the tapered abrasive particles comprise a tertiary batch aspect ratio standard deviation [STDEV-B(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 32. The coated abrasive article of embodiment 31, wherein the tertiary batch aspect ratio standard deviation [STDEV-B(width/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 33. The coated abrasive article of embodiment 1, wherein each of the tapered abrasive particles comprises a body including a tip region including a tip of the body, a base region including a base of the body, wherein the base region is at an opposite end of the body from the tip region along a length of the body.

Embodiment 34. The coated abrasive article of embodiment 33, wherein the tip is defined by a convergence of at least 2 surfaces of the body or a convergence of at least 3 surfaces of the body or a convergence of at least 4 surfaces of the body.

Embodiment 35. The coated abrasive article of embodiment 33, wherein the tip includes a tip edge having a length that is less than an average width or average thickness of the body.

Embodiment 36. The coated abrasive article of embodiment 33, wherein the tip comprises a tip edge having a wedge shape defined by a convergence of side surfaces in the dimension of the width of the particle, wherein a tip edge length is substantially similar to a thickness of the body.

Embodiment 37. The coated abrasive article of embodiment 33, wherein the tip comprises a tip edge having a tip edge length that is not greater than 99% of the average thickness of the body or not greater than 95% or not greater than 90% or not greater than 85% or not greater than 80% or not greater than 75% or not greater than 70% or not greater than 60% or not greater than 50% or not greater than 40% or not greater than 30% of the average thickness of the body.

Embodiment 38. The coated abrasive article of embodiment 37, wherein the tip edge length is at least 20% of the average thickness of the body or at least 30% or at least 40% or at least 50% or at least 60% or at least 70% or at least 80% or at least 90% or at least 95%.

Embodiment 39. The coated abrasive article of embodiment 33, wherein the tip includes a tip edge having a length that is less than an average width of the body.

Embodiment 40. The coated abrasive article of embodiment 39, wherein the tip edge length is not greater than 99% of the average width or not greater than 95% or not greater than 90% or not greater than 85% or not greater than 80% or not greater than 75% or not greater than 70% or not greater than 60% or not greater than 50% or not greater than 40% or not greater than 30% of the average width.

Embodiment 41. The coated abrasive article of embodiment 40, wherein the tip edge length is at least 0.1% of the average width or at least 1% or at least 2% or at least 3% or at least 5% or at least 8% or at least 10% or at least 12% or at least 15% or at least 20%.

Embodiment 42. The coated abrasive article of embodiment 33, wherein the tip includes a tip edge having a length substantially similar to the thickness of the body.

Embodiment 43. The coated abrasive article of embodiment 33, wherein the tip region is defined by a taper including a reduction in the width or thickness of the body over a tip region length.

Embodiment 44. The coated abrasive article of embodiment 33, wherein the tip region is defined by a taper including a reduction in the width of the body over a tip region length.

Embodiment 45. The coated abrasive article of embodiment 44, wherein the tip region is defined by a taper including a reduction in the width and thickness of the body over a tip region length.

Embodiment 46. The coated abrasive article of embodiment 44, wherein the tip region is defined by a taper including a change in the width of the body that is greater than a change in the thickness of the body in the tip region.

Embodiment 47. The coated abrasive article of embodiment 44, wherein the tip region is defined by a taper including a change in the width of the body and wherein the thickness is substantially the same throughout the length of the tip region.

Embodiment 48. The coated abrasive article of embodiment 33, wherein the tip region comprises an asymmetric taper including a first surface and a second surface, wherein the first surface has a different contour as compared to the second surface.

Embodiment 49. The coated abrasive article of embodiment 33, wherein the base comprises a projection extending from the body, wherein the projection extends at an angle relative to a longitudinal axis of the body, wherein the base region includes a base angle of at least 91 degrees and not greater than 180 degrees.

Embodiment 50. The coated abrasive article of embodiment 33, wherein the base region comprises a base including a base surface, wherein the base surface is angled relative to the longitudinal axis of the body.

Embodiment 51. The coated abrasive article of embodiment 33, wherein the base region comprises a base including a base surface, wherein the base surface is angled relative to the longitudinal axis of the body.

Embodiment 52. The coated abrasive article of embodiment 51, wherein the base surface is angled at an acute angle relative to the longitudinal axis of the body.

Embodiment 53. The coated abrasive article of embodiment 52, wherein the base surface is angled at not greater than 90 degrees relative to the longitudinal axis of the body or not greater than 88 degrees or not greater than 86 degrees or not greater than 84 degrees or not greater than 82 degrees or not greater than 80 degrees or not greater than 75 degrees or not greater than 70 degrees or not greater than 65 degrees or not greater than 60 degrees or not greater than 55 degrees or not greater than 50 degrees or not greater than 45 degrees or not greater than 40 degrees.

Embodiment 54. The coated abrasive article of embodiment 53, wherein the base surface is angled at an angle of at least 5 degrees relative to the longitudinal axis of the body or at least 10 degrees or at least 15 degrees or at least 20 degrees or at least 25 degrees or at least 30 degrees or at least 35 degrees or at least 40 degrees or at least 45 degrees or at least 50 degrees or at least 55 degrees.

Embodiment 55. The coated abrasive article of embodiment 33, wherein the base comprises a base surface including peaks and valleys.

Embodiment 56. The coated abrasive article of embodiment 55, wherein the arrangement of peaks and valleys is a random arrangement of peaks and valleys.

Embodiment 57. The coated abrasive article of embodiment 33, wherein the base comprises a base surface having a surface roughness greater than a surface roughness of a side surface of the body in an elongated region or the tip region.

Embodiment 58. The coated abrasive article of embodiment 33, wherein the base comprises a base surface having a plurality of peaks, wherein at least one peak of the plurality of peaks has a tip radius less than a tip radius of the tip of the body.

Embodiment 59. The coated abrasive article of embodiment 58, wherein at least 2 different peaks of the plurality of peaks each have a tip radius less than a tip radius of the tip of the body.

Embodiment 60. The coated abrasive article of embodiment 33, wherein the base comprises a primary peak as viewed in two dimensions define by the length and the width, wherein the primary peak comprises a primary peak angle of at least 45 degrees and not greater than 150 degrees.

Embodiment 61. The coated abrasive article of embodiment 60, wherein the primary peak angle is at least 50 degrees or at least 55 or at least 60 degrees or at least 65 degrees or at least 70 degrees or at least 75 degrees or at least 80 degrees or at least 85 degrees or at least 90 degrees or at least 95 degrees or at least 100 degrees.

Embodiment 62. The coated abrasive article of embodiment 60, wherein the primary peak angle is not greater than 145 degrees or not greater than 140 degrees or not greater than 135 degrees or not greater than 130 degrees or not greater than 125 degrees or not greater than 120 degrees or not greater than 115 degrees or not greater than 110 degrees or not greater than 100 degrees or not greater than 95 degrees.

Embodiment 63. The coated abrasive article of embodiment 33, wherein the base comprises a base surface that is defined by one or more facets having a substantially planar surface extending toward a primary peak of the base surface.

Embodiment 64. The coated abrasive article of embodiment 63, wherein the base surface comprises at least two facets that are abutting each other and define a common edge extending between the two facets.

Embodiment 65. The coated abrasive article of embodiment 33, wherein the base comprises a primary peak and a secondary peak separated from each other by a first primary valley as viewed in two-dimensions by a plane defined by the length and thickness of the body or in two-dimensions by a plane defined by the length and width of the body.

Embodiment 66. The coated abrasive article of embodiment 33, wherein the base comprises a primary peak as viewed in two dimensions define by the length and the width, wherein the primary peak comprises a tip sharpness that is greater than a tip sharpness of the tip of the body.

Embodiment 67. The coated abrasive article of embodiment 66, wherein the primary peak tip sharpness, as measured by a tip angle in two-dimensions defined by a plane of the length and width of the body, is at least 5% less than the tip sharpness of the tip of the body, wherein the tip sharpness is measured by a tip angle in two-dimensions defined by the plane of the length and width of the body or at least 8% or at least 10% or at least 12% or at least 15% or at least 20% or at least 25% or at least 30% or at least 40% or at least 50% or at least 60% or at least 70% or at least 80% or at least 90%.

Embodiment 68. The coated abrasive article of embodiment 33, further comprising an elongated region extending between the tip region and the base region.

Embodiment 69. The coated abrasive article of embodiment 68, wherein the elongated region defines a region between the tip region and the base region having a substantially constant width.

Embodiment 70. The coated abrasive article of embodiment 68, wherein the elongated region defines a region between the tip region and the base region having a substantially constant thickness.

Embodiment 71. The coated abrasive article of embodiment 68, wherein the elongated region defines a region having a change in width or thickness of not greater than 10% over the length of the elongated region or not greater than 8% or not greater than 5% or not greater than 3%.

Embodiment 72. The coated abrasive article of embodiment 33, wherein the body is linear for at least a majority of a total length of the body.

Embodiment 73. The coated abrasive article of embodiment 1, wherein each of the tapered abrasive particles comprises striations on at least one surface.

Embodiment 74. The coated abrasive article of embodiment 73, wherein the striations extend in a direction of the length of the body.

Embodiment 75. The coated abrasive article of embodiment 1, further comprising not greater than 50% of agglomerated particles for a total count of the plurality of abrasive or not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 6% or not greater than 4% or not greater than 2%, wherein the plurality of abrasive particles is free of agglomerated particles.

Embodiment 76. The coated abrasive article of embodiment 1, wherein the taper fraction standard deviation is at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060.

Embodiment 77. The coated abrasive article of embodiment 1, wherein the taper fraction standard deviation is not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040.

Embodiment 78. The coated abrasive article of any one of embodiments 76 and 77, wherein the taper fraction standard deviation is within a range of at least 0.025 and not greater than 0.085 or within a range of at least 0.028 and not greater than 0.070 or within a range of at least 0.03 and not greater than 0.06.

Embodiment 79. The coated abrasive article of embodiment 1, wherein the tapered abrasive particles have an average taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35.

Embodiment 80. The coated abrasive article of embodiment 1, wherein the tapered abrasive particles have an average taper fraction value of not greater than 0.8 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28.

Embodiment 81. The coated abrasive article of embodiment 1, wherein the plurality of abrasive particles have a batch taper fraction standard deviation of at least 0.025 and not greater than 0.090.

Embodiment 82. The coated abrasive article of embodiment 81, wherein the batch taper fraction standard deviation is at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060.

Embodiment 83. The coated abrasive article of embodiment 82, wherein the batch taper fraction standard deviation is not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040.

Embodiment 84. The coated abrasive article of any one of embodiments 82 and 83, wherein the batch taper fraction standard deviation is within a range of at least 0.025 and not greater than 0.085 or within a range of at least 0.028 and not greater than 0.070 or within a range of at least 0.03 and not greater than 0.060.

Embodiment 85. The coated abrasive article of embodiment 81, wherein the plurality of abrasive particles comprise an average batch taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35.

Embodiment 86. The coated abrasive article of embodiment 81, wherein the plurality of abrasive particles have an average batch taper fraction value of not greater than 0.8 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28.

Embodiment 87. The coated abrasive article of embodiment 1, wherein the tapered abrasive particles comprise an average elongation fraction value of at least 0.2 or at least 0.3 or at least 0.4 or at least 0.5 or at least 0.6.

Embodiment 88. The coated abrasive article of embodiment 87, wherein the tapered abrasive particles comprise an average elongation fraction value of not greater than 0.9 or not greater than 0.8 or not greater than 0.7 or not greater than 0.6.

Embodiment 89. The coated abrasive article of embodiment 87, wherein the tapered abrasive particles comprise an elongation fraction standard deviation of at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14.

Embodiment 90. The coated abrasive article of embodiment 87, wherein the tapered abrasive particles comprise an elongation fraction standard deviation of not greater than 0.3 or not greater than 0.25 or not greater than 0.2 or not greater than 0.19 or not greater than 0.18 or not greater than 0.17 or not greater than 0.16 or not greater than 0.15 or not greater than 0.14 or not greater than 0.13.

Embodiment 91. The coated abrasive article of embodiment 1, wherein the plurality of abrasive particles comprise an average batch elongation fraction value of at least 0.2 or at least 0.3 or at least 0.4 or at least 0.5 or at least 0.6.

Embodiment 92. The coated abrasive article of embodiment 91, wherein the average batch elongation fraction value is not greater than 0.9 or not greater than 0.8 or not greater than 0.7 or not greater than 0.6.

Embodiment 93. The coated abrasive article of embodiment 1, wherein the plurality of abrasive particles comprise a batch elongation fraction standard deviation of at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14.

Embodiment 94. The coated abrasive article of embodiment 93, wherein the batch elongation fraction standard deviation is not greater than 0.3 or not greater than 0.25 or not greater than 0.2 or not greater than 0.19 or not greater than 0.18 or not greater than 0.17 or not greater than 0.16 or not greater than 0.15 or not greater than 0.14 or not greater than 0.13.

Embodiment 95. The coated abrasive article of embodiment 1, wherein each of the tapered abrasive particles comprises a body having an average taper fraction value and average elongation fraction value, and wherein the average elongation fraction value is greater than the average taper fraction value.

Embodiment 96. The coated abrasive article of embodiment 95, wherein the average elongation fraction value is at least 10% greater than the average taper fraction value or at least 20% greater or at least 30% greater or at least 40% greater or at least 50% greater or at least 60% greater or at least 70% greater or at least 80% greater or at least 90% greater or at least 100% greater or at least 120% greater or at least 140% greater or at least 160% greater or at least 180% greater or at least 200% greater or at least 250% greater or at least 300% greater.

Embodiment 97. The coated abrasive article of embodiment 95, wherein the average elongation fraction value is not more than 1000% greater than the average taper fraction value or not more than 900% greater or not more than 800% greater or not more than 700% greater or not more than 600% greater or not more than 500% greater or not more than 400% greater or not more than 300% greater or not more than 200% greater or not more than 150% greater.

Embodiment 98. The coated abrasive article of embodiment 97, wherein the average elongation fraction value is at least 50% greater and not more than 500% greater than the average taper fraction value.

Embodiment 99. The coated abrasive article of embodiment 1, wherein the tapered abrasive particles comprise an average solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97.

Embodiment 100. The coated abrasive article of embodiment 99, wherein the average solidity is not greater than 0.99 or not greater than 0.98 or not greater than 0.97 or not greater than 0.96 or not greater than 0.95.

Embodiment 101. The coated abrasive article of embodiment 1, wherein the plurality of abrasive particles comprises an average batch solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97.

Embodiment 102. The coated abrasive article of embodiment 101, wherein the average batch solidity is not greater than 0.99 or not greater than 0.98 or not greater than 0.97 or not greater than 0.96 or not greater than 0.95.

Embodiment 103. The plurality of abrasive particles of embodiment 1, wherein the tapered abrasive particles comprise a solidity standard deviation of not greater than 0.05 or not greater than 0.045 or not greater than 0.04 or not greater than 0.035 or not greater than 0.030 or not greater than 0.025 or not greater than 0.020.

Embodiment 104. The coated abrasive article of embodiment 103, wherein the solidity standard deviation is at least 0.0001 or at least 0.001 or at least 0.01 or at least 0.015 or at least 0.020.

Embodiment 105. The coated abrasive article of embodiment 1, wherein the plurality of abrasive particles comprises a batch solidity standard deviation of not greater than 0.05 or not greater than 0.045 or not greater than 0.04 or not greater than 0.035 or not greater than 0.030 or not greater than 0.025 or not greater than 0.020.

Embodiment 106. The coated abrasive article of embodiment 105, wherein the batch solidity standard deviation is at least or at least 0.01 or at least 0.015 or at least 0.020.

Embodiment 107. The coated abrasive article of embodiment 1, wherein the plurality of abrasive particles have a predetermined lateral position, a predetermined longitudinal position, a predetermined radial position, a predetermined rotational orientation, a predetermined tilt angle, or any combination thereof.

Embodiment 108. The coated abrasive article of embodiment 1, wherein the plurality of abrasive particles is distributed over the substrate in a predetermined distribution.

Embodiment 109. The coated abrasive article of embodiment 1, wherein the plurality of abrasive particles has a random rotational orientation.

Embodiment 110. The coated abrasive article of embodiment 1, wherein the plurality of abrasive particles is arranged in a two-dimensional array.

Embodiment 111. A coated abrasive article comprising:
a substrate; and
a plurality of abrasive particles, each of the abrasive particles of the plurality of abrasive particles having a body including a length, width and thickness, wherein the plurality of abrasive particles have an average primary batch aspect ratio [B(length/width)] within a range of at least 2.1 to not greater than 4.7 and a primary batch aspect ratio standard deviation [STDEV-B(length/width)] of at least 0.05 and not greater than 0.55.

Embodiment 112. The coated abrasive article of embodiment 111, wherein the average primary batch aspect ratio [B(length/width)] is at least 2.2 or at least 2.3 or at least 2.4 or at least 2.5 or at least 2.6 or at least 2.7 or at least 2.8.

Embodiment 113. The coated abrasive article of embodiment 112, wherein the average primary batch aspect ratio [B(length/width)] is not greater than 4.6 or not greater than 4.5 or not greater than 4.4 or not greater than 4.3.

Embodiment 114. The coated abrasive article of embodiment 111, wherein the plurality of abrasive particles comprise a primary batch aspect ratio standard deviation [STDEV-B(length/width)] of not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 115. The coated abrasive article of embodiment 114, wherein the primary batch aspect ratio standard deviation [STDEV-B(length/width)] is at least 0.06 or at least 0.07 or at least 0.08 or at least 0.09 or at least 0.10 or at least 0.12 or at least 0.15 or at least 0.20 or at least 0.25 or at least 0.30 or at least 0.33 or at least 0.35 or at least 0.37.

Embodiment 116. The coated abrasive article of embodiment 111, wherein the primary batch aspect ratio standard deviation [STDEV-B(length/width)] is within a range of at least 0.10 and not greater than 0.5 or within a range of at least 0.15 and not greater than 0.5 or within a range of at least 0.2 and not greater than 0.45.

Embodiment 117. The coated abrasive article of embodiment 111, wherein the plurality of abrasive particles have an average secondary batch aspect ratio [B(length/thickness)] of at least 2.2 or at least 2.3 or at least 2.4 or at least 2.5 or at least 2.6 or at least 2.7 or at least 2.8.

Embodiment 118. The coated abrasive article of embodiment 117, wherein the secondary batch aspect ratio [B(length/thickness)] is not greater than 4.6 or not greater than 4.5 or not greater than 4.4 or not greater than 4.3.

Embodiment 119. The coated abrasive article of embodiment 111, wherein the plurality of particles comprise a secondary batch aspect ratio standard deviation [STDEV-B (length/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 120. The coated abrasive article of embodiment 119, wherein the secondary batch aspect ratio standard deviation [STDEV-B(length/thickness)] is at least 0.05 or at least 0.06 or at least 0.07 or at least 0.08 or at least 0.09 or at least 0.10 or at least 0.12 or at least 0.15 or at least 0.20 or at least 0.25 or at least 0.30 or at least 0.33 or at least 0.35 or at least 0.37.

Embodiment 121. The coated abrasive article of embodiment 111, wherein the plurality of abrasive particles have a tertiary batch aspect ratio [B(width/thickness)] of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4.

Embodiment 122. The coated abrasive article of embodiment 121, wherein the tertiary batch aspect ratio [B(width/width)] is not greater than 5 or not greater than 4 or not greater than 2 or not greater than 1.5 or not greater than 1.3 or not greater than 1.1.

Embodiment 123. The coated abrasive article of embodiment 111, wherein the plurality of abrasive particles comprise a tertiary batch aspect ratio standard deviation [STDEV-B(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 124. The coated abrasive article of embodiment 123, wherein the tertiary batch aspect ratio standard deviation [STDEV-B(width/thickness)] is at least 0.01 or at least 0.05 or at least 0.1 or at least 0.15 or at least 0.2 or at least 0.25 or at least 0.30 or at least 0.35 or at least 0.4.

Embodiment 125. The coated abrasive article of embodiment 111, wherein the plurality of abrasive particles includes tapered abrasive particles, each of the tapered abrasive particles comprises a body including a tip region including a tip of the body, a base region including a base of the body, wherein the base region is at an opposite end of the body from the tip region along a length of the body.

Embodiment 126. The coated abrasive article of embodiment 125, wherein the tip is defined by a convergence of at least 2 surfaces of the body or a convergence of at least 3 surfaces of the body or a convergence of at least 4 surfaces of the body.

Embodiment 127. The coated abrasive article of embodiment 125, wherein the tip includes a tip edge having a length that is less than an average width or average thickness of the body.

Embodiment 128. The coated abrasive article of embodiment 125, wherein the tip region is defined by a taper including a reduction in the width or thickness of the body over a tip region length.

Embodiment 129. The coated abrasive article of embodiment 125, wherein the base region comprises a base including a base surface, wherein the base surface is angled relative to the longitudinal axis of the body.

Embodiment 130. The coated abrasive article of embodiment 129, wherein the base surface is angled at an acute angle relative to the longitudinal axis of the body.

Embodiment 131. The coated abrasive article of embodiment 130, wherein the base surface is angled at not greater than 90 degrees relative to the longitudinal axis of the body or not greater than 88 degrees or not greater than 86 degrees or not greater than 84 degrees or not greater than 82 degrees or not greater than 80 degrees or not greater than 75 degrees or not greater than 70 degrees or not greater than 65 degrees or not greater than 60 degrees or not greater than 55 degrees or not greater than 50 degrees or not greater than 45 degrees or not greater than 40 degrees.

Embodiment 132. The coated abrasive article of embodiment 130, wherein the base surface is angled at an angle of at least 5 degrees relative to the longitudinal axis of the body or at least 10 degrees or at least 15 degrees or at least 20 degrees or at least 25 degrees or at least 30 degrees or at least 35 degrees or at least 40 degrees or at least 45 degrees or at least 50 degrees or at least 55 degrees.

Embodiment 133. The coated abrasive article of embodiment 125, wherein the base comprises a base surface including peaks and valleys.

Embodiment 134. The coated abrasive article of embodiment 133, wherein the arrangement of peaks and valleys is a random arrangement of peaks and valleys.

Embodiment 135. The coated abrasive article of embodiment 125, wherein the base comprises a base surface having a surface roughness greater than a surface roughness of a side surface of the body in an elongated region or the tip region.

Embodiment 136. The coated abrasive article of embodiment 125, wherein the base comprises a base surface having a plurality of peaks, wherein at least one peak of the plurality of peaks has a tip radius less than a tip radius of the tip of the body.

Embodiment 137. The coated abrasive article of embodiment 136, wherein at least 2 different peaks of the plurality of peaks each have a tip radius less than a tip radius of the tip of the body.

Embodiment 138. The coated abrasive article of embodiment 125, wherein the base comprises a primary peak as viewed in two dimensions define by the length and the width, wherein the primary peak comprises a primary peak angle of at least 45 degrees and not greater than 150 degrees.

Embodiment 139. The coated abrasive article of embodiment 138, wherein the primary peak angle is at least 50 degrees or at least 55 or at least 60 degrees or at least 65 degrees or at least 70 degrees or at least 75 degrees or at least 80 degrees or at least 85 degrees or at least 90 degrees or at least 95 degrees or at least 100 degrees.

Embodiment 140. The coated abrasive article of embodiment 138, wherein the primary peak angle is not greater than 145 degrees or not greater than 140 degrees or not greater than 135 degrees or not greater than 130 degrees or not greater than 125 degrees or not greater than 120 degrees or not greater than 115 degrees or not greater than 110 degrees or not greater than 100 degrees or not greater than 95 degrees.

Embodiment 141. The coated abrasive article of embodiment 125, wherein the base comprises a base surface that is defined by one or more facets, the base surface having a substantially planar surface extending toward a primary peak of the base surface.

Embodiment 142. The coated abrasive article of embodiment 141, wherein the base surface comprises at least two facets that are abutting each other and define a common edge extending between the two facets.

Embodiment 143. The coated abrasive article of embodiment 125, wherein the base comprises a primary peak and a secondary peak separated from each other by a first primary valley as viewed in two-dimensions by a plane defined by the length and thickness of the body or in two-dimensions by a plane defined by the length and width of the body.

Embodiment 144. The coated abrasive article of embodiment 125, wherein the base comprises a primary peak as viewed in two dimensions define by the length and the width, wherein the primary peak comprises a tip sharpness that is greater than a tip sharpness of the tip of the body.

Embodiment 145. The coated abrasive article of embodiment 144, wherein the primary peak tip sharpness, as measured by a tip angle in two-dimensions defined by a plane of the length and width of the body, is at least 5% less than the tip sharpness of the tip of the body, wherein the tip sharpness is measured by a tip angle in two-dimensions defined by the plane of the length and width of the body or at least 8% or at least 10% or at least 12% or at least 15% or at least 20% or at least 25% or at least 30% or at least 40% or at least 50% or at least 60% or at least 70% or at least 80% or at least 90%.

Embodiment 146. The coated abrasive article of embodiment 125, further comprising an elongated region extending between the tip region and the base region.

Embodiment 147. The coated abrasive article of embodiment 146, wherein the elongated region defines a region between the tip region and the base region having a substantially constant width.

Embodiment 148. The coated abrasive article of embodiment 146, wherein the elongated region defines a region between the tip region and the base region having a substantially constant thickness.

Embodiment 149. The coated abrasive article of embodiment 146, wherein the elongated region defines a region having a change in width or thickness of not greater than 10% over the length of the elongated region or not greater than 8% or not greater than 5% or not greater than 3%.

Embodiment 150. The coated abrasive article of embodiment 146, wherein the body is linear for at least a majority of a total length of the body.

Embodiment 151. The coated abrasive article of embodiment 111, wherein each of the tapered abrasive particles comprises striations on at least one surface.

Embodiment 152. The coated abrasive article of embodiment 151, wherein the striations extend in a direction of the length of the body.

Embodiment 153. The coated abrasive article of embodiment 111, further comprising not greater than 50% of agglomerated particles for a total count of particles in the batch or not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 6% or not greater than 4% or not greater than 2%, wherein the plurality of abrasive particles is free of agglomerated particles.

Embodiment 154. The coated abrasive article of embodiment 125, wherein the tip region comprises an asymmetric taper including a first surface and a second surface, wherein the first surface has a different contour as compared to the second surface.

Embodiment 155. The coated abrasive article of embodiment 125, wherein the base comprises a projection extending from the body, wherein the projection extends at an angle relative to a longitudinal axis of the body.

Embodiment 156. The coated abrasive article of embodiment 125, wherein the base region comprises a base including a base surface, wherein the base surface is angled relative to the longitudinal axis of the body.

Embodiment 157. The coated abrasive article of embodiment 125, wherein at least 5% of the abrasive particles in the plurality of abrasive particles includes tapered abrasive particles or at least 8% or at least 10% or at least 12% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 68% or at least 70% or at least 72% or at least 75% or at least 78% or at least 80% or at least 82% or at least 85% or at least 88% or at least 90% or at least 92% or at least 95% or at least 98% or at least 99%.

Embodiment 158. The coated abrasive article of embodiment 125, wherein the plurality of abrasive particles consists of only tapered abrasive particles.

Embodiment 159. The coated abrasive article of embodiment 125, wherein the plurality of abrasive particles comprises a blend including a first portion of abrasive particles and a second portion of abrasive particles, and further comprising tapered abrasive particles included in the first portion, the second portion, or both the first portion and second portion.

Embodiment 160. The coated abrasive article of embodiment 125, wherein the tapered abrasive particles have a taper fraction standard deviation of at least 0.025 and not greater than 0.095.

Embodiment 161. The coated abrasive article of embodiment 160, wherein the taper fraction standard deviation is at least wherein the taper fraction standard deviation is at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060.

Embodiment 162. The coated abrasive article of embodiment 160, wherein the taper fraction standard deviation is not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040.

Embodiment 163. The coated abrasive article of embodiment 160, wherein the taper fraction standard deviation is within a range of at least 0.025 and not greater than 0.085 or within a range of at least 0.028 and not greater than 0.070 or within a range of at least 0.03 and not greater than 0.06.

Embodiment 164. The coated abrasive article of embodiment 125, wherein the tapered abrasive particles have an average taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35.

Embodiment 165. The coated abrasive article of embodiment 164, wherein the tapered abrasive particles have an average taper fraction value of not greater than 0.8 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28.

Embodiment 166. The coated abrasive article of embodiment 125, wherein the plurality of abrasive particles have a batch taper fraction standard deviation of at least 0.025 and not greater than 0.090.

Embodiment 167. The coated abrasive article of embodiment 166, wherein the batch taper fraction standard deviation is at least is at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060.

Embodiment 168. The coated abrasive article of embodiment 167, wherein the batch taper fraction standard deviation is not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040.

Embodiment 169. The coated abrasive article of embodiment 166, wherein the batch taper fraction standard deviation is within a range of at least of at least 0.025 and not greater than 0.085 or within a range of at least 0.028 and not greater than 0.070 or within a range of at least 0.03 and not greater than 0.060.

Embodiment 170. The coated abrasive article of embodiment 125, wherein the plurality of abrasive particles comprise an average batch taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35.

Embodiment 171. The coated abrasive article of embodiment 170, wherein the plurality of abrasive particles have an average batch taper fraction value of not greater than 0.80 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28.

Embodiment 172. The coated abrasive article of embodiment 125, wherein each of the tapered abrasive particles comprises a body having an elongation region, and wherein the elongation region taper fraction value is at least 0.15 or at least 0.18 or at least 0.20 or at least 0.25 or at least 0.30 or at least 0.35 or at least 0.40 or at least 0.45 or at least 0.50.

Embodiment 173. The coated abrasive article of embodiment 172, wherein the elongation region taper fraction value is not greater than 1 or not greater than 0.9 or not greater than 0.8 or not greater than 0.7 or not greater than 0.6.

Embodiment 174. The coated abrasive article of embodiment 125, wherein the tapered abrasive particles comprises a body having an elongation region, and wherein the elongation region taper fraction value standard deviation is at least 0.03 or at least 0.05 or at least 0.08 or at least 0.10 or at least 0.12 or at least 0.16 or at least 0.18.

Embodiment 175. The coated abrasive article of embodiment 174, wherein the elongation region taper fraction value standard deviation is not greater than 0.3 or not greater than 0.2 or not greater than 0.18 or not greater than 0.16 or not greater than 0.15 or not greater than 0.14

Embodiment 176. The coated abrasive article of embodiment 125, wherein the tapered abrasive particles comprise an average solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97.

Embodiment 177. The coated abrasive article of embodiment 176, wherein the average solidity is not greater than 0.99 or not greater than 0.98 or not greater than 0.97 or not greater than 0.96 or not greater than 0.95.

Embodiment 178. The coated abrasive article of embodiment 125, wherein the plurality of abrasive particles comprises an average batch solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97.

Embodiment 179. The coated abrasive article of embodiment 178, wherein the average batch solidity is not greater than 0.99 or not greater than 0.98 or not greater than 0.97 or not greater than 0.96 or not greater than 0.95.

Embodiment 180. The coated abrasive article of embodiment 125, wherein the tapered abrasive particles comprise a solidity standard deviation of not greater than 0.05 or not greater than 0.045 or not greater than 0.04 or not greater than 0.035 or not greater than 0.030 or not greater than 0.025 or not greater than 0.020.

Embodiment 181. The coated abrasive article of embodiment 180, wherein the solidity standard deviation is at least 0.0001 or at least 0.001 or at least 0.01 or at least 0.015 or at least 0.020.

Embodiment 182. The coated abrasive article of embodiment 125, wherein the plurality of abrasive particles comprises a batch solidity standard deviation of not greater than 0.05 or not greater than 0.045 or not greater than 0.04 or not greater than 0.035 or not greater than 0.030 or not greater than 0.025 or not greater than 0.020.

Embodiment 183. The coated abrasive article of embodiment 182, wherein the batch solidity standard deviation is at least 0.0001 or at least 0.001 or at least 0.01 or at least 0.015 or at least 0.020.

Embodiment 184. The coated abrasive article of embodiment 111, wherein the plurality of abrasive particles comprises tapered abrasive particles having an average elongation fraction value of at least 0.2 or at least 0.3 or at least 0.4 or at least 0.5 or at least 0.6.

Embodiment 185. The coated abrasive article of embodiment 184, wherein the tapered abrasive particles comprise an average elongation fraction value of not greater than 0.9 or not greater than 0.8 or not greater than 0.7 or not greater than 0.6.

Embodiment 186. The coated abrasive article of embodiment 111, wherein the plurality of abrasive particles comprises tapered abrasive particles having an elongation fraction standard deviation of at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14.

Embodiment 187. The coated abrasive article of embodiment 186, wherein the tapered abrasive particles comprise an elongation fraction standard deviation of not greater than 0.3 or not greater than 0.25 or not greater than 0.2 or not greater than 0.19 or not greater than 0.18 or not greater than 0.17 or not greater than 0.16 or not greater than 0.15 or not greater than 0.14 or not greater than 0.13.

Embodiment 188. The coated abrasive article of embodiment 111, wherein the plurality of abrasive particles comprise an average batch elongation fraction value of at least 0.2 or at least 0.3 or at least 0.4 or at least 0.5 or at least 0.6.

Embodiment 189. The coated abrasive article of embodiment 188, wherein the average batch elongation fraction value is not greater than 0.9 or not greater than 0.8 or not greater than 0.7 or not greater than 0.6.

Embodiment 190. The coated abrasive article of embodiment 111, wherein the plurality of abrasive particles comprises a batch elongation fraction standard deviation of at least 0.02 or at least 0.03 or at least 0.04 or at least 0.05 or at least 0.06 or at least 0.07 or at least 0.08 or at least 0.09 or at least 0.1 or at least 0.11 or at least 0.12 or at least 0.13 or at least 0.14.

Embodiment 191. The coated abrasive article of embodiment 190, wherein the batch elongation fraction standard deviation is not greater than 0.3 or not greater than 0.25 or not greater than 0.2 or not greater than 0.19 or not greater than 0.18 or not greater than 0.17 or not greater than 0.16 or not greater than 0.15 or not greater than 0.14 or not greater than 0.13.

Embodiment 192. The coated abrasive article of embodiment 111, wherein the plurality of abrasive particles have a predetermined position relative to each other.

Embodiment 193. The coated abrasive article of embodiment 192, wherein the plurality of abrasive particles have a predetermined lateral position, a predetermined longitudinal position, a predetermined radial position, a predetermined rotational orientation, a predetermined tilt angle, or any combination thereof.

Embodiment 194. The coated abrasive article of embodiment 192, wherein the plurality of abrasive particles is distributed over the substrate in a predetermined distribution.

Embodiment 195. The coated abrasive article of embodiment 192, wherein the plurality of abrasive particles has a random rotational orientation.

Embodiment 196. The coated abrasive article of embodiment 192, wherein the plurality of abrasive particles is arranged in a two-dimensional array.

Embodiment 197. The coated abrasive article of any of the preceding embodiments, wherein each body of each shaped abrasive particle of the plurality of shaped abrasive particles comprises a cross-sectional shape selected from the group consisting of a regular polygon, an irregular polygon, an ellipse, a circle or any combination thereof.

Embodiment 198. A coated abrasive article comprising:
  a substrate;
  a plurality of abrasive particles overlying the substrate, the abrasive layer including extruded grains; and
  wherein the coated abrasive article comprises at least one of:
    i) a Total ΔSGE Factor of not greater than 6×10−4 [(Hp/in3/min)/g] for a minimum of 1500 g of total material removed;
    ii) an Initial ΔSGE Factor of not greater than 5×10−4 [(Hp/in3/min)/g] for the first 1000 g of material removed;
    iii) a Final ΔSGE Factor of not greater than 6×10−4 [(Hp/in3/min)/g] for at least the final 800 g of material removed; or
    iv) any combination of i-iii.

Embodiment 199. The coated abrasive article of embodiment 198, further comprising any of the features of embodiments 1-197.

Embodiment 200. The coated abrasive article of embodiment 198, wherein the Total ΔSGE Factor is not greater than 5.5×10−4 [(Hp/in3/min)/g] for a minimum of 1500 g total material removed or not greater than 5×10−4 [(Hp/in3/min)/g] for a minimum of 1500 g total material removed or not greater than 4.8×10−4 [(Hp/in3/min)/g] for a minimum of 1500 g total material removed or not greater than 4.7×10−4 [(Hp/in3/min)/g] for a minimum of 1500 g total material removed or not greater than 4.6×10−4 [(Hp/in3/min)/g] for a minimum of 1500 g total material removed or not greater than 4.5×10−4 [(Hp/in3/min)/g] for a minimum of 1500 g total material removed or not greater than 4.4×10−4 [(Hp/in3/min)/g] for a minimum of 1500 g total material removed or not greater than 4.2×10−4 [(Hp/in3/min)/g] for a minimum of 1500 g total material removed or not greater than 4×10−4 [(Hp/in3/min)/g] for a minimum of 1500 g total material removed.

Embodiment 201. The coated abrasive article of embodiment 198, wherein the Total ΔSGE Factor is at least 0.1×10−6 [(Hp/in3/min)/g] for a minimum of 1500 g total material removed or at least 0.1×10−5 [(Hp/in3/min)/g] for a minimum of 1500 g total material removed or at least 0.1×10−4 [(Hp/in3/min)/g] for a minimum of 1500 g total material removed or at least $1\times10^{-4}$ [(Hp/in3/min)/g] for a minimum of 1500 g total material removed or at least 3×10−4 [(Hp/in3/min)/g] for a minimum of 1500 g total material removed.

Embodiment 202. The coated abrasive article of embodiment 198, wherein the Initial ΔSGE Factor of not greater than 5×10−4 [(Hp/in3/min)/g] for the first 1000 g of material removed or not greater than 4.9×10−4 [(Hp/in3/min)/g] for the first 1000 g of material removed or not greater than 4.8×10−4 [(Hp/in3/min)/g] for the first 1000 g of material removed or not greater than 4.7×10−4 [(Hp/in3/min)/g] for the first 1000 g of material removed or not greater than 4.6×10−4 [(Hp/in3/min)/g] for the first 1000 g of material removed or not greater than 4.5×10−4 [(Hp/in3/min)/g] for the first 1000 g of material removed or not greater than 4.4×10−4 [(Hp/in3/min)/g] for the first 1000 g of material removed or not greater than 4.2×10−4 [(Hp/in3/min)/g] for the first 1000 g of material removed or not greater than 4.1×10−4 [(Hp/in3/min)/g] for the first 1000 g of material removed or not greater than 4×10−4 [(Hp/in3/min)/g] for the first 1000 g of material removed.

Embodiment 203. The coated abrasive article of embodiment 198, wherein the Initial ΔSGE Factor is at least 0.1×10−6 [(Hp/in3/min)/g] for the first 1000 g of material removed or at least 0.1×10−5 [(Hp/in3/min)/g] for the first 1000 g of material removed or at least 0.1×10−4 [(Hp/in3/min)/g] for the first 1000 g of material removed or at least $1\times10^{-4}$ [(Hp/in3/min)/g] for the first 1000 g of material removed or at least 2×10−4 [(Hp/in3/min)/g] for the first 1000 g of material removed or at least 3×10−4 [(Hp/in3/min)/g] for the first 1000 g of material removed.

Embodiment 204. The coated abrasive article of embodiment 198, wherein the Final ΔSGE Factor is not greater than 6×10−4 [(Hp/in3/min)/g] for at least the final 800 g of material removed or not greater than 5.5×10−4 [(Hp/in3/min)/g] for at least the final 800 g of material removed or not greater than 5.3×10−4 [(Hp/in3/min)/g] for at least the final 800 g of material removed or not greater than 5×10−4 [(Hp/in3/min)/g] for at least the final 800 g of material removed or not greater than 4.8×10−4 [(Hp/in3/min)/g] for at least the final 800 g of material removed or not greater than 4.5×10−4 [(Hp/in3/min)/g] for at least the final 800 g of material removed or not greater than 4.3×10−4 [(Hp/in3/min)/g] for at least the final 800 g of material removed or not greater than 4×10−4 [(Hp/in3/min)/g] for at least the final 800 g of material removed or not greater than 3.9×10−4 [(Hp/in3/min)/g] for at least the final 800 g of material removed or not greater than 3.7×10−4 [(Hp/in3/min)/g] for at least the final 800 g of material removed.

Embodiment 205. The coated abrasive article of claim 198, wherein the Final ΔSGE Factor is at least 1×10−6 [(Hp/in3/min)/g] for at least the final 800 g of material or at least 1×10−5 [(Hp/in3/min)/g] for at least the final 800 g of material or at least $1\times10^{-4}$ [(Hp/in3/min)/g] for at least the final 800 g of material or at least 2×10−4 [(Hp/in3/min)/g] for at least the final 800 g of material.

Embodiment 206. The coated abrasive article of embodiment 198, comprising:
  a Total ΔSGE Factor of at least 0.1×10−6 [(Hp/in3/min)/g] and not greater than 6×10−4 [(Hp/in3/min)/g] for a minimum of 1500 g of total material removed;
  an Initial ΔSGE Factor of at least 1×10−6 [(Hp/in3/min)/g] and not greater than 5×10−4 [(Hp/in3/min)/g] for the first 1000 g of material removed; and
  a Final ΔSGE Factor of at least 1×10−6 [(Hp/in3/min)/g] and not greater than 6×10−4 [(Hp/in3/min)/g] for at least the final 800 g of material removed.

Embodiment 207. The coated abrasive article of any of the preceding embodiments herein, wherein the plurality of abrasive particles comprises a blend including a first portion of abrasive particles comprising a first type of abrasive particles, the blend further comprising a second portion of abrasive particles having a second type of abrasive particles, wherein the first type and second type are different from each other based on at least one abrasive characteristic selected from the group of average grain size, average particle size, friability, toughness, hardness, two-dimensional shape, three-dimensional shape, any of the features described in the embodiments herein, or any combination thereof.

Embodiment 208. The coated abrasive article of any of the preceding embodiments herein, wherein the plurality of abrasive particles comprises a blend including a first portion of abrasive particles comprising tapered abrasive particles and a second portion comprising randomly-shaped abrasive particles.

EXAMPLES

Example 1

Tapered abrasive particles were made according to the following conditions. A mixture was created including approximately 48-55 wt % boehmite, which was obtained from Sasol Corporation. One suitable type of commercially available boehmite is Disperal. The boehmite was mixed and seeded with 1% alpha alumina seeds relative to the total alumina content of the mixture. The alpha alumina seeds were made by milling of corundum using conventional techniques, described for example in U.S. Pat. No. 4,623,364. The mixture also included 45-52 wt % water and 2.5-7 wt % additional nitric acid. The ingredients were mixed in a planetary mixer of conventional design and mixed under reduced pressure to remove gaseous elements from the mixture (e.g., bubbles). The coil value was approximately 1000-1500 N.

After gelling, the mixture was extruded into and through cavities of a production tool. The extrusion rate and translation rate of the production tool were finely controlled to facilitate formation of a batch of abrasive particles having a high content of tapered shaped abrasive particles (e.g., above 65% of all total particles). Sieving and sorting techniques were further used to increase the percentage of tapered shaped abrasive particles in the batch. The cavities of the production tool had a quadrilateral shape having a side length of 0.5 mm. The gel mixture was extruded through the cavities of the production tool and dried for approximately 8-30 minutes before being removed from the cavities by contact by a brush on the back-side of the production tool. The precursor shaped abrasive particles were sintered between 1300-1350° C. for approximately 10 minutes.

Exemplary tapered abrasive particles formed according to Example 1 are provided in the image of FIG. 2A. The tapered abrasive particles had an average length of approximately 2 mm, an average width of approximately 0.5 mm microns and an average thickness of approximately 0.5 mm with a quadrilateral cross-sectional shape as viewed in the elongated region in the plane of the width and thickness. The bodies of the tapered abrasive particles were formed essentially of a seeded sol-gel alumina material having an average grain size of less than 1 micron.

Example 2

The particles from Example 1 (Sample S1) were tested according to a single grit grinding test (SGGT) in two different orientations: 1) a tip region up orientation wherein the tip was initiating the grinding of the workpiece; and 2) a base region up orientation wherein the base was initiating the grinding of the workpiece. In conducting the SGGT, one single abrasive particle is held in a grit holder by a bonding material of epoxy. The abrasive particle is secured in the desired orientation (i.e., tip region up orientation or base region up orientation) and moved across a workpiece of 304 stainless steel for a scratch length of 8 inches using a wheel speed of 22 m/s and an initial scratch depth of 30 microns. The abrasive particle produces a groove in the workpiece having a cross-sectional area. For each sample set, each shaped abrasive particle completes 15 passes across the 8 inch length, 10 individual particles are tested for each of the orientation and the results are analyzed. The test measures the forces exerted by the grit on the workpiece. The tangential force (Ft) is in the direction that is parallel to the surface of the workpiece and the direction of the groove. The normal force (Fn) perpendicular to the surface of the workpiece is also measured. The combination of manual touch-off by infeeding a spinning grain slowly at micron intervals and net change in the measured cross-sectional area of the groove from beginning to the end of the scratch length is used to determine the shaped abrasive particle wear. The net change in the cross-sectional area of the groove for each pass can be measured. For the SGGT, the net cross-sectional area of the groove (A) is defined as the difference between the cross-sectional area of the groove below the surface and the cross-sectional area of the material displaced above the surface. Performance (Ft/A or Fn/A) is defined as the ratio of the tangential or normal force to the net cross-sectional area of the groove.

The SGGT is conducted using two different orientations of the abrasive particles relative to the workpiece as described above. The SGGT is conducted with a first sample set of abrasive particles in a first orientation (e.g., tip region up orientation for tapered abrasive particles). The SGGT is also conducted with a second sample set of abrasive particles in a second orientation ((e.g., tip region up orientation for tapered abrasive particles).

Figure 9:
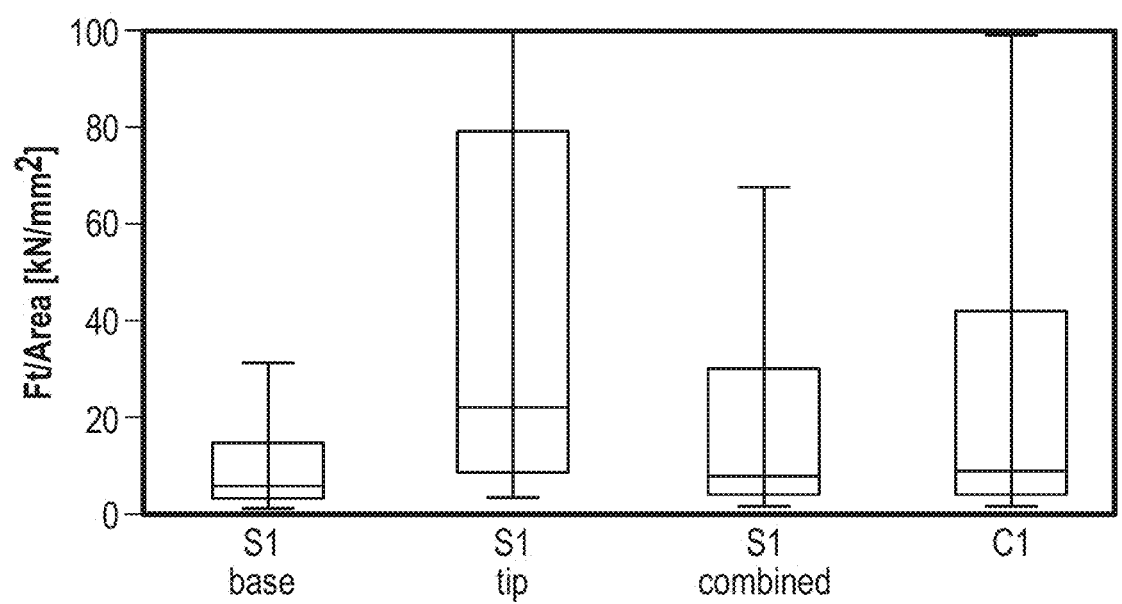
FIG. 9 includes a plot of median force per total area removed from the workpiece for abrasive particles of Example 1 and conventional extruded particles.

FIG. 9 includes a plot of median force per total area removed from the workpiece for Sample S1 in a tip region up orientation and a base region up orientation. FIG. 9 also includes the results of SGGT for conventional extruded particles (Sample C1) commercially available as Targa from Saint-Gobain Corporation and generally formed according to U.S. Pat. No. 5,090,968A. Remarkably, and unexpectedly, the tapered abrasive particles of Sample S1 demonstrated more efficient grinding in the base region up orientation as compared to the tip region up orientation. Moreover, the particles of Sample S1 had notably distinct performance as compared to the particles of Sample C1.

Table 3 includes a comparison of certain features between Samples S1, C1, and C2. Sample C2 is a shaped abrasive particle commercially available from 3M as Cubitron II. The batch averages and standard deviations for S1, C1, and C2 are essentially the same as the values reported in Table 1 for the respective samples.

TABLE 1

|  | S1 | C1 | C2 |
|---|---|---|---|
| Average Primary Aspect Ratio | 2.7 | 2.9 | 1 |
| Primary Aspect Ratio St. Dev. | 0.40 | 0.64 | 0.03 |
| Average Secondary Aspect Ratio | 2.4 | 3.4 |  |
| Secondary Aspect Ratio St. Dev. | 0.12 | 0.20 |  |
| Average Tertiary Aspect Ratio | 1.0 | 1.1 |  |
| Tertiary Aspect Ratio St. Dev. | 0.4 | 0.07 |  |
| Average Elongation Fraction Value | 0.48 | 0.46 | 0.13 |
| Elongation Fraction St. Dev. | 0.11 | 0.17 | 0.01 |
| Average Taper Fraction Value | 0.21 | 0.22 | 0.37 |
| Taper Value St. Dev. | 0.05 | 0.11 | 0.02 |
| Average Solidity | 0.92 | 0.86 | 0.97 |
| Solidity St. Dev. | 0.03 | 0.06 | 0.01 |

Figure 14A:
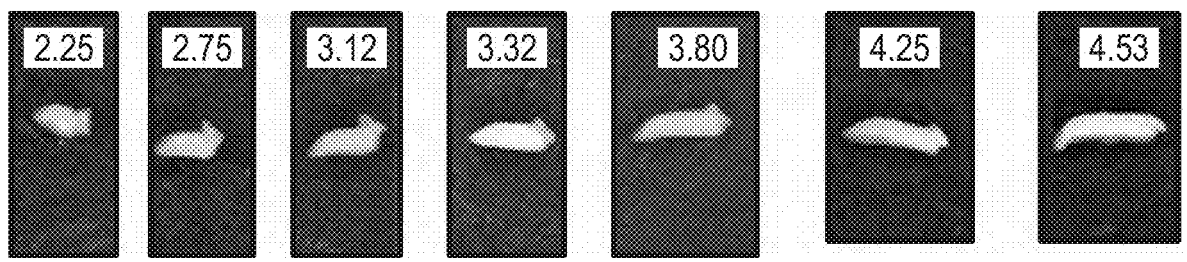
FIG. 14A includes images of shaped abrasive particles according to an embodiment.
Figure 14B:
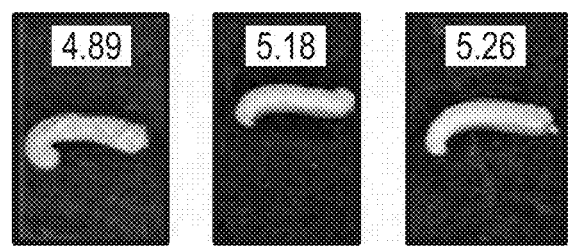
FIG. 14B includes images of shaped abrasive particles.

FIG. 14A includes images of tapered abrasive particles having different primary aspect ratios, which are representative of the tapered abrasive particles in Sample S1. FIG. 14B includes images of extruded abrasive particles having a greater aspect ratio as compared to the particles of FIG. 14A. The particles of FIG. 14B are akin to particles in Sample C1. Comparison of the particles from FIGS. 14A and 14B illustrate the change in the shape of particles with changing aspect ratio. Notably, the shapes with greater aspect ratio have been noted to have a greater curvature and form hook-shaped particles, which can have additional challenges when attempting to orient the particles in predetermined positions and orientations in fixed abrasive articles, and in particular, coated abrasive articles. The particles of FIG. 14A, having less curvature than the particles of FIG. 14B, can be easier to place in predetermined positions and orientations in fixed abrasive articles.

Example 3

Four types of coated abrasive samples were made and tested according to the details below. Notably, Coated Sample 1 (CaS1) included only abrasive particles of Sample S1, a Conventional Coated Sample (CaC2) was formed from the abrasive particles C2, a Coated Sample (CaS3) was formed from a blend of particles of Sample S1 and C2, and a Coated Sample (CaS4) was formed from a blend of particles of Sample S1 and C2. All of the samples had the same construction, which is provided below, except that CaS3 had a thicker size coat as compared to CaS4. At least two of each of the above samples was made for testing. A backing of finished cloth of 47 pounds per ream was obtained and coated with a make formulation including a phenol formaldehyde resin as provided in Table 4. Using an electrostatic deposition process, approximately 40-47 pounds per ream of abrasive particles were applied to the backing with the make coat. The structure was dried in an oven for two hours at approximately 80° C. It will be appreciated that the make coat was created such that sum of the components provided in Table 2 equals 100%.

TABLE 2

| Make Coat Formulation | |
|---|---|
| Make Formulation Component | Percentage |
| Filler NYAD Wollastonite 400 | 45-50 wt % |
| Wet Witcona 1260 | 0.10-.2 wt % |
| Resin, SI | 45-50 wt % |
| Solmod Silane A1100 | 0.1-3 wt % |
| Water | 0.1-1 wt % |

The samples were then coated with a size coat having the formulation presented in Table 3. The construction was heat treated in an oven set for a final soak temperature of 100-120° C., in which the sample was held for approximately 20-30 minutes. It will be appreciated that the size coat was created such that sum of the components provided in Table 3 equals 100%.

TABLE 3

| Size Coat Formulation | |
|---|---|
| Size Formulation Component | Percentage |
| Dye | 2-4 wt % |
| Solmod Tamol 165A | 0.5-2 wt % |
| Filler Syn Cryolite K | 40-45 wt % |
| Resin Single Comp 94-908 | 50-55 wt % |
| DF70 Defoamer | 0.1-0.2 wt % |
| Water | 2-4 wt % |

The samples were then placed into an oven to undergo heat treatment. The oven temperature was set for a final soak temperature of approximately 110-120° C., in which the sample was held for approximately 10-12 hours.

A supersize coat having the formulation provided below in Table 4 was then applied to the samples and processed in the same manner as the size coat. It will be appreciated that the supersize coat was created such that sum of the components provided in Table 4 equals 100%.

TABLE 4

| Supersize Coat Formulation | |
|---|---|
| Supersize Formulation Component | Percentage |
| Dye | 1-3 wt % |
| Solmod Cabosil | 0.05-3 wt % |
| Solmod DAXAD 11 | 1-4 wt % |
| Filler Type A | 63-67 wt % |
| Resin PF Prefere 80-5080A | 20-25 wt % |

TABLE 4-continued

| Supersize Coat Formulation | |
|---|---|
| Supersize Formulation Component | Percentage |
| DF70 Defoamer | 0.1-0.2 wt % |
| Water | 6-10 wt % |

Each of the samples was tested according to a standardized grinding test using the conditions summarized in Table 5. Notably, two sample coated abrasives were tested in each case to derive the results.

TABLE 5

| Test mode: Dry, straight plunge | |
|---|---|
| Test conditions: | Constant MRR' = 2.5 inch$^3$/min/inch<br>Belt speed (Vs) = 7500 sfpm (38 m/s)<br>Work material: Inconel 718<br>Size: 0.5 × 0.5 × 12 inches<br>Contact width: 0.5 in<br>Contact Wheel: Steel |
| Measurements: | Power, Grinding Forces, MRR' and SGE<br>Cum MR compared at SGE = 2.4 Hp.min/inch$^3$ |

Figure 16:
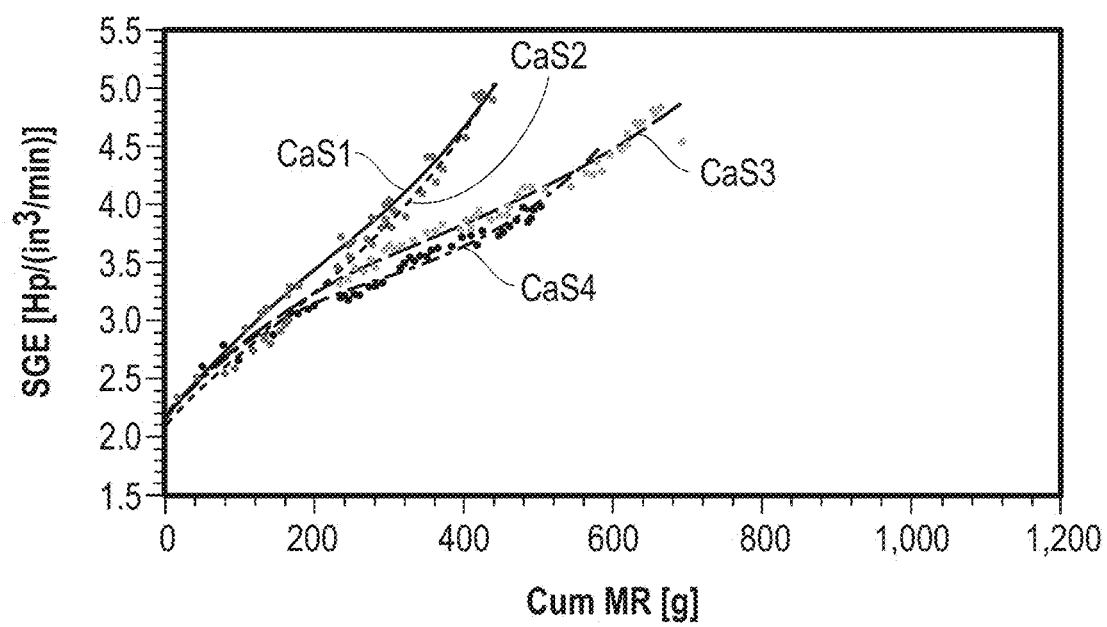
FIG. 16 includes a plot of specific grinding energy versus cumulative material removed for a coated abrasive article according to an embodiment and a conventional coated abrasive article.

FIG. 16 includes a plot of specific grinding energy versus cumulative material removed for the samples noted above. As noted, Samples CaS3 and CaS4 removed more material with generally lower SGE as compared to Samples CaS1 and CaC2. The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A coated abrasive article comprising:
a substrate; and
a plurality of abrasive particles overlying the substrate, wherein the plurality of abrasive particles comprises tapered abrasive particles having a taper fraction standard deviation of at least 0.025 and not greater than 0.090;
wherein each of the tapered abrasive particles comprises a body including a tip region including a tip of the body, a base region including a base of the body, wherein the base region is at an opposite end of the body from the tip region along a length of the body; and
wherein the base comprises a base surface having a plurality of peaks, wherein at least one peak of the plurality of peaks has a tip radius less than a tip radius of the tip of the body.

2. The coated abrasive article of claim 1, wherein at least 5% of the abrasive particles are tapered abrasive particles.

3. The coated abrasive article of claim 1, wherein each of the tapered abrasive particles comprises a body having a length, a width, and a thickness, wherein length>width≥thickness.

4. The coated abrasive article of claim 3, wherein the tapered abrasive particles have a primary aspect ratio (length/width) of at least 1.1.

5. The coated abrasive article of claim 3, wherein the tapered abrasive particles have a secondary aspect ratio (length/thickness) of at least 1.1.

6. The plurality of abrasive particles of claim 1, wherein each of the abrasive particles of the plurality of abrasive particles comprises a body having a length, a width, and a thickness, wherein length>width≥thickness.

7. The coated abrasive article of claim 6, wherein the plurality of abrasive particles have a primary batch aspect ratio [B(length/width)] of at least 1.1.

8. The coated abrasive article of claim 6, wherein the plurality of abrasive particles comprise a primary batch aspect ratio standard deviation [STDEV-B(length/width)] of not greater than 0.55.

9. The coated abrasive article of claim 1, wherein the tip region is defined by a taper including a reduction in the width or thickness of the body over a tip region length.

10. The coated abrasive article of claim 1, wherein the tip region comprises an asymmetric taper including a first surface and a second surface, wherein the first surface has a different contour as compared to the second surface.

11. The coated abrasive article of claim 1, wherein the base comprises a base surface including peaks and valleys.

12. The coated abrasive article of claim 1, further comprising an elongated region extending between the tip region and the base region.

13. The coated abrasive article of claim 12, wherein the elongated region defines a region having a change in width or thickness of not greater than 10% over the length of the elongated region.

14. The coated abrasive article of claim 1, wherein the tapered abrasive particles comprise an average solidity of at least 0.87.

15. The coated abrasive article of claim 1, wherein the plurality of abrasive particles have a predetermined lateral position, a predetermined longitudinal position, a predetermined radial position, a predetermined rotational orientation, a predetermined tilt angle, or any combination thereof.

16. A coated abrasive article comprising:
a substrate; and
a plurality of abrasive particles, each of the abrasive particles of the plurality of abrasive particles having a body including a length, width and thickness, wherein the plurality of abrasive particles have an average primary batch aspect ratio [B(length/width)] within a range of at least 2.1 to not greater than 4.7 and a primary batch aspect ratio standard deviation [STDEV-B(length/width)] of at least 0.05 and not greater than 0.55;
wherein the plurality of abrasive particles includes tapered abrasive particles, each of the tapered abrasive particles comprises body including a tip region including a tip of the body, a base region including a base of the body, wherein the base region is at an opposite end of the body from the tip region along a length of the body; and wherein the base comprises a projection extending from the body, wherein the projection extends at an angle relative to a longitudinal axis of the body, wherein the base region includes a base angle of at least 91 degrees and not greater than 180 degrees.

* * * * *